United States Patent
Gu et al.

(10) Patent No.: US 12,540,149 B2
(45) Date of Patent: Feb. 3, 2026

(54) AROMATIC HETEROCYCLIC COMPOUND, PHARMACEUTICAL COMPOSITION, AND USE THEREOF

(71) Applicant: Recursion Pharmaceuticals, Inc., Salt Lake City, UT (US)

(72) Inventors: Xiaohui Gu, Central Hong Kong (CN); Haiyun Bai, Central Hong Kong (CN); Olivier Rémi Barbeau, Didcot (GB); Jérémy Besnard, Dundee (GB)

(73) Assignee: RECURSION PHARMACEUTICALS, INC., Salt Lake City, UT (US)

( * ) Notice: Subject to any disclaimer, the term of this patent is extended or adjusted under 35 U.S.C. 154(b) by 366 days.

(21) Appl. No.: 18/259,029

(22) PCT Filed: Aug. 27, 2021

(86) PCT No.: PCT/CN2021/115031
§ 371 (c)(1),
(2) Date: Jun. 22, 2023

(87) PCT Pub. No.: WO2022/134641
PCT Pub. Date: Jun. 30, 2022

(65) Prior Publication Data
US 2024/0132489 A1    Apr. 25, 2024

(30) Foreign Application Priority Data
Dec. 24, 2020 (CN) .......................... 202011552478.1

(51) Int. Cl.
| | | |
|---|---|---|
| A61K 31/496 | (2006.01) | |
| A61P 35/00 | (2006.01) | |
| C07D 471/04 | (2006.01) | |
| C07D 519/00 | (2006.01) | |
| C07F 9/6558 | (2006.01) | |

(52) U.S. Cl.
CPC .......... *C07F 9/65583* (2013.01); *A61P 35/00* (2018.01); *C07D 471/04* (2013.01); *C07D 519/00* (2013.01); *C07F 9/65586* (2013.01)

(58) Field of Classification Search
CPC .................................................. A61K 31/496
USPC .................................................. 514/253.09
See application file for complete search history.

(56) References Cited

U.S. PATENT DOCUMENTS

| | | | |
|---|---|---|---|
| 2010/0173923 A1 | 7/2010 | Dorsch et al. | |
| 2014/0031360 A1 | 1/2014 | Wang et al. | |
| 2024/0360165 A1* | 10/2024 | Marineau | A61P 35/00 |

FOREIGN PATENT DOCUMENTS

| | | |
|---|---|---|
| CN | 101676285 A | 3/2010 |
| CN | 110036004 A | 7/2019 |
| CN | 114249712 A | 3/2022 |
| JP | 2017510651 A | 4/2017 |
| JP | 2020505419 A | 2/2020 |
| WO | WO 2005/095400 A1 | 10/2005 |
| WO | WO 2006038001 A1 | 4/2006 |
| WO | WO 2006/050076 A1 | 5/2006 |
| WO | WO-2012078777 A1 | 6/2012 |
| WO | WO 2015058163 A2 | 4/2015 |
| WO | WO-2015154038 A1 | 10/2015 |
| WO | WO 2018/013867 A1 | 1/2018 |
| WO | WO-2018141002 A2 | 8/2018 |
| WO | WO 2019143719 A1 | 7/2019 |
| WO | WO 2019143730 A1 | 7/2019 |
| WO | WO 2020/093011 A1 | 5/2020 |

OTHER PUBLICATIONS

PCT/CN2021/115031 International Search Report dated Nov. 25, 2021; 5 pages.
Huang S, Li R, Connolly PJ, Emanuel S, Middleton SA. Synthesis of 2-amino-4-(7-azaindol-3-yl)pyrimidines as cyclin dependent kinase 1 (CDK1) inhibitors. Bioorg Med Chem Lett. Sep. 15, 2006;16(18):4818-21. doi: 10.1016/j.bmcl.2006.06.073. Epub Jul. 25, 2006. PMID: 16870444.
Al-Sha'er MA, Taha MO. Discovery of novel CDK1 inhibitors by combining pharmacophore modeling, QSAR analysis and in silico screening followed by in vitro bioassay. Eur J Med Chem. Sep. 2010;45(9):4316-30. doi: 10.1016/j.ejmech.2010.06.034. Epub Jun. 30, 2010. PMID: 20638755.
International Preliminary Report on Patentability for PCT/CN2021/115078, dated Jun. 13, 2023; 9 pages.
English Translation of International Preliminary Report on Patentability for PCT/CN2021/115078, dated Jun. 13, 2023; 9 pages.
Eurasian Office Action for Application No. 2032390803, dated Mar. 21, 2024, 3 pgs.

(Continued)

*Primary Examiner* — Niloofar Rahmani
(74) *Attorney, Agent, or Firm* — MARSHALL, GERSTEIN & BORUN LLP

(57) ABSTRACT

An aromatic heterocyclic compound, a pharmaceutical composition and use thereof. Specifically disclosed are a compound as shown in formula I, a stereoisomer thereof, a diastereomer thereof, or a pharmaceutically acceptable salt of any one of the foregoing, or a crystal form or solvate of any one of the foregoing. The aromatic heterocyclic compound has a novel structure, good CDK7 inhibitory activity, and good selectivity.

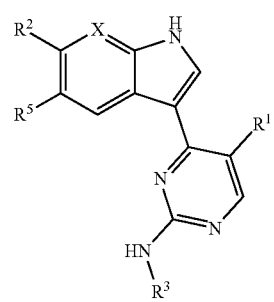

3 Claims, No Drawings

(56) References Cited

OTHER PUBLICATIONS

English Translation of Eurasian Office Action for Application No. 2032390803, dated Mar. 21, 2024, 3 pgs.
Eurasian Office Action for Application No. 2032390834, dated May 15, 2024, 2 pgs.
English Translation of Eurasian Office Action for Application No. 2032390834, dated May 15, 2024, 2 pgs.
International Preliminary Report on Patentability for PCT/CN2021/115031; 7 pages.
English translation of International Preliminary Report on Patentability for PCT/CN2021/115031; 7 pages.

\* cited by examiner

AROMATIC HETEROCYCLIC COMPOUND, PHARMACEUTICAL COMPOSITION, AND USE THEREOF

The present application claims the priority to the Chinese patent application number 2020115524787 filed on Dec. 24, 2020. The present application cites the full text of the above Chinese patent application.

TECHNICAL FIELD

The present invention relates to an aromatic heterocyclic compound, a preparation method thereof, a pharmaceutical composition thereof, and a use thereof.

BACKGROUND ART

Members of the cyclin-dependent kinase (CDK) family have a key regulating effect in proliferation. CDK7 is unique in mammalian CDKs and has the effects of integrating the kinase activity and regulating the cell cycle and transcription. In cytosol, CDK7 exists as a heterotrimer complex and is considered to act as a CDK1/2 activating kinase (CAK); therefore, CDK7 phosphorylation of conserved residues in CDK1/2 is necessary for full catalytic CDK activity and cell cycle progression. In the nucleus, CDK7 forms the kinase core of the general transcription factor complex of the RNA polymerase (RNAP) II and is responsible for phosphorylation of the C-terminal domain (CTD) of the RNAP II, which is a necessary step for gene transcription initiation. CDK7 has two functions (i.e., CAK and CTD phosphorylation), which jointly support key aspects of cell proliferation, cell cycle, and transcription.

The destruction of the RNAP II CTD phosphorylation has been proved to preferentially affect proteins with short half lives, including proteins in the anti-apoptotic BCL-2 family. Cancer cells have proved the ability of avoiding promoting cell death signaling by upregulating members of the BCL-2 family. Therefore, inhibition of the human CDK7 kinase activity may result in the antiproliferative activity.

High sequence and structural similarity of the kinase domains of members of the CDK family prevents the discovery of CDK7 selective inhibitors. Therefore, selective CDK7 inhibitors need to be discovered and developed. Such CKD7 inhibitors are expected as therapeutic agents for treating CLL and other cancers.

SUMMARY

In order to overcome the defect of a single structure of existing CDK7 inhibitors in the technical problem, the present invention aims to provide an aromatic heterocyclic compound, a preparation method thereof, a pharmaceutical composition, and a use thereof. The compound of the present invention has a novel structure and good activity and selectivity.

The present invention solves the above technical problem by using the following technical solutions.

The present invention provides a compound as shown in formula I, a stereoisomer thereof a diastereomer thereof, or a pharmaceutically acceptable salt of any one of the foregoing (referring to the compound as shown in formula I, the stereoisomer thereof, or the diastereomer thereof described above), or a crystal form or solvate of any one of the foregoing (referring to the compound as shown in formula I, the stereoisomer thereof, the diastereomer thereof or the pharmaceutically acceptable salt described above):

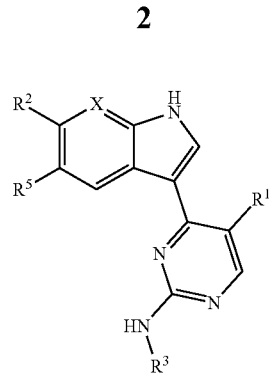

$R^1$ is $CF_3$, F, Cl, Br, or CN;
$R^5$ is H or halogen;
X is N;
$R^2$ is

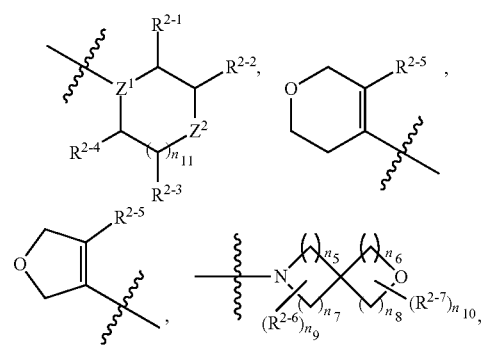

"4-12-membered heterocyclic alkyl containing 1 to 4 heteroatoms O," "4-12-membered heterocyclic alkyl containing 1 to 4 heteroatoms O" substituted with one or more $R^{2-8}$ "4-12-membered heterocyclic alkyl containing 1 to 4 heteroatoms N" substituted with one or more $R^{2-9}$,

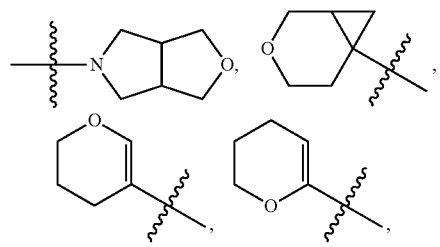

or $-P(=O)R^{2-10}R^{2-11}$;
$Z^1$ is N or CH; $Z^2$ is O or $S(=O)_2$, $R^{2-1}$, $R^{2-2}$, $R^{2-3}$, and $R^{2-4}$ are independently H, $C_1$-$C_6$ alkyl, or "$C_1$-$C_6$ alkyl substituted with one or more halogens," or $R^{2-1}$ is attached to $R^{2-2}$ to form a $-(CH_2)_m-$ structure, or $R^{2-1}$ is attached to $R^{2-3}$ to form a $-(CH_2)_m-$ structure, or $R^{2-1}$ is attached to $R^{2-4}$ to form a $-(CH_2)_m-$ structure, or $R^{2-2}$ is attached to $R^{2-3}$ to form a $-(CH_2)_m-$structure, and m is 1, 2, or 3; $n_{11}$ is 1 or 2; each $R^{2-5}$ is independently H or $C_1$-$C_6$ alkyl;
$n_5$, $n_6$, $n_7$, and $n_8$ are independently 0, 1, 2, or 3; $n_5$ and $n_7$ are not 0 at the same time, $n_6$ and $n_8$ are not 0 at the same time, and $R^{2-9}$ and $R^{2-7}$ are independently $NH_2$ or $C_1$-$C_6$ alkyl; $n_9$ and $n_{10}$ are independently 0, 1, or 2; each $R^{2-8}$ is independently $C_1$-$C_6$ alkyl;

each $R^{2-9}$ is independently OH, CN, $C_1$-$C_6$ alkyl, $C_1$-$C_6$ alkyl substituted with one or more OH, or "4-12-membered heterocyclic alkyl containing 1 to 4 heteroatoms selected from one or more of O, S, and N";
$R^{2-10}$ and $R^{2-11}$ are independently $C_1$-$C_6$ alkyl; and
$R^3$ is

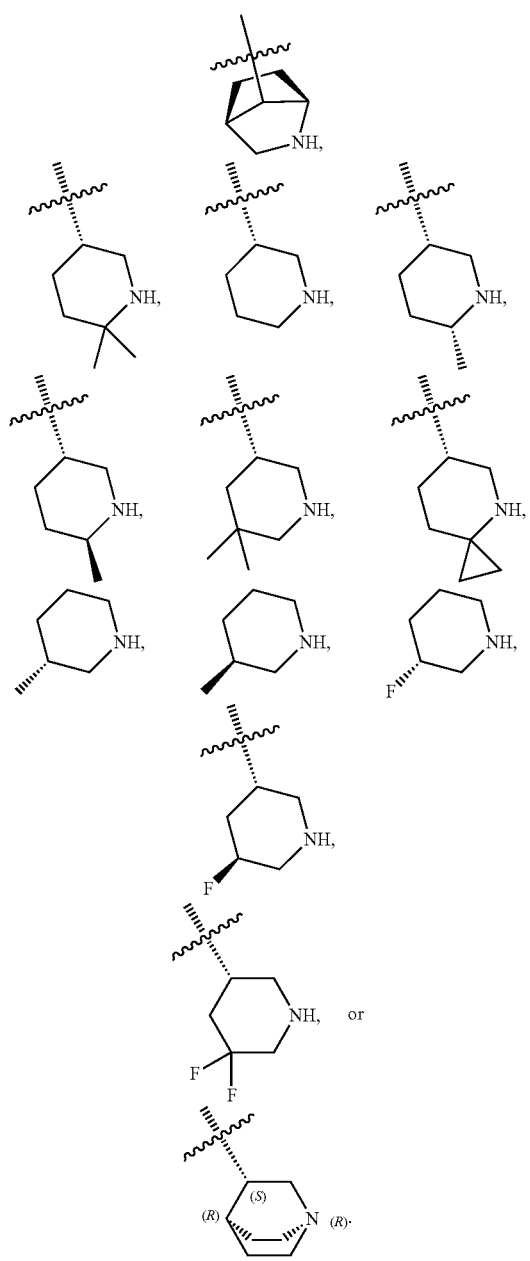

In certain preferred examples of the present invention, certain groups in the compound as shown in formula I, the stereoisomer thereof, the diastereomer thereof, or the pharmaceutically acceptable salt of any one of the foregoing, or a crystal form or solvate of any one of the foregoing are defined as follows, and groups not mentioned are the same as described in any solution of the present application (referred to as "in a certain solution of the present invention").

When $R^{2-1}$, $R^{2-2}$, $R^{2-3}$, and $R^{2-4}$ are independently $C_1$-$C_6$ alkyl or "$C_1$-$C_6$ alkyl substituted with one or more halogens," the $C_1$-$C_6$ alkyl is $C_1$-$C_3$ alkyl, preferably methyl, ethyl, n-propyl, or isopropyl, for example, methyl or ethyl, and for another example, methyl.

In a certain solution of the present invention, when $R^2$ is

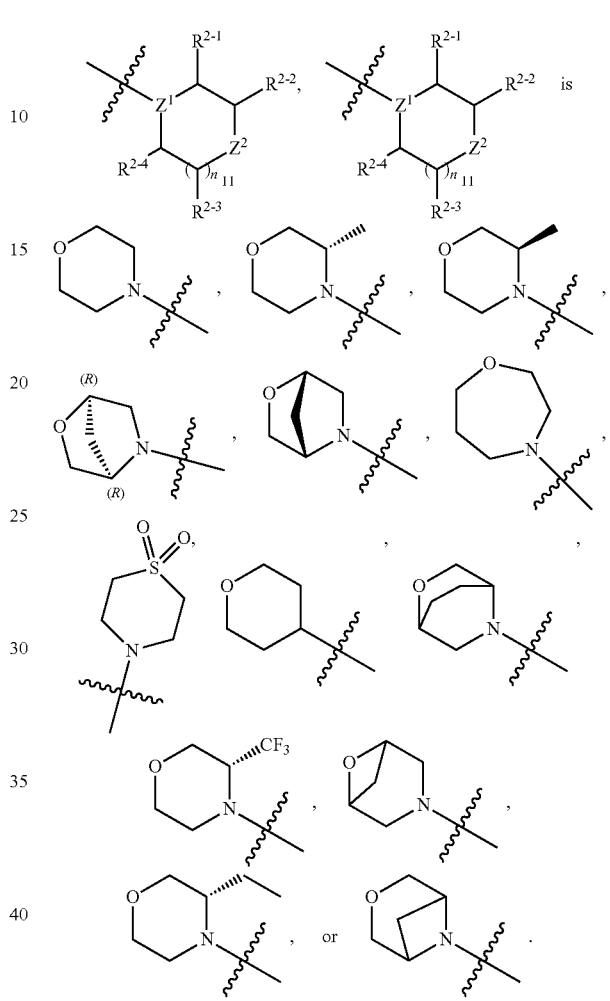

In a certain solution of the present invention, when each $R^{2-5}$ is independently $C_1$-$C_6$ alkyl, the $C_1$-$C_6$ alkyl is $C_1$-$C_3$ alkyl, preferably methyl, ethyl, n-propyl, or isopropyl, for example, methyl.

In a certain solution of the present invention, when $R^{2-6}$ and $R^{2-7}$ are independently $C_1$-$C_6$ alkyl, the $C_1$-$C_6$ alkyl is $C_1$-$C_3$ alkyl, preferably methyl, ethyl, n-propyl, or isopropyl, for example, methyl.

In a certain solution of the present invention, when $R^2$ is

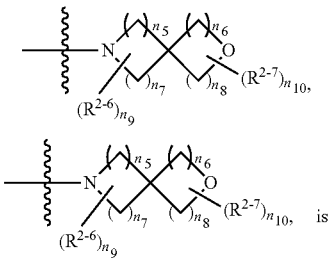

is

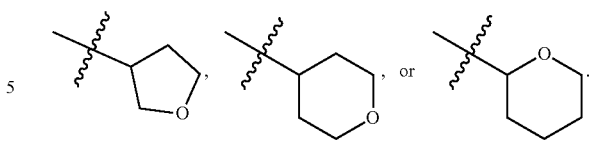

In a certain solution of the present invention, when each $R^{2-8}$ is independently $C_1$-$C_6$ alkyl, the $C_1$-$C_6$ alkyl is $C_1$-$C_3$ alkyl, preferably methyl, ethyl, n-propyl, or isopropyl, for example, methyl.

In a certain solution of the present invention, when $R^2$ is "4-12-membered heterocyclic alkyl containing 1 to 4 heteroatoms N" substituted with one or more $R^{2-9}$, the "4-12-membered heterocyclic alkyl containing 1 to 4 heteroatoms N" substituted with one or more R is "4-6-membered heterocyclic alkyl containing 1 to 2 heteroatoms N" substituted with 1 or 2 $R^{2-9}$, for example, azetidinyl substituted with 1 or 2 $R^{2-9}$, pyrrolidinyl substituted with 1 or 2 $R^{2-9}$, piperidyl substituted with 1 or 2 $R^{2-9}$, or "piperazinyl substituted with 1 or 2 $R^{2-9}$" for another example,

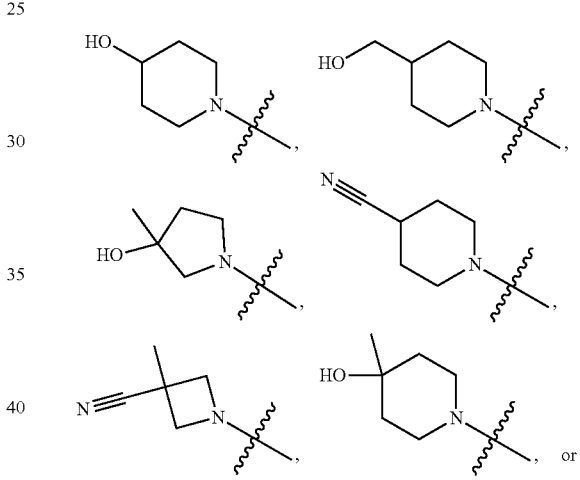

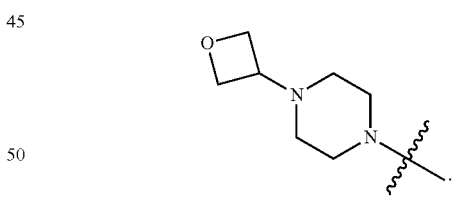

In a certain solution of the present invention, when each $R^{2-9}$ is independently $C_1$-$C_6$ alkyl or "$C_1$-$C_6$ alkyl substituted with one or more OH," the $C_1$-$C_6$ alkyl is $C_1$-$C_3$ alkyl, preferably methyl, ethyl, n-propyl, or isopropyl, for example, methyl.

In a certain solution of the present invention, when each $R^{2-9}$ is independently "4-12-membered heterocyclic alkyl containing 1 to 4 heteroatoms selected from one or more of O, S, and N," the "4-12-membered heterocyclic alkyl containing 1 to 4 heteroatoms selected from one or more of O, S, and N" is "4-6-membered heterocyclic alkyl containing 1 to 2 heteroatoms O," for example, oxetanyl, for another example,

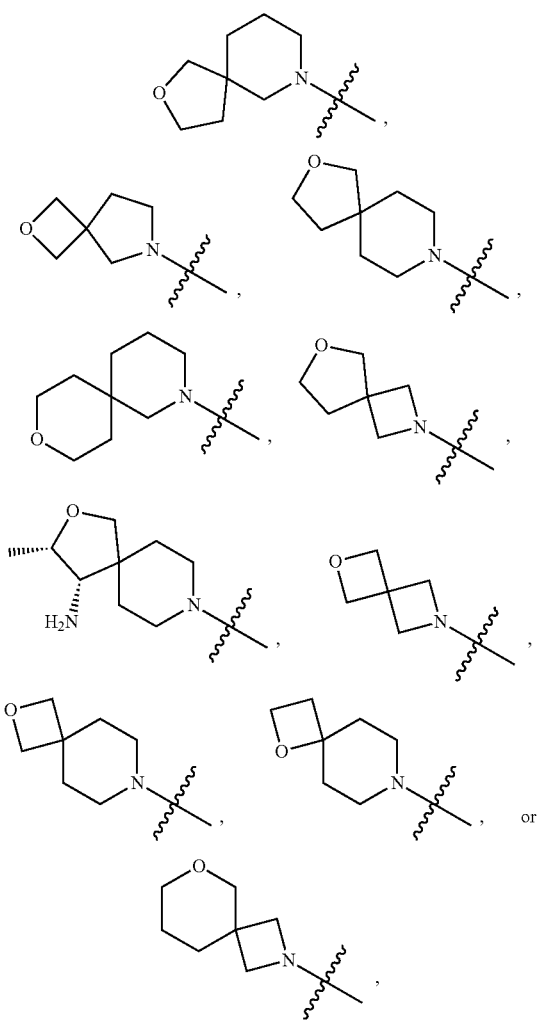

for example,

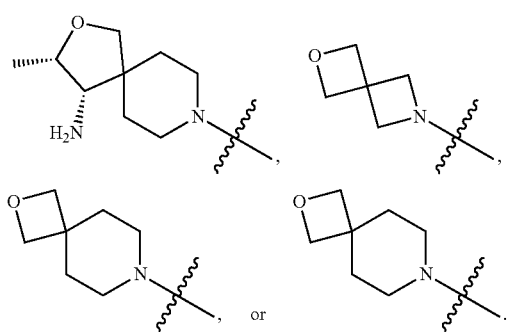

In a certain solution of the present invention, when $R^2$ is "4-12-membered heterocyclic alkyl containing 1 to 4 heteroatoms O" or ""4-12-membered heterocyclic alkyl containing 1 to 4 heteroatoms O" substituted with one or more $R^{2-8}$," the "4-12-membered heterocyclic alkyl containing 1 to 4 heteroatoms O" is "4-6-membered heterocyclic alkyl containing 1 heteroatom O", for example, tetrahydrofuranyl or tetrahydropyranyl, for another example,

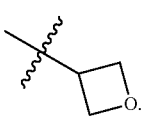 [SMILES: *C1COC1]

In a certain solution of the present invention, $R^1$ is $CF_3$, F, Cl, Br, or CN;

$R^5$ is H or halogen;

$R^2$ is

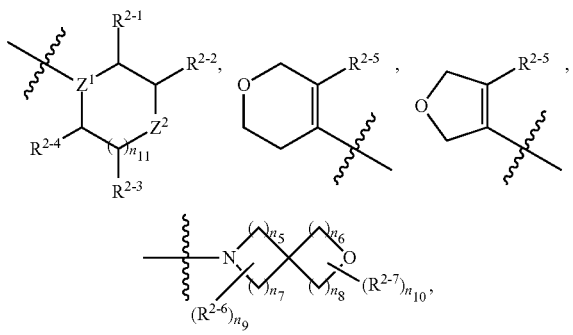

"4-12-membered heterocyclic alkyl containing 1 to 4 heteroatoms O," "4-12-membered heterocyclic alkyl containing 1 to 4 heteroatoms O" substituted with one or more $R^{2-8}$, "4-12-membered heterocyclic alkyl containing 1 to 4 heteroatoms N" substituted with one or more $R^{2-9}$,

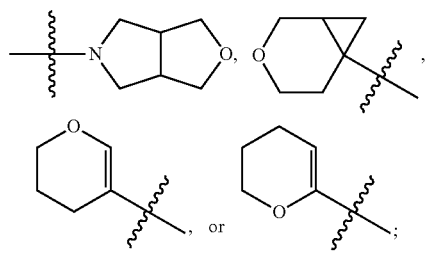

$Z^1$ is N or CH; $Z^2$ is O or $S(=O)_2$, $R^{2-1}$, $R^{2-2}$, $R^{2-3}$, and $R^{2-4}$ are independently H, $C_1$-$C_6$ alkyl, or "$C_1$-$C_6$ alkyl substituted with one or more halogens," or $R^{2-1}$ is attached to $R^{2-2}$ to form a —$(CH_2)_m$— structure, or $R^{2-1}$ is attached to $R^{2-3}$ to form a —$(CH_2)_m$— structure, or $R^{2-1}$ is attached to $R^{2-4}$ to form a —$(CH_2)_m$— structure, or $R^{2-2}$ is attached to $R^{2-3}$ to form a —$(CH_2)_m$— structure, and m is 1, 2, or 3; $n_{11}$ is 1 or 2;

each $R^{2-5}$ is independently H or $C_1$-$C_6$ alkyl;

$n_5$, $n_6$, $n_7$, and $n_8$ are independently 0, 1, 2, or 3, $n_5$ and $n_7$ are not 0 at the same time, $n_6$ and $n_8$ are not 0 at the same time, and $R^{2-6}$ and $R^{2-7}$ are independently $NH_2$ or $C_1$-$C_6$ alkyl; $n_9$ and $n_{10}$ are independently 0, 1, or 2;

each $R^{2-8}$ is independently $C_1$-$C_6$ alkyl;

each $R^{2-9}$ is independently OH, CN, $C_1$-$C_6$ alkyl $C_1$-$C_6$ alkyl substituted with one or more OH, or "4-12-membered heterocyclic alkyl containing 1 to 4 heteroatoms selected from one or more of O, S, and N"; and $R^3$ is

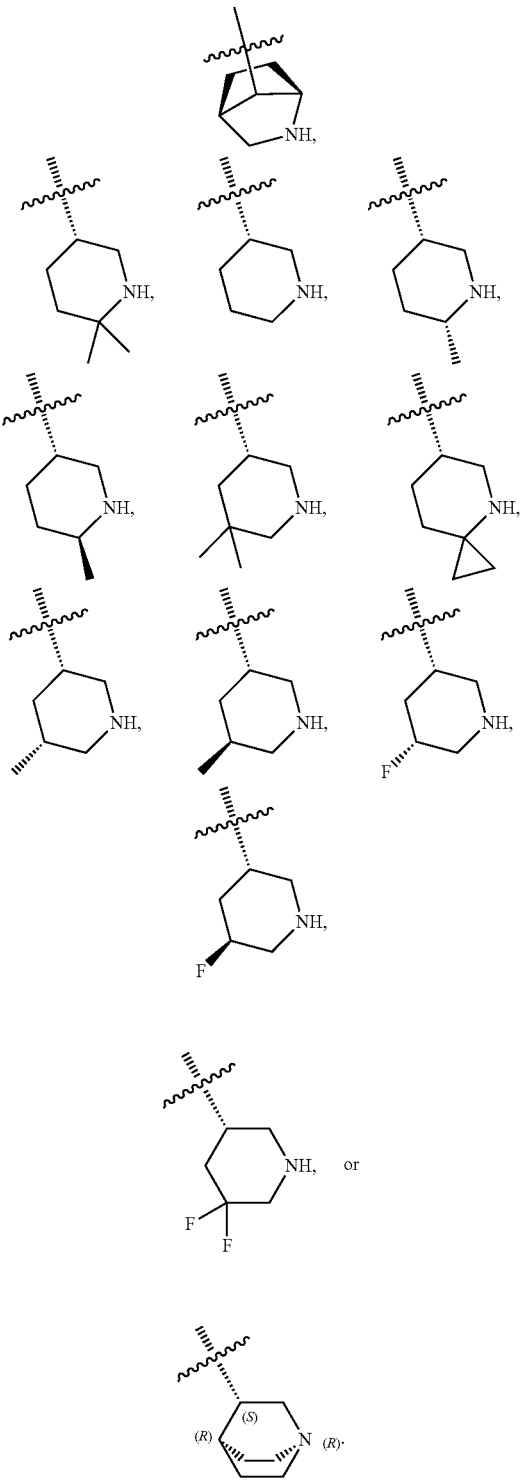

In a certain solution of the present invention, $R^1$ is $CF_3$.

In a certain solution of the present invention, $R^{2-1}$, $R^{2-2}$, $R^{2-3}$, and $R^{2-4}$ are independently H or $C_1$-$C_6$ alkyl, or $R^{2-1}$ is attached to $R^{2-2}$ to form a —$(CH_2)_m$— structure, or $R^{2-1}$ is attached to $R^{2-4}$ to form a —$(CH)_m$— structure, or $R^{2-2}$ is attached to $R^{2-3}$ to form a —$(CH_2)_m$— structure.

In a certain solution of the present invention, in

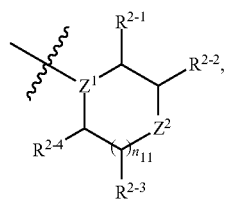

$Z^1$ is N, $Z^2$ is S(=O)$_2$, $R^{2-1}$, $R^{2-2}$, $R^{2-3}$, and $R^{2-4}$ are independently H or $C_1$-$C_6$ alkyl; or $Z^1$ is N, $Z^2$ is O, $R^{2-1}$, $R^{2-2}$, $R^{2-3}$, and $R^{2-4}$ are H or $C_1$-$C_6$ alkyl, or $R^{2-1}$ is attached to $R^{2-3}$ to form a —CH$_2$— or —(CH$_2$)$_2$— structure, or $R^{2-2}$ is attached to $R^{2-3}$ to form a —CH$_2$— structure; or $Z^1$ is CH, $Z^2$ is O and $R^{2-1}$, $R^{2-2}$, $R^{2-3}$, and $R^{2-4}$ are all H.

In a certain solution of the present invention, in

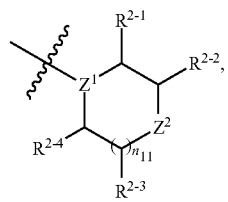

$Z^1$ is N, $Z^2$ is S(=O)$_2$, $R^{2-1}$, $R^{2-2}$, $R^{2-3}$, and $R^{2-4}$ are independently H, and $n_{11}$ is 0; or $Z^1$ is N, $Z^2$ is O, $R^{2-1}$, $R^{2-2}$, $R^{2-3}$, and $R^{2-4}$ are H or $C_1$-$C_6$ alkyl, or $R^{2-1}$ is attached to $R^{2-3}$ to form a —CH$_2$— or —(CH$_2$)$_2$— structure, or $R^{2-1}$ is attached to $R^{2-4}$ to form a —CH$_2$— structure, and $n_{11}$ is 0 or 1; or $Z^1$ is CH, $Z^2$ is O, and $R^{2-1}$, $R^{2-2}$, $R^{2-3}$, and $R^{2-4}$ are all H, and $n_{11}$ is 0.

In a certain solution of the present invention, $n_5$ is 1 or 2, $n_7$ is 1, 2, or 3, $n_6$ is 0, 1, or 2, and $n_8$ is 0, 1, 2, or 3.

In a certain solution of the present invention, $n_9$ is 0; and $n_{10}$ is 0, 1, or 2.

In a certain solution of the present invention, $R^2$ is —P(=O)Me$_2$,

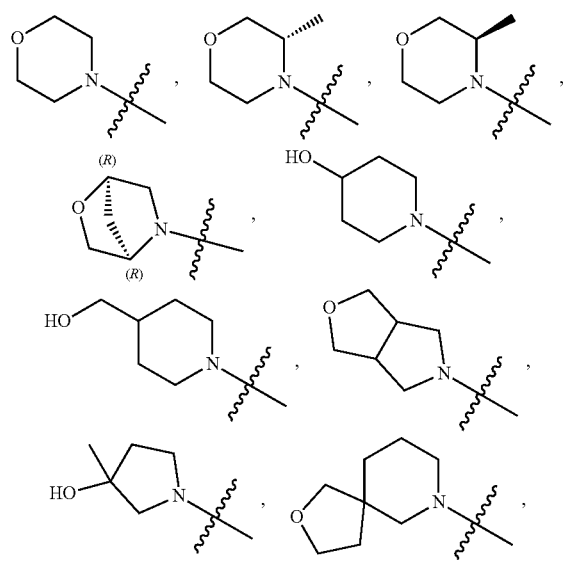

-continued

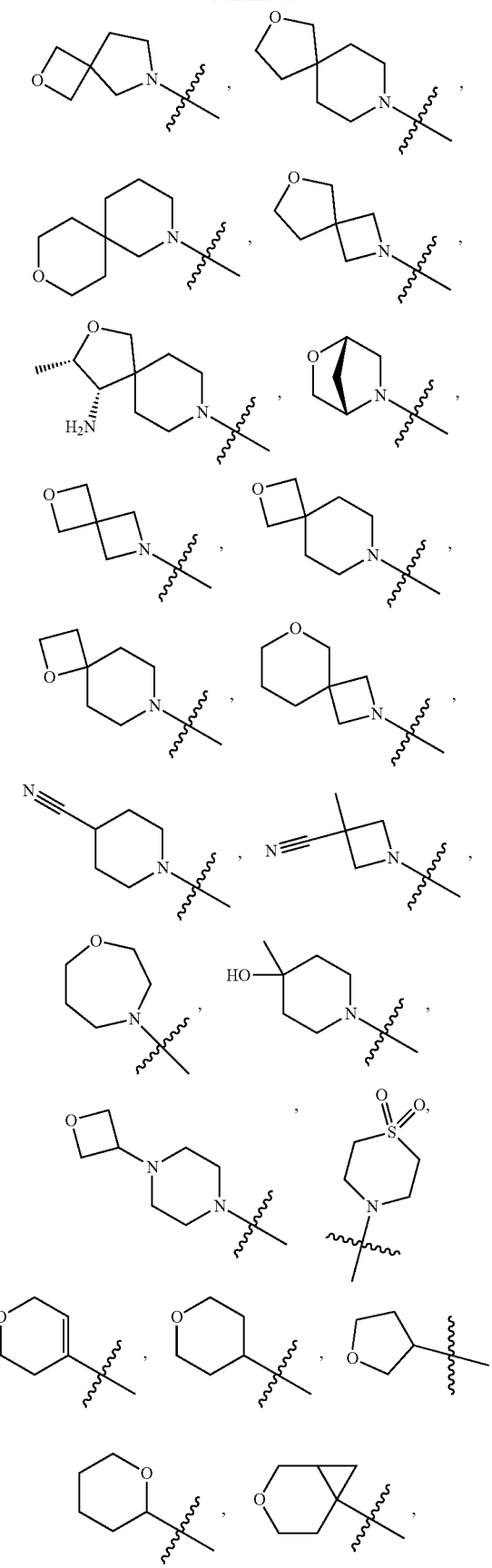

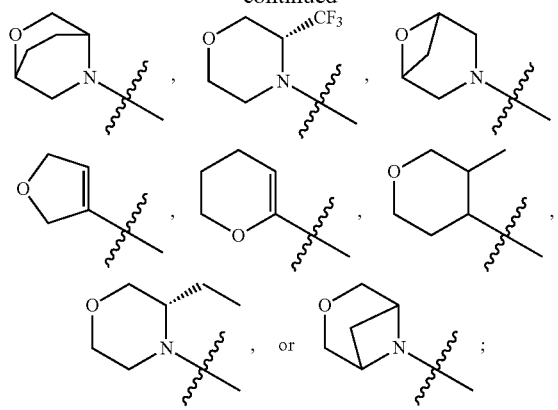
preferably, $R^2$ is —P(=O)Me$_2$,
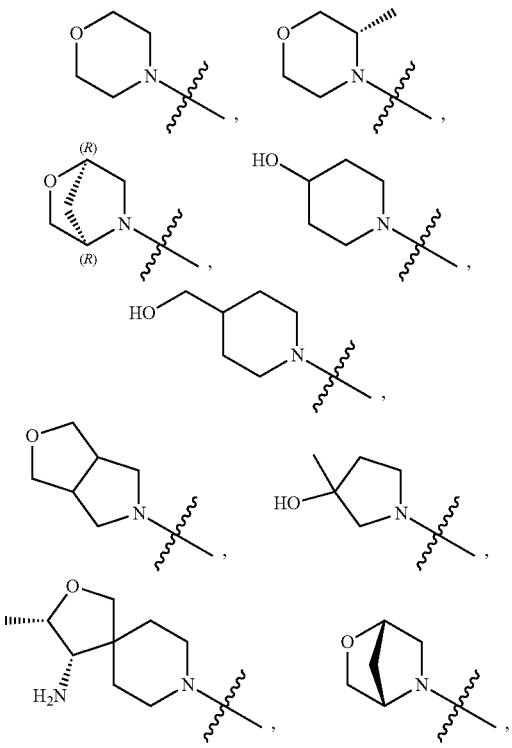
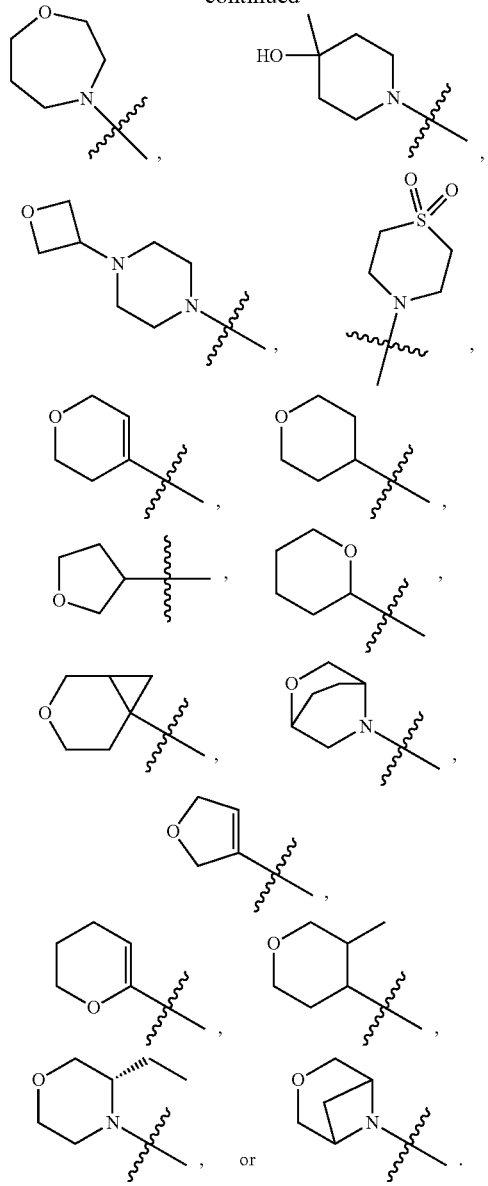
In a certain solution of the present invention, $R^3$ is
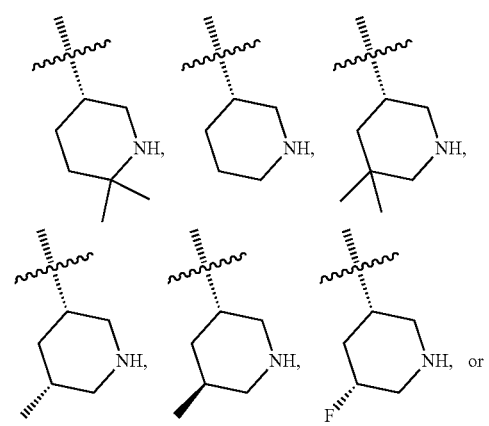

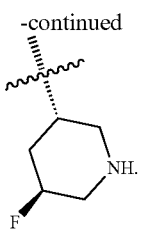
In a certain solution of the present invention, the compound as shown in formula i is any one of the following compounds:
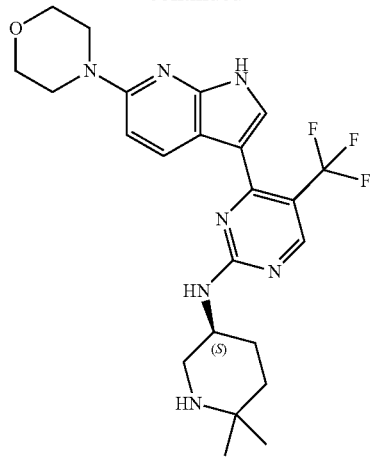
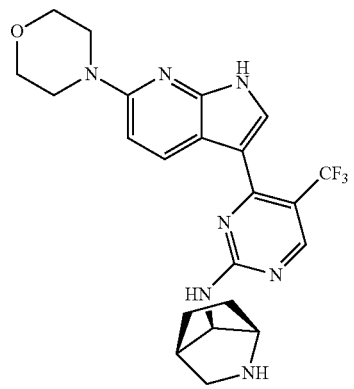
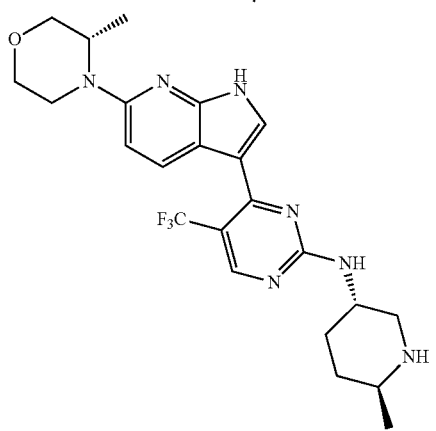
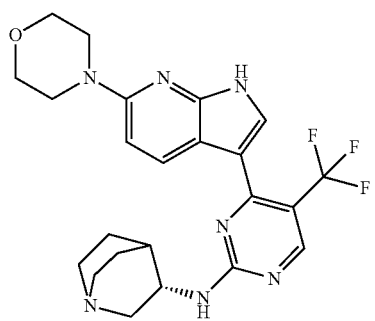
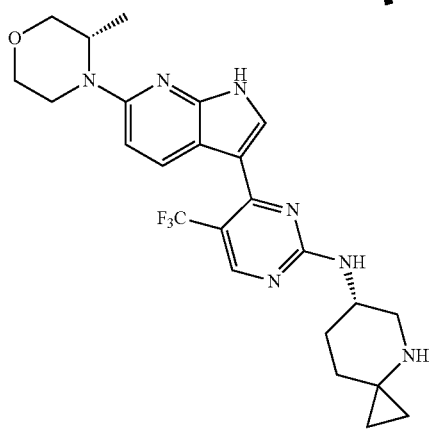
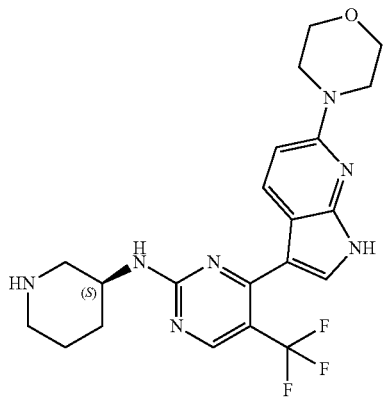
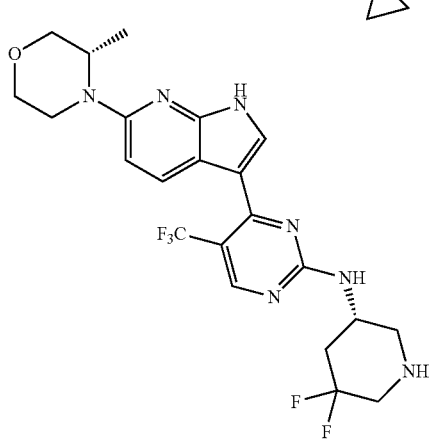

15
-continued
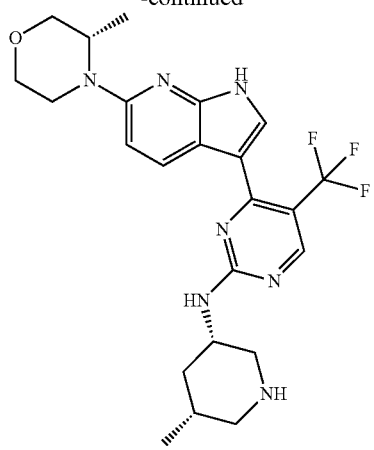
16
-continued
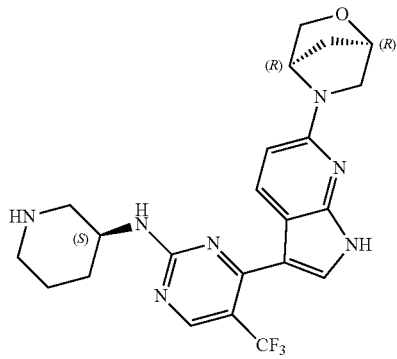
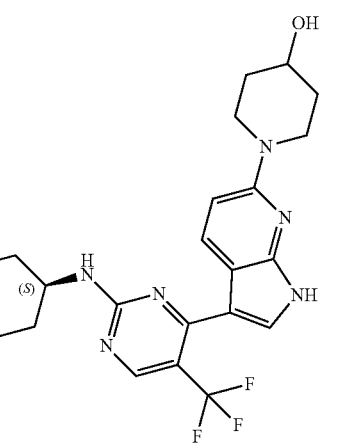
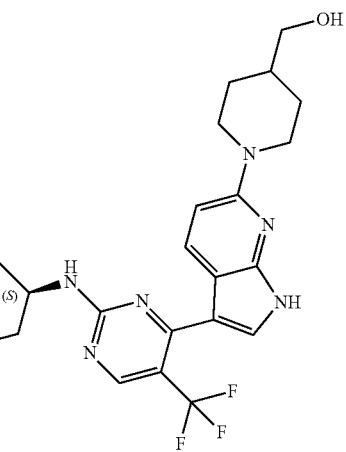
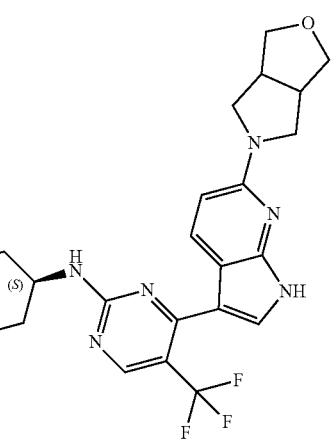

-continued
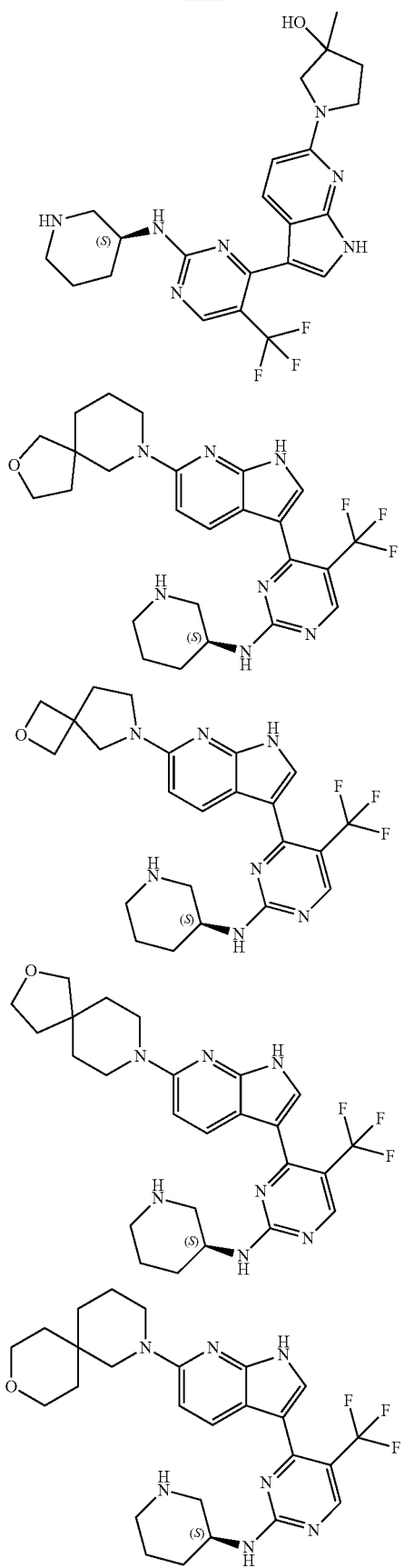
-continued
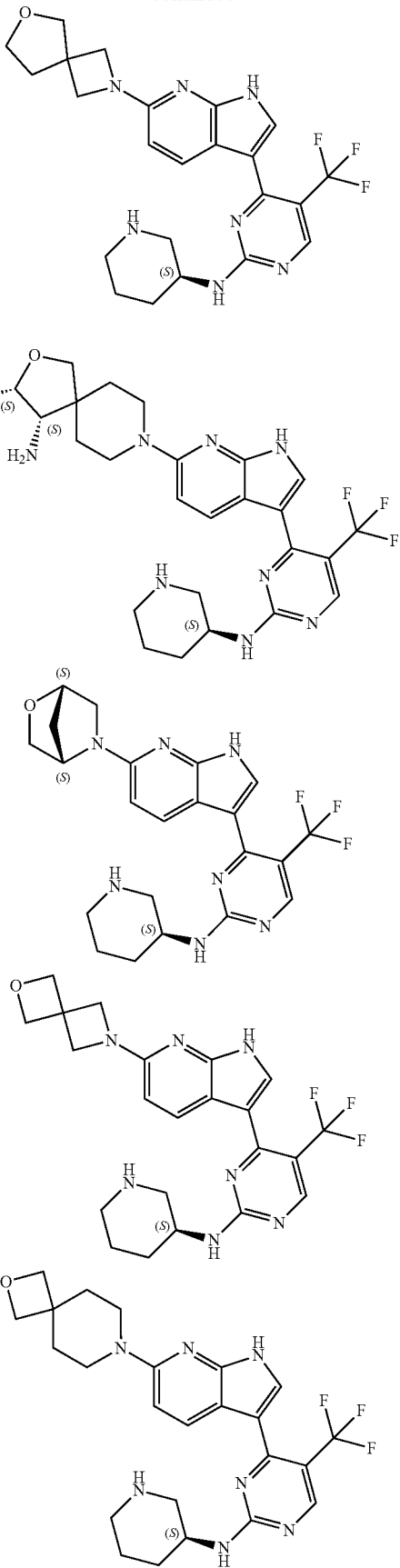

-continued
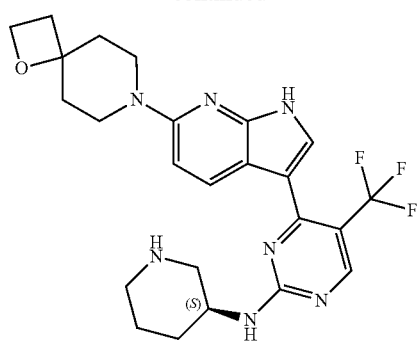
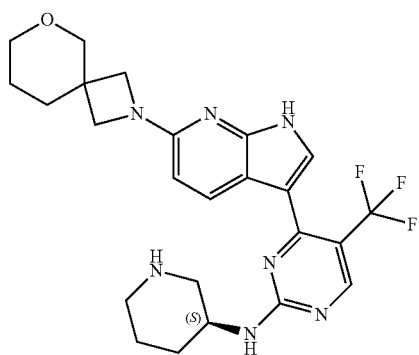
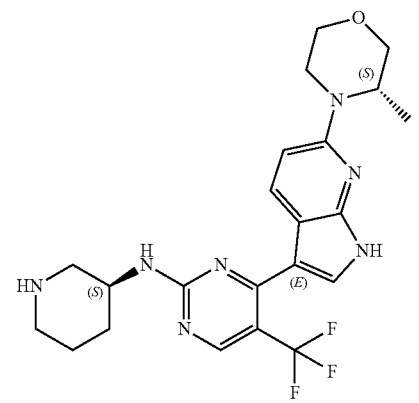
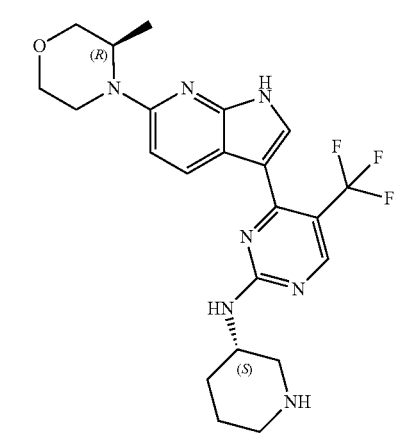
-continued
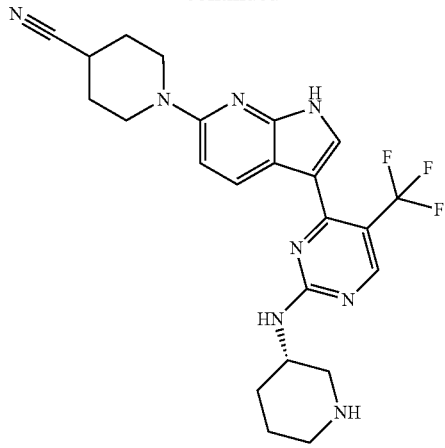
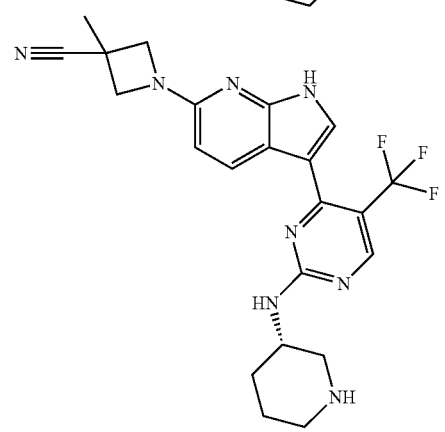
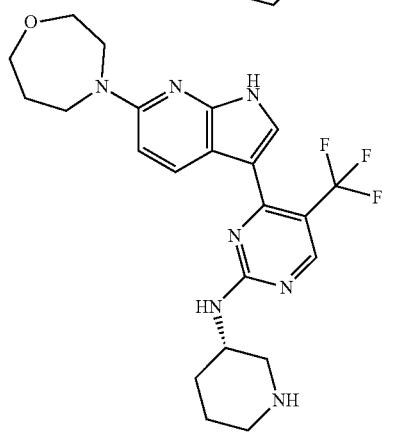
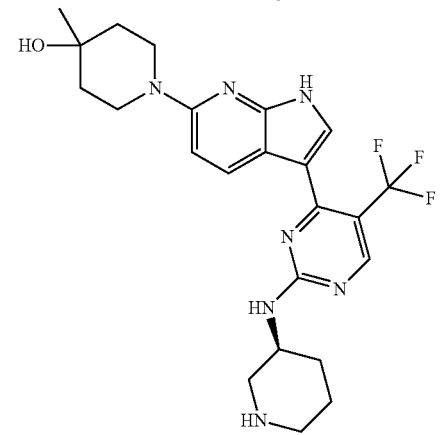

-continued
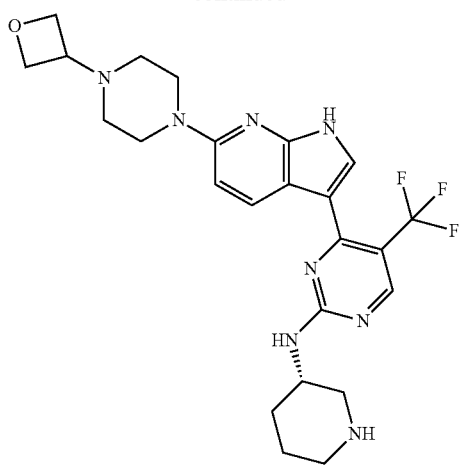
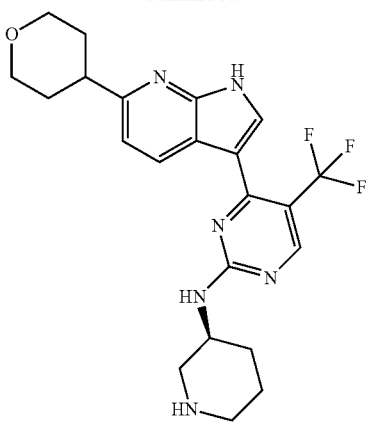
-continued
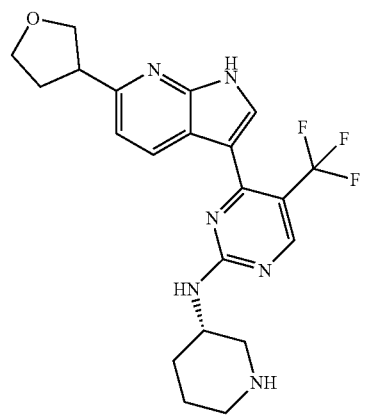
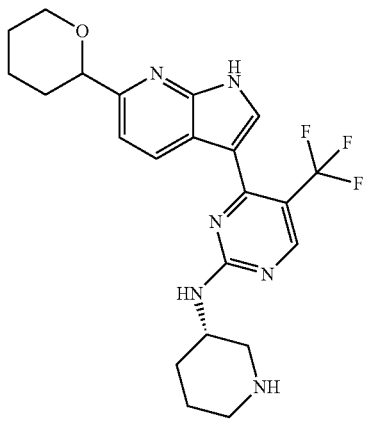
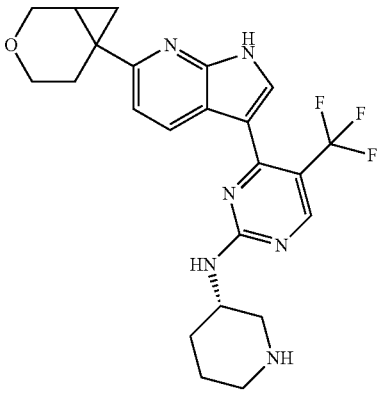

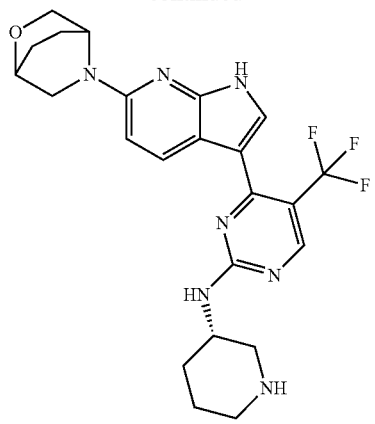
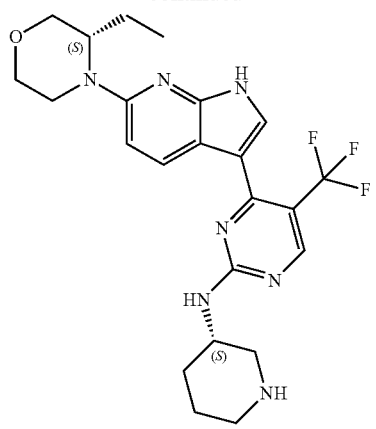
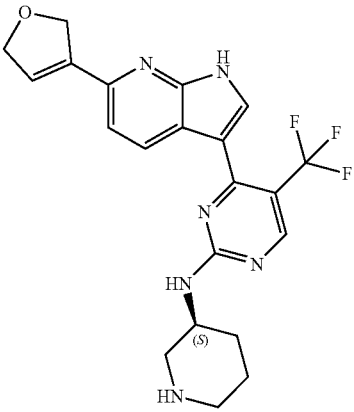
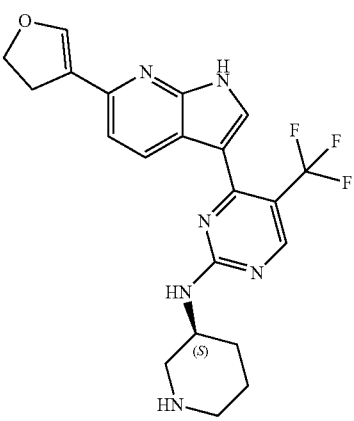
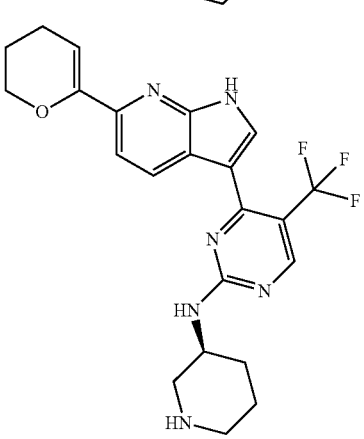

-continued

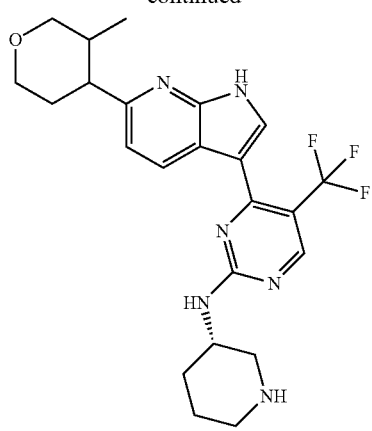

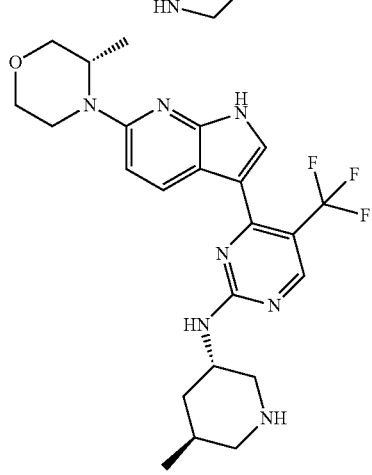

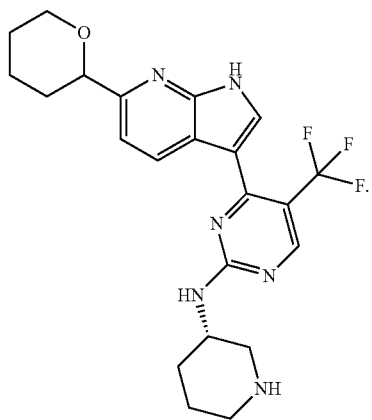 [SMILES: FC(F)(F)c1cnc(N[C@H]2CCCNC2)nc1-c1c[nH]c2nc(C3CCCCO3)ccc12]

In a certain solution of the present invention, the compound as shown in formula I is any one of the following compounds:

the compound with a retention time of 6.7635 min under the following conditions, which is a stereoisomer in

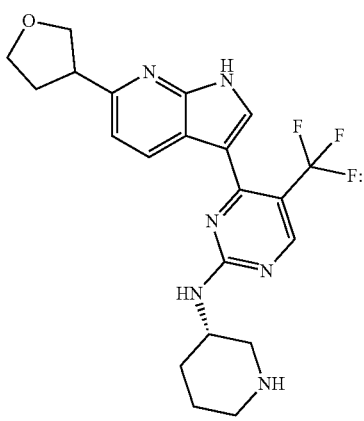

a chromatographic column: Cellulose 2 (150 mm*4.6 mm), 5 um, mobile phases: an A phase is carbon dioxide, and a B phase is 0.05% diethylamine/methanol; gradients: the B phase is from 5% to 40% within 5 minutes, the 40% B phase is kept for 2.5 minutes, the 5% B phase is kept for 2.5 minutes, a flow rate: 2.5 milliliters/minute;

the compound with a retention time of 7.118 min under the following conditions, which is a stereoisomer in

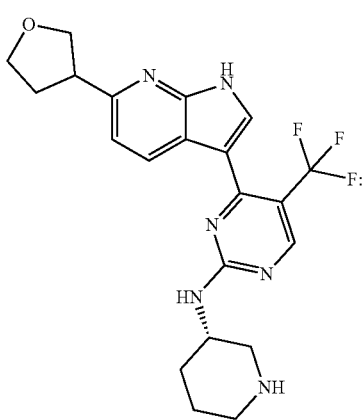

a chromatographic column: Cellulose 2 (150 mm*4.6 mm), 5 um; mobile phases: an A phase is carbon dioxide, and a B phase is 0.05% diethylamine/methanol; gradients: the B phase is from 5% to 40% within 5 minutes, the 40% B phase is kept for 2.5 minutes, the 5% B phase is kept for 2.5 minutes, a flow rate: 2.5 milliliters/minute;

the compound with a retention time of 3.598 min under the following conditions, which is a stereoisomer in

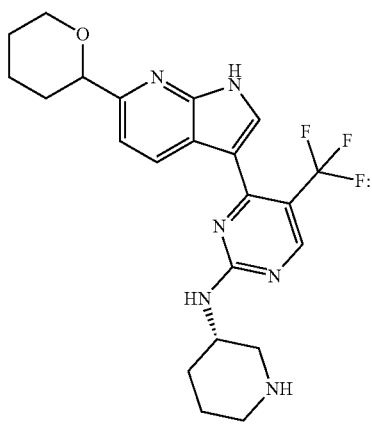

a chromatographic column: (Chiralcel OJ-3 (100 mm*4.6 mm), 3 um; mobile phases: an A phase is carbon dioxide, and a B phase is 0.05% diethylamine/ethanol; gradients: the B phase is from 5% to 40% within 4 minutes, the 40% B phase is kept for 0.5 minute, the 5% B phase is kept for 1.5 minutes, a flow rate: 2.8 milliliters/minute;

the compound with a retention time of 4.426 min under the following conditions, which is a stereoisomer in

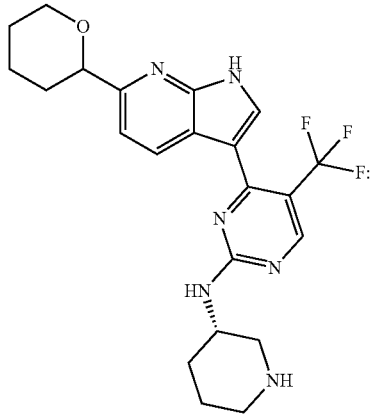

a chromatographic column: Chiralcel OJ-3 (100 mm*4.6 mm), 3 um; mobile phases: an A phase is carbon dioxide, and a B phase is 0.05% diethylamine/ethanol; gradients: the B phase is from 5% to 40% within 4 minutes, the 40% B phase is kept for 0.5 minute, the 5% B phase is kept for 1.5 minutes, a flow rate: 2.8 milliliters/minute.

The above test conditions for the retention time are not used for limiting the compound. As long as the retention time of a compound obtained by testing under the above test conditions is the same as those recorded above or within an error margin and the compound is a stereoisomer in the above compounds defined by the retention time, the compound shall fall within the scope of protection of the present invention.

The compound of the present invention can be prepared by using synthesis methods known in the art and synthesis methods summarized in the following explained solutions.

General Synthesis Method 1:

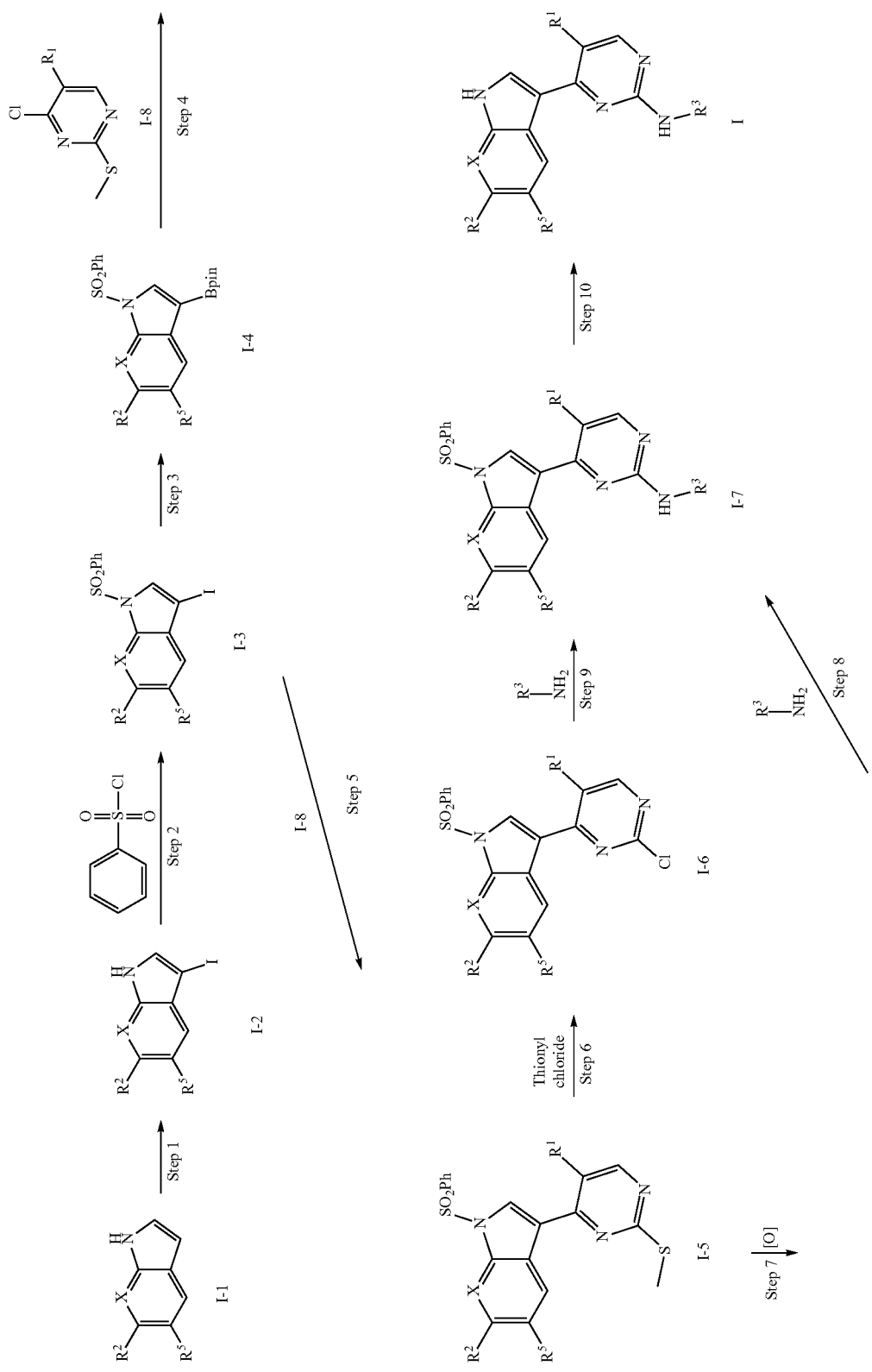

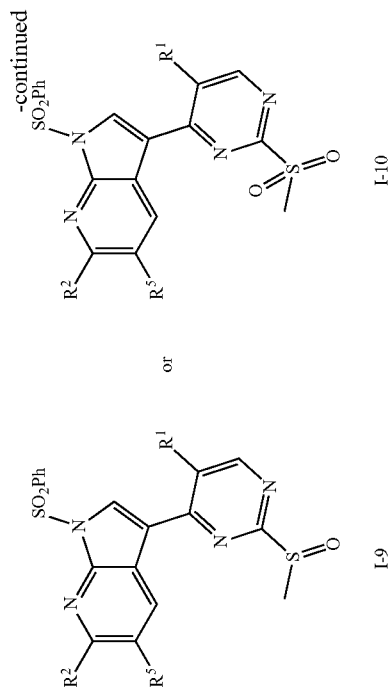

As shown in general synthesis method 1, a compound as shown in formula (1-1) reacts with a suitable halogenation reagent (for example, but not limited to elemental iodine) to obtain a halogenated product 1-2, an NH functional group in the structure is protected by selecting a suitable protecting group (for example, but not limited to benzenesulfonyl) in the product 1-2, and the compound as shown in chemical formula (1-2) may be protected by using the benzenesulfonyl at a low temperature (for example, 0° C.) to obtain a compound I-3.

Subsequently, the compound reacts with a compound I-8 under a suitable catalyst to generate a compound I-5 by stile coupling in a one-pot reaction, or the compound I-3 is first converted into a corresponding borate (or boric acid) compound I-4 from halogenation under suitable reaction conditions, and the compound I-4 reacts with the compound I-8 under a suitable catalyst to obtain a compound I-5 by suzuki coupling; and the compound I-5 is heated under the condition of a suitable chlorination reagent (for example, but not limited to $SOCl_2$) to obtain a chlorinated intermediate I-6, or thiomethyl ether is oxidated into sulfone I-10 (sulfoxide I-9 or "a mixture of sulfone I-10 and sulfoxide I-9") by using a suitable oxidant (for example, but not limited to m-CPBA). The chlorinated intermediate I-6 (I-10 or the mixture of I-9/I-10) is heated under suitable alkaline conditions (for example, but not limited to DIEA) to react with $R^3NH_2$ to obtain a compound as shown in formula (I-7), and the compound as shown in formula (I-7) is heated under suitable alkaline conditions (for example but not limited to NaOH) for deprotection to obtain a final product as shown in formula (I). If the $R^3$ group contains other protecting groups (for example, but not limited to the Boc protecting group), the final compound of the compound I is obtained under suitable acidic conditions (for example, but not limited to TFA/DCM).

General synthesis method 2: in the compound as shown in formula I, when X is N, a novel key intermediate compound II-6 is creatively synthesized, and a final compound II (corresponding to the compound I in which X is N) of the present invention can be conveniently synthesized by means of the intermediate II-6.

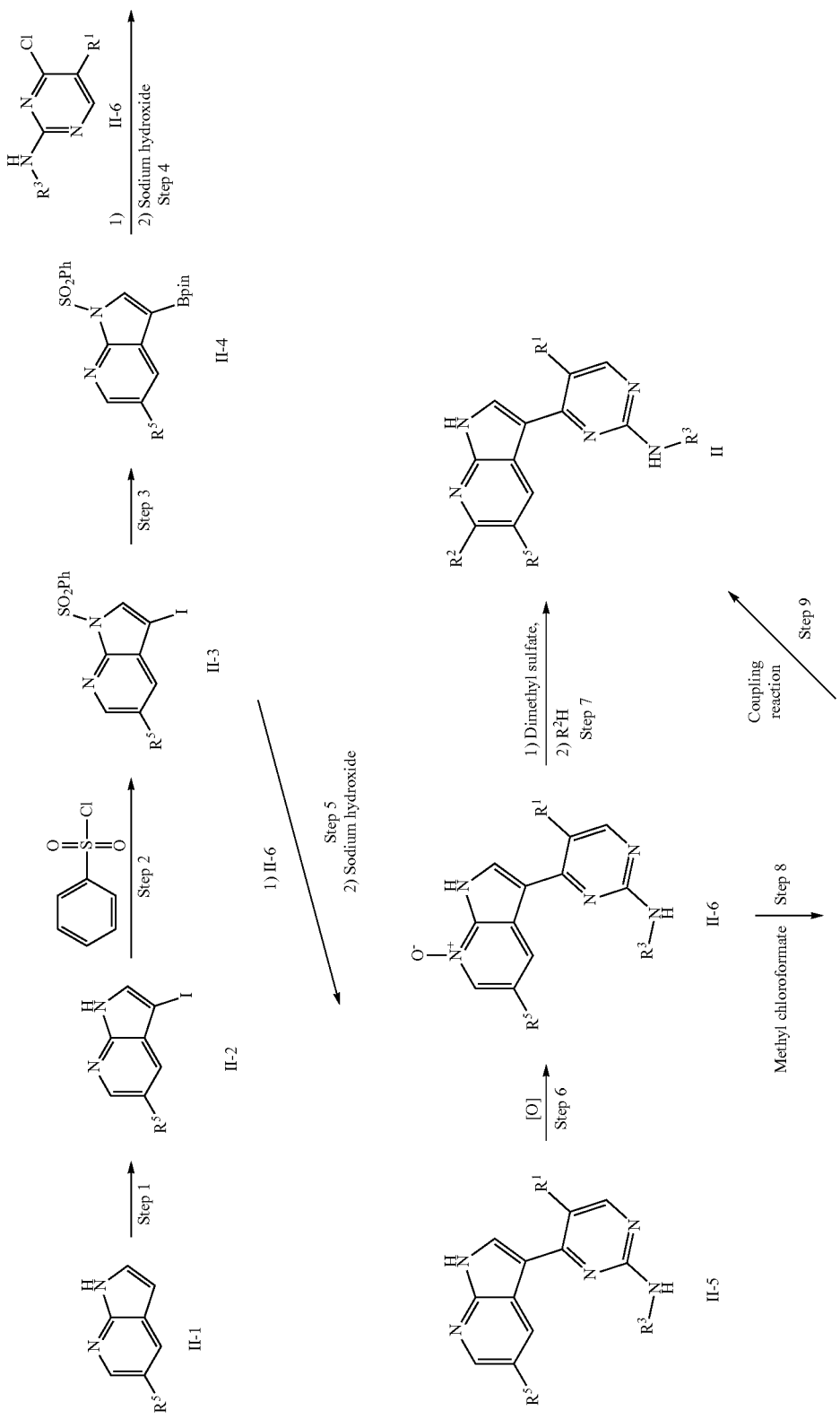

-continued
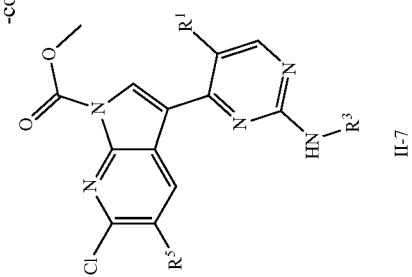
II-7

As shown in general synthesis method 2, a compound as shown in formula (II-1) reacts with a suitable halogenation reagent (for example, but not limited to elemental iodine) to obtain a halogenated product UI-2, and an NH functional group in the structure is protected by selecting a suitable protecting group (for example, but not limited to benzenesulfonyl) in the product II-2, for example, the reaction with benzene sulfonyl chloride at a low temperature (for example, 0° C.) may be protected by using the benzenesulfonyl to obtain a compound II-3. Subsequently, the compound reacts with a compound II-6 under a suitable catalyst to generate a compound II-5 by stille coupling in a one-pot reaction, or the compound II-3 is first converted into a corresponding borate (or boric acid) compound II-4 from halogenation under suitable reaction conditions, and the compound II-4 reacts with the compound II-6 under a suitable catalyst to obtain the compound II-5 by suzuki coupling; and the azoxy compound II-6 is obtained from the compound II-5 under suitable oxidizing conditions (for example, but not limited to m-CPBA), and the azoxy compound II-6 reacts with a suitable activating reagent (for example, but not limited to dimethyl sulfate) to generate active pyridine azoxy methyl ether under a heating condition. The active intermediate reacts with an amino compound R²H in the presence of a suitable alkali (for example, but not limited to DIEA) to obtain a compound as shown in formula (II). If the R³ group contains other protecting groups (for example, but not limited to the Boc protecting group), the final compound of the compound II is obtained under suitable acidic conditions (for example, but not limited to TFA/DCM).

The compound II-5 is heated under a suitable chlorination reagent or bromination reagent (for example, but not limited to methyl chloroformate) under suitable halogenation conditions to obtain a chlorinated intermediate II-7 or a corresponding brominated intermediate. The chlorinated intermediate II-7 reacts with the corresponding borate/boric acid or amino compound R²H un der suitable catalytic conditions by suitable coupling (for example, but not limited to Suzuki coupling or Buchwald coupling) to obtain the compound as shown in formula (II). If the R³ group contains other protecting groups (for example, but not limited to the Boc protecting group), the final compound of the compound II is obtained under suitable acidic conditions (for example, but not limited to TFA/DCM).

General synthesis method 3: in the compound as shown in formula I, when X is C(R⁴) and R⁴ is —P(=O)Me₂, a novel key intermediate compound III-4 is creatively synthesized, and a final compound III (corresponding to the compound I in which X is C(R⁴) and R⁴ is —P(=O)Me₂) of the present invention can be conveniently synthesized by means of the intermediate III-4 in a simple substitution reaction.

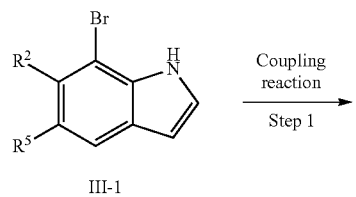

III-1

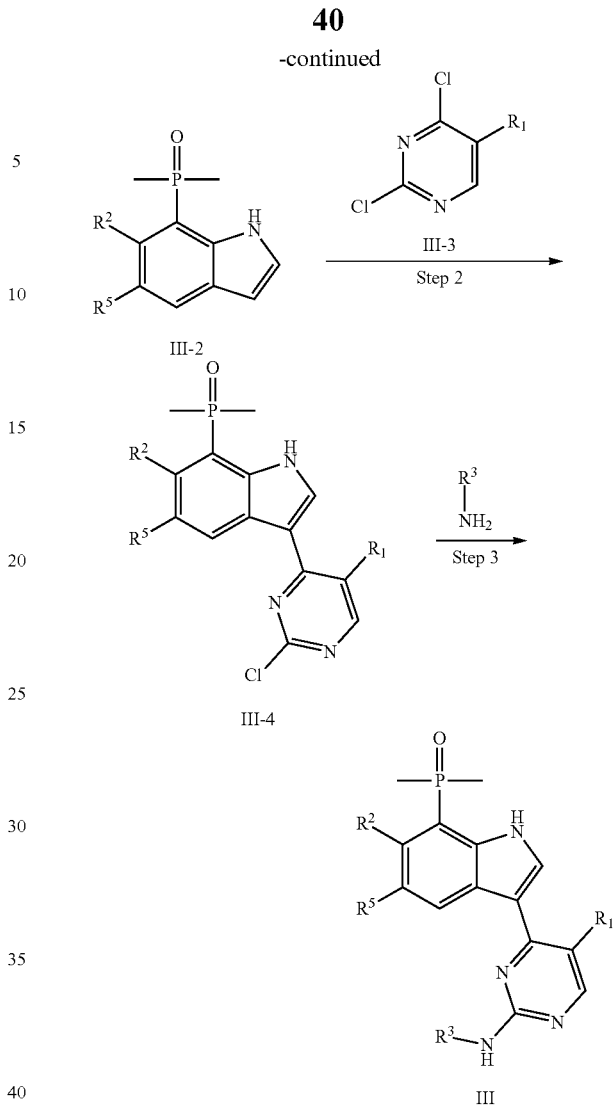

As shown in general synthesis method 3, a compound (for example, but not limited to the brominated compound) as shown in formula (III-1) reacts with a suitable reagent (for example, but not limited to dimethyl phosphine oxide) under a suitable catalyst to obtain a product III-2 by means of a coupling reaction, and the product III-2 reacts with the compound (III-3) at a suitable temperature (for example, but not limited to 60° C. or 0° C.) under a suitable solvent (for example, but not limited to 1,1,1,33,3-hexafluoropropane-2-ol or dichloromethane) in the presence of suitable acidic reagents (for example, but not limited to trifluoroacetic acid or aluminum trichloride) to obtain the compound III-4. The chlorinated intermediate III-4 is heated under suitable alkaline conditions (for example, but not limited to DIEA) to react with R³NH₂ to obtain the compound as shown in formula (III). If the R³ group contains other protecting groups (for example, but not limited to the Boc protecting group), the final compound of the compound I is obtained under suitable acidic conditions (for example, but not limited to TFA/DCM).

The present invention further provides a pharmaceutical composition, comprising the compound as shown in formula I, the stereoisomer thereof, the diastereomer thereof, or the pharmaceutically acceptable salt of any one of the foregoing (referring to the compound as shown in formula I, the stereoisomer thereof, or the diastereomer thereof described above), or the crystal form or solvate of any one of the foregoing described above, and pharmaceutical adjuvants.

The present invention further provides a use of the compound as shown in formula L, the stereoisomer thereof, the diastereomer thereof, or the pharmaceutically acceptable salt of any one of the foregoing (referring to the compound as shown in formula I, the stereoisomer thereof or the diastereomer thereof described above), or the crystal form or solvate of any one of the foregoing described above, or the above pharmaceutical composition in preparing drugs. Preferably, the drugs are used for preventing and/or treating proliferative diseases.

The present invention further provides a method for preventing and/or treating proliferative diseases. The method comprises administering a therapeutically effective amount of the compound as shown in formula I, the stereoisomer thereof, the diastereomer thereof, or the pharmaceutically acceptable salt of any one of the foregoing (referring to the compound as shown in formula I, the stereoisomer thereof, or the diastereomer thereof described above), or the crystal form or solvate of any one of the foregoing described above, or the above pharmaceutical composition to patients.

Preferably, the proliferative diseases are cancers (for example, leukemia, acute myelogenous leukemia, acute lymphoblastic leukemia, breast cancer, ovarian carcinoma, brain cancer, lung cancer, liver cancer, small cell lung cancer, melanoma, bladder cancer, colon cancer, esophageal cancer, bone cancer, neuroblastoma, ovarian carcinoma cancer, pancreatic cancer, prostate cancer, testicular cancer epithelial sarcoma, soft tissue sarcoma, and multiple myeloma), benign excrescences, angiogenesis, inflammatory diseases, autoinflammatory diseases, or autoimmune diseases.

The compound of the present invention, the stereoisomer thereof, the diastereomer thereof, or the pharmaceutically acceptable salt of any one of the foregoing, or the crystal for or solvate of any one of the foregoing, and the pharmaceutical composition can be administered locally or systemically, for example, enteral administration, such as rectal or oral administration, or parenteral administration to mammals (especially referring to human).

Example combinations for rectal administration include suppositories, which may contain, for example, suitable non-irritating excipients, such as cocoa butter, synthetic glyceride, or polyethylene glycol, that are solid at room temperature but melt and/or dissolve in the rectal cavity to release the drug. The compound of the present invention can also be administered parenterally, for example, by inhalation, injection, or infusion, such as intravenous, endarterial, intrabony, intramuscular, intracerebral, extraventricular, intrasynovial, intrasternal, intrathecal, intrafocal, intracranial, intratumoral, intracutaneous, and subcutaneous injection or infusion.

The therapeutically effective amount of active ingredients is defined herein and depends on the mammal species, weight, age, individual conditions, individual pharmacokinetic parameters, diseases to be treated, and modes of administration. For enteral administration, such as oral administration, the compound of the present invention can be prepared into a wide range of dosage forms.

The effective amount of the compound described in the present invention, the pharmaceutically acceptable salt thereof, and the solvate or pharmaceutical composition thereof can be easily determined by means of conventional experiments, and the most effective and convenient route of administration and the most appropriate preparation can also be determined by means of conventional experiments.

Unless otherwise specified, the terms used in the present invention have the following meanings:

It should be understood by a person skilled in the art that, according to the conventions used in the art,

used in the structural formula of the group described in the present invention refers to that the corresponding group is attached to other fragments and groups in the compound by means of the site.

The asterisked carbon atom represents a chiral carbon atom in an S configuration or R configuration.

The term "pharmaceutically acceptable salt" refers to a salt prepared from the compound of the present invention and a relatively nontoxic and pharmaceutically acceptable acid or alkali. When the compound of the present invention contains a relatively acidic functional group, an alkali addition salt can be obtained by enabling a sufficient amount of the pharmaceutically acceptable alkali to make contact with the neutral form of the compound in a pure solution or suitable inert solvent. The pharmaceutically acceptable alkali addition salt includes, but is not limited to: a lithium salt, a sodium salt, a potassium salt, a calcium salt, an aluminum salt, a magnesium salt, a zinc salt, a bismuth salt, an ammonium salt, and a diethanolamine salt. When the compound of the present invention contains a relatively alkaline functional group, an acid addition salt can be obtained by enabling a sufficient amount of the pharmaceutically acceptable acid to make contact with the neutral form of the compound in a pure solution or suitable inert solvent. The pharmaceutically acceptable acid includes an inorganic acid, the inorganic acid or an organic acid. When the compound of the present invention contains relatively acidic and relatively alkaline functional groups, the compound can be converted into the alkali addition salt or acid addition. Specifically, see Berge et al., "Pharmaceutical Salts," Journal of Pharmaceutical Science 66: 1-19 (1977) or Handbook of Pharmaceutical Salts: Properties, Selection, and Use (P. Heinrich Stahl and Camille G. Wermuth, ed., Wiley-VCH, 2002).

The term "solvate" refers to a substance formed by combining the compound of the present invention or the pharmaceutically acceptable salt thereof with stoichiometric or non-stoichiometric solvents. Solvent molecules in the solvate may exist in an ordered or non-ordered arrangement manner. The solvents include, but are not limited to: water, methanol, and ethanol.

If a stereoisomer exists, the terms "compound," "pharmaceutically acceptable salt," "solvate," and "solvate of the pharmaceutically acceptable salt" may exist as a single stereoisomer or a mixture of them (for example, racemate). The term "stereoisomer" refers to a cis-trans-isomer or optical isomer. These stereoisomers can be separated, purified, and enriched by using an asymmetric synthesis method or chiral separation method (including but not limited to thin-layer chromatography, rotary chromatography, column chromatography, gas chromatography, and high-pressure liquid chromatography) and can be obtained by performing chiral resolution by bonding (including chemical bonding) or salifying (including physical bonding) to other chiral compounds. The term "single stereoisomer" refers to that the mass content of one stereoisomer of the compound of the present invention is not less than 95% relative to all of the stereoisomers of the compound.

If a tautomer exists, the terms "compound," "pharmaceutically acceptable salt," "solvate," and "solvate of the pharmaceutically acceptable salt" may exist as a single tautomer or a mixture of them, and preferably, exist mainly as a relatively stable tautomer.

Atoms in the terms "compound," "pharmaceutically acceptable salt," "solvate," and "solvate of the pharmaceutically acceptable salt" may exist in the form of natural abundance or unnatural abundance. Hydrogen atoms are taken as an example, the form of natural abundance refers to that the protium content is about 99.985%, and the deuterium content is about 0.015%; and the form of unnatural abundance refers to that the deuterium content is about 95%. That is, one or more atoms in the terms "compound," "pharmaceutically acceptable salt," "solvate," and "solvate of the pharmaceutically acceptable salt" may exist in the form of unnatural abundance.

When an arbitrary variable (such as $R^{a-1}$) appears for several times in the definition of the compound, the definition of each position of the variable has nothing to do with the definition of other positions, and their meanings are independent of each other and do not affect each other. Therefore, if a certain group is substituted with 1, 2, or 3 $R^{a-1}$ groups, that is, the group may be substituted with at most 3 $R^{a-1}$, and the definition of $R^{a-1}$ in this position is independent of the definition of $R^{a-1}$ in other positions. In addition, a combination of a substituent and/or the variable is permitted only if the combination produces a stable compound.

The term "more" refers to 2, 3, 4, or 5, preferably 2 or 3.

The term "alkyl" refers to linear or branched alkyl containing a specified number of carbon atoms. Alkyl examples include methyl, ethyl, n-propyl, isopropyl, n-butyl, tert-butyl, isobutyl, sec-butyl, n-amyl, n-hexyl, n-heptyl, n-octyl, and similar alkyl thereof.

The term "cycloalkyl" refers to a saturated monocyclic, polycyclic, or bridged carbocyclic substituent composed of carbon and hydrogen atoms, and may be attached to the rest of a molecule by means of single bonds via any suitable carbon atom; and when it is polycyclic, it may be a fused ring system or spiral ring system in parallel ring attachment or spiral ring attachment (i.e., two geminal hydrogens on the carbon atom are substituted with alkylene). A cycloalkyl substituent may be attached to a central molecule via any suitable carbon atom. In some examples, a ring containing 3 to 8 carbon atoms may represent $C_3$-$C_8$ cycloalkyl. In some examples, $C_3$-$C_6$ cycloalkyl includes cyclopropyl ($C_3$), cyclobutyl ($C_4$), cyclopentyl ($C_5$), dicyclo[1.1.1]pentane, and cyclohexyl ($C_6$).

The term "heterocyclic alkyl" refers to a saturated cyclic group containing heteroatoms, including monocyclic, polycyclic, or endocyclic conditions; and when it is polycyclic, it may be a fused ring system or spiral ring system in parallel ring attachment or spiral ring attachment. Preferably, it is a 4-12-membered saturated cyclic group containing 1 to 4 cyclic heteroatoms independently selected from N, O, and S. Exemplary 4-membered heterocyclic groups include, but are not limited to, azetidinyl, epoxypropyl, thiacyclobutanyl, or isomers and stereoisomers thereof; and exemplary 5-membered heterocyclic groups include, but are not limited to, tetrahydrofuranyl, tetrahydrothiophenyl, pyrrolidinyl, thiazolidinyl, isothiazolidinyl, oxazolidinyl, isoxazolidinyl, imidazolidinyl, pyrazolidinyl, dioxolanyl, oxythiofuranyl, dithiofuranyl, or isomers and stereoisomers thereof. Exemplary 6-membered heterocyclic groups include, but are not limited to, piperidyl, tetrahydropyranyl, thiocyclopentyl, morpholinyl, thiomorpholinyl, dithianyl, dioxanyl, piperazinyl, triazinanyl, or isomers and stereoisomers thereof; and exemplary 7-membered heterocyclic groups include, but are not limited to, azepanyl, oxepanyl, thiepanyl, oxazepanyl, diazepanyl, or isomers and stereoisomers thereof.

The term "heteroaryl" refers to an aromatic group containing heteroatoms, preferably, an aromatic 5-6-membered single ring or 9-10-membered dual ring containing 1 to 4 heteroatoms independently selected from nitrogen, oxygen, and sulfur; and when it is dicyclic, at least one ring has aromaticity, for example, furyl, pyridyl, pyridazinyl, pyrimidyl, pyrazinyl, thienyl, isoxazolyl, oxazolyl, diazolyl, imidazolyl, pyrrolyl, pyrazolyl, triazolyl, tetrazolyl, thiazolyl, isothiazolyl, thiadiazolyl, benzimidazolyl, indolyl, indazolyl, benzothiazolyl, benzoisothiazolyl, benzoxazolyl, benzoisoazolyl, quinolyl, and isoquinolyl.

The term "pharmaceutical adjuvant" refers to excipients and additives used in drug manufacturing and prescription dispensing, and includes all substances contained in a pharmaceutical preparation except active ingredients. See Pharmacopoeia of the People's Republic of China (Edition 2015), Volume IV, or Handbook of Pharmaceutical Excipients (Raymond C Rowe, 2009 Sixth Edition).

The term "treating" refers to a therapeutic therapy. With regard to specific conditions, treating refers to: (1) relieving one or more biological manifestations of a disease or condition, (2) interfering (a) one or more points in a biological cascade causing or leading to the condition or (b) one or more biological manifestations of the condition, (3) improving one or more symptoms, effects, or side effects related to the condition, or one or more symptoms, effects, or side effects related to the condition or treatment thereof, or (4) slowing the progression of the condition or one or more biological manifestations of the condition.

The term "preventing" refers to that the risk of obtaining or developing diseases or disorders is reduced.

The term "therapeutically effective amount" refers to an amount of the compound enough to effectively treat the diseases or conditions described herein when being administered to a patient. The "therapeutically effective amount" will vary according to the compound, the condition and severity thereof, and the age of the patient to be treated, but may be adjusted as required by a person skilled in the art.

The term "patient" refers to any animal, preferably mammals, most preferably human, that will receive or has received administration of the compound or composition according to the examples of the present invention. The term "mammal" includes any mammal.

Examples of mammals include, but are not limited to, cattle, horses, sheep, pigs, cats, dogs, mice, rats, rabbits, guinea pigs, monkeys, and human, most preferably human.

On the basis that does not violate common general knowledge in the art, the above preferable conditions can be freely combined to obtain the exemplary examples of the present invention.

All of the reagents and raw materials used in the present invention are commercially available.

The present invention has the positive progressive effects: the present invention provides an aromatic heterocyclic compound, and the aromatic heterocyclic compound has a novel structure, good CDK7 inhibitory activity, and good selectivity.

DETAILED DESCRIPTION OF EMBODIMENTS

The present invention is further described by means of the examples below but is not limited to the scope of the examples. Experimental methods without specified conditions in the following examples shall be selected in accordance with conventional methods and conditions or in accordance with commercial specifications.

Preparation of Intermediate A: (3S)-3-(2-((1-(tert-butoxycarbonyl)piperidin-3-yl)-amino-5-(trifluoromethyl)pyrimidin-4-yl)-1H-pyrrolo[2,3-b]pyridine-7-oxide

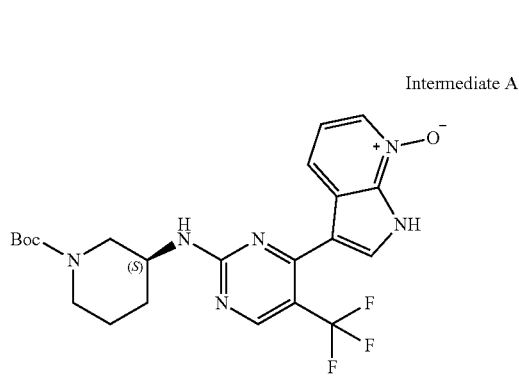

Intermediate A

Step 1: (3S)-3-((4-chloro-5-(trifluoromethyl)pyrimidin-2-yl)amino)piperidine-1-tert-butyl formate

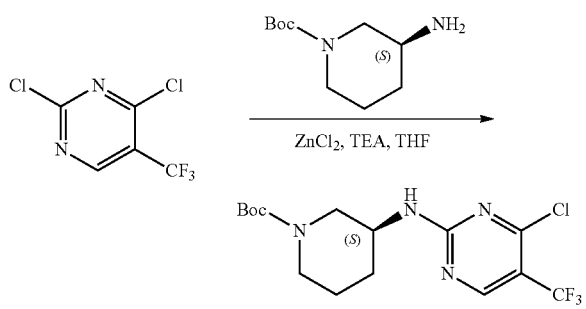

A compound 2,4-dichloro-5-trifluoromethyl pyrimidine (2.00 g, 9.22 mmol) was dissolved in tetrahydrofuran (2 mL). Triethylamine (1400 uL, 10.07 mmol) was added. Under nitrogen protection, a solution (2 M, 10 mL, 20.00 mmol) of zinc chloride in tetrahydrofuran was added dropwise at 0° (1 After the adding dropwise, the mixture reacted at 25° C. for 1 hour. A solution of a compound 3-amino piperidine-1-tert-butyl formate (2 mL, 10.49 mmol) in tetrahydrofuran (2 mL) was added to the above reaction system. After the adding, the mixture continued reacting at 25° C. for 16 hours. A thin layer chromatography plate monitored (silica gel, the volume ratio of ethyl acetate/petroleum ether was 1/3) that a principal point was generated (Rf=0.38, a target compound); meanwhile, a small new point was generated (Rf=0.44, an isomer), and part of the raw material 2,4-dichloro-5-trifluoromethyl pyrimidine (Rf=0.66) remained. The reaction liquid was concentrated. The obtained residues were purified by means of flash column chromatography (silica gel, the gradient of ethyl acetate/petroleum ether was 0 to 11.5%) to obtain a white solid compound (3S)-3-((4-chloro-5-(trifluoromethyl)pyrimidin-2-yl)amino)piperidine-1-tert-butyl formate (purity: 85%, 900 mg, 2.36 mmol, yield: 26) LC MS (ESI): [M-56+H]$^+$=325.2;

$^1$H NMR (400 MHz, CDCl$_3$): δ ppm 8.52-8.25 (m, 1H), 5.58 (br s, 1H), 3.96 (m, 1H), 3.58 (in, 1H), 3.3 (m, 3H), 1.83 (m, 1H), 1.61 (in, 3H), 1.35 (br d, J=12.3 Hz, 9H).

Step 2: 1-(benzenesulfonyl)-3-bromo-1H-pyrrolo[2,3-b]pyridine

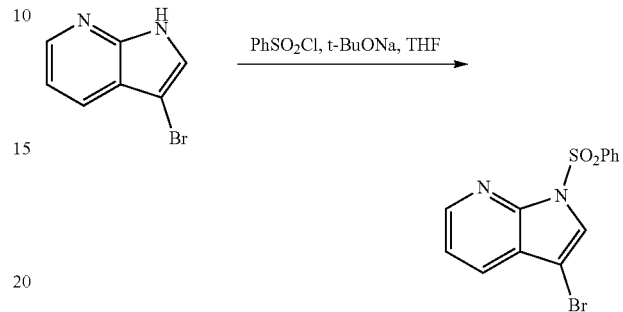

3-bromo-1H-pyrrolo[2,3-b]pyridine (100.00 g, 507.54 mmol) was dissolved in tetrahydrofuran (40 mL). Sodium tert-butoxide (58.50 g, 609.04 mmol) was added at 0° C. Then, benzene sulfonyl chloride (78 mL, 609.04 mmol) was added. The reaction mixture was stirred at 30° C. for 1 hour. The reaction mixture was poured into ice water (200 mL) and extracted with ethyl acetate (200 mL*2). Organic phases were merged and dried with sodium sulfate. Filtering and filtrate concentration were performed to obtain a yellow solid crude product 1-(benzenesulfonyl)-3-bromo-1H-pyrrolo[2,3-b]pyridine (170.00 g). LCMS (ESI): [M+H]$^+$= 337.2.

Step 3: 1-(benzenesulfonyl)-3-(4,4,5,5-tetramethyl-1,3,2-dioxaborolan-2-yl)pyrrolo[2,3-b]pyridine

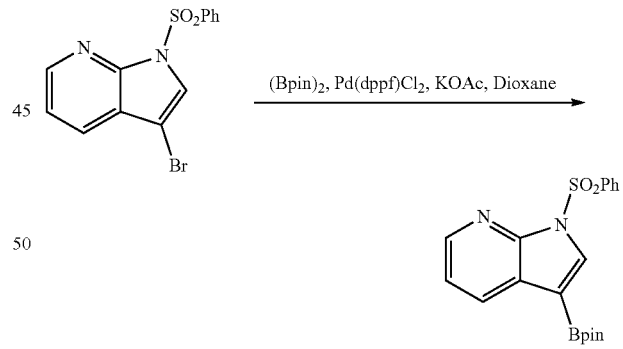

The compound 1-(benzenesulfonyl)-3-bromo-1H-pyrrolo[2,3-b]pyridine (170.00 g, 504.15 mmol), bispinacol boronate (192.00 g, 756.23 mmol), and potassium acetate (98.95 g, 1.01 mol) were dispersed in 1,4-dioxane (1700 mL). Under nitrogen protection, 1,1-bis(diphenylphosphino)ferrocene dichloropalladium (39.23 g, 50.42 mmol) was added at room temperature. The reaction mixture was heated to 100° C. and stirred for 16 hours. Concentration was performed. Residues were purified by means of flash column chromatography (silica gel, the gradient of ethyl acetate/petroleum ether was 0 to 10%) to obtain a white solid compound 1-(benzenesulfonyl)-3-(4,4,5,5-tetramethyl-1,3, 2-dioxaborolan-2-yl)pyrrolo[2,3-b]pyridine (100.00 g, 260.23 mmol, yield: 52%). LCMS (ESI): [M+H]⁺=385.2.

Step 4: (S)-3-((4-(1H-pyrrolo[2,3-b]pyridin-3-yl)-5-(trifluoromethyl)pyrimidin-2-yl)amino)piperidine-1-tert-butyl carboxylate

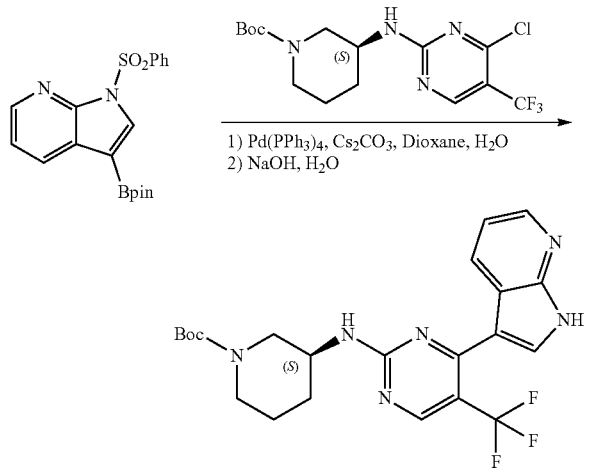

Under nitrogen protection, tetra(triphenylphosphine)palladium (12.69 g, 10.98 mmol) was added to a solution of the compound 1-(benzenesulfonyl)-3-(4,4,5,5-tetramethyl-1,3,2-dioxaborolan-2-yl)pyrrolo[2,3-b]pyridine (46.00 g, 120.80 mmol), (3S)-3-((4-chloro-5-(trifluoromethyl)pyrimidin-2-yl)amino)piperidine-1-tert-butyl formate (42.20 g, 109.82 mmol), and cesium carbonate (71.56 g, 219.63 mmol) in 1,4-dioxane (1400 mL) and water (280 mL). The reaction system was heated to 100° C. and reacted for 16 hours. The reaction mixture was cooled to room temperature. Aqueous sodium hydroxide (5 M, 66 mL, 330.00 mmol) was added. The reaction mixture was heated to 70° C. and stirred for 4 hours. After the reaction mixture was cooled to room temperature, pH was adjusted to 3 with diluted HCl (1 M). Extraction with ethyl acetate (200 mL*2) was performed. Organic phases were merged and dried with anhydrous sodium sulfate. Filtering and filtrate concentration were performed to obtain yellow oily liquid (S)-3-((4-(1H-pyrrolo[2,3-b]pyridin-3-yl)-5-(trifluoromethyl)pyrimidin-2-yl)amino)piperidine-1-tert-butyl carboxylate (16.00 g, 34.60 mmol, yield: 32%). LCMS (ESI): [M+H]⁺=463.3.

Step 5: (3S)-3-(2-((1-(tert-butoxycarbonyl)piperidin-3-yl)-amino-5-(trifluoromethyl)pyrimidin-4-yl)-1H-pyrrolo[2,3-b]pyridine-7-oxide (Intermediate A)

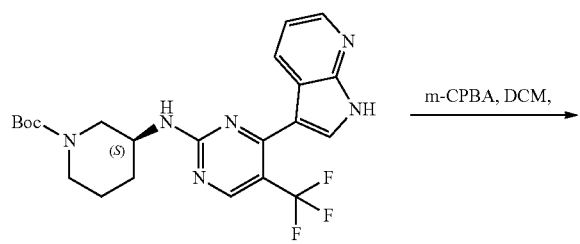

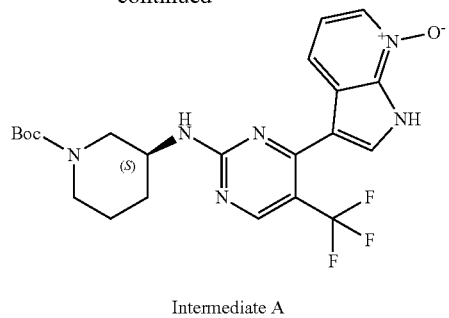

Intermediate A

The compound (S)-3-((4-(1H-pyrrolo[2,3-b]pyridin-3-yl)-5-(trifluoromethyl)pyrimidin-2-yl)amino)piperidine-1-tert-butyl carboxylate (12.00 g, 25.95 mmol) was dissolved in dichloromethane (150 mL). M-chloroperoxybenzoic acid (purity: 85%, 6.32 g, 31.14 mmol) was added at 0° C. The reaction liquid was stirred at 30° C. for 16 hours. The reaction liquid was concentrated. Residues were purified by means of flash column chromatography (silica gel, the gradient of tetrahydrofuran/petroleum ether was 0 to 50%) to obtain a crude product. The crude product was purified again by means of flash column chromatography (C18, the gradient of acetonitrile/water was 0 to 37%) to obtain a white solid pure product (3S)-3-(2-((1-(tert-butoxycarbonyl)piperidin-3-yl)-amino-5-(trifluoromethyl)pyrimidin-4-yl)-1H-pyrrolo[2,3-b]pyridine-7-oxide (purity: 90%, 5.00 g, 9.41 mmol, yield: 36%). LCMS (ESI): [M+H]⁺=479.3.

Preparation of Intermediate B: methyl(3S)-3-(2-((1-(tert-butoxycarbonyl)piperidin-3-yl)-amino-5-(trifluoromethyl)pyrimidin-4-yl)-1H-pyrrolo[2,3-b]pyridine-6-chloro-1-carboxylate

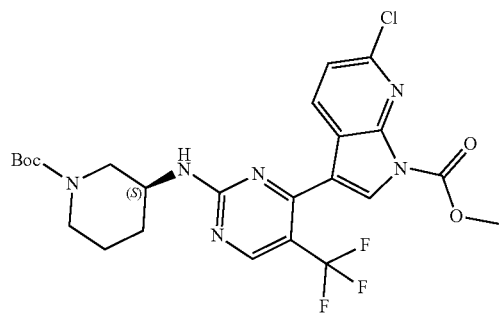

Intermediate B

Step 1: methyl(3S)-3-(2-((1-(tert-butoxycarbonyl)piperidin-3-yl)-amino-5-(trifluoromethyl)pyrimidin-4-yl)-1H-pyrrolo[2,3-b]pyridine-6-chloro-1-carboxylate (Intermediate B)

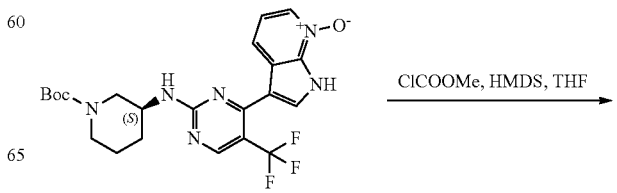

49
-continued

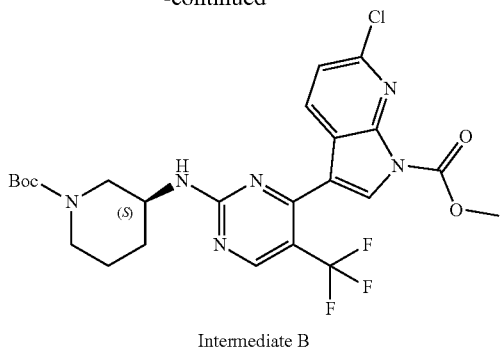

Intermediate B

The compound (3S)-3-(2-((1-(tert-butoxycarbonyl)piperidin-3-yl)-amino-5-(trifluoromethyl)pyrimidin-4-yl)-1H-pyrrolo[2,3-b]pyridine-7-oxide (1.00 g, 1.88 mmol) was dissolved in tetrahydrofuran (12 mL). Under nitrogen protection, hexamethyl disilazane (439 µL, 2.07 mmol) and methyl chloroformate (948 µL, 12.28 mmol) were added at 0° C. The reaction mixture was stirred at 30° C. for 16 hours. A saturated sodium bicarbonate solution (10 mL) was added. Extraction with ethyl acetate (15 mL*3) was performed. Merged organic phases were washed with a saturated salt solution (20 mL). Drying with anhydrous sodium sulfate was performed. Filtering and concentration were performed. Residues were purified by means of flash column chromatography (silica gel, the gradient of tetrahydrofuran/petroleum ether was 0 to 50%) to obtain a white solid compound methyl(3S)-3-(2-((1-(tert-butoxycarbonyl)piperidin-3-yl)-amino-5-(trifluoromethyl)pyrimidin-4-yl)-1H-pyrrolo[2,3-b]pyridine-6-chloro-1-carboxylate (600 mg, 0.92 mmol, yield: 48%). LCMS (ESI): [M+H]$^+$=555.2;

$^1$H NMR (400 MHz, CDCl$_3$) δ ppm 8.71-8.56 (m, 11H), 8.51-8.32 (m, 1H), 8.25 (br s, 1H), 7.45-7.30 (m, 1H), 5.70-5.53 (m, 1H), 4.17 (s, 4H), 3.84-3.70 (m, 1H), 3.45 (br s, 3H), 2.00 (br s, 1H), 1.78 (br s, 1H), 1.55-1.32 (m, 11H).

Preparation of Intermediate C: (S)-3-methyl-4-(3-(2-(methylsulfonyl)-5-(trifluoromethyl)pyrimidin-4-yl)-1-(benzenesulfonyl)-1H-pyrrol[2,3-b]pyridin-6-yl)morpholine Intermediate C

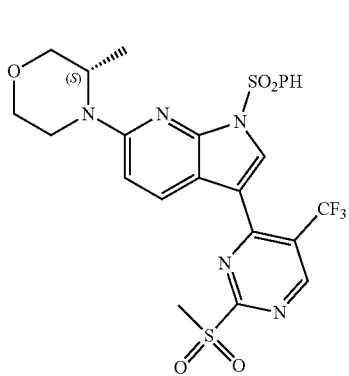

Step 1: 1H-pyrrolo[2,3-b]pyridine-7-oxide

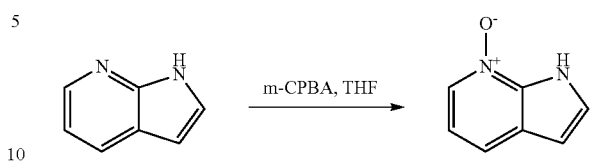

A compound 1H-pyrrol[2,3-b]pyridine (35.00 g, 296.61 mmol) was dissolved in THF (1.20 L). M-chloroperoxybenzoic acid (purity: 85%, 90.00 g, 443.31 mmol) was added. Then, the mixture was stirred at 20° C. for 16 hours. The system was a yellow suspension. Reaction substrates were concentrated to remove a half of solvents with spinning. Solids were filtered out and washed with tetrahydrofuran (50 mL). The solids were dried under vacuum to obtain a white solid crude product (purity: 50%, 35.00 g). The crude product was used directly in the next step without purification. LCMS (ESI): [M+H]$^+$=135.1.

Step 2: (S)-3-methyl-4-(1H-pyrrolo[2,3-b]pyridin-6-yl)morpholine

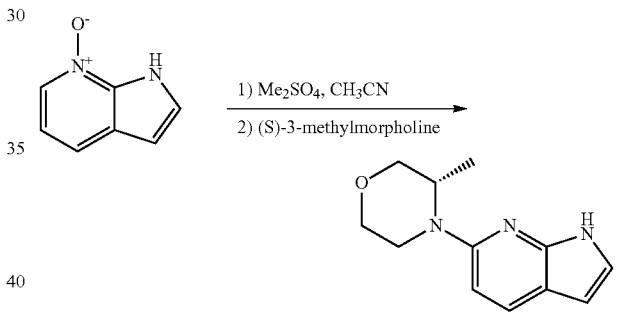

1H-pyrrolo[2,3-b]pyridine-7-oxide (purity: 50%, 55.00 g, 205.07 mmol) was dissolved in acetonitrile (535 mL). Dimethyl sulfate (21 mL, 225.51 mmol) was added. The mixture was heated to 60° C. and stirred for 16 hours. When the mixture was cooled to 0° C., (3S)-3-methylmorpholine (103.68 g, 1.03 mol) was added. The mixture was heated to 60° C. and stirred for 20 hours. Cooling and concentration were performed. Residues were subjected to liquid separation and extraction with dichloromethane (200 mL) and 10% sodium carbonate aqueous solution (200 mL). A water phase was extracted with dichloromethane (200 mL*2). Organic phases were merged and dried with anhydrous magnesium sulfate. Concentration was performed. Residues were purified by means of flash column chromatography (silica gel, the gradient of tetrahydrofuran/petroleum ether was 0 to 25%) to obtain yellow solid (S)-3-methyl-4-(1H-pyrrolo[2,3-b]pyridin-6-yl)morpholine (8.64 g, 39.76 mmol, yield: 19%). LCMS (ESI): [M+H]$^+$=218.1.

$^1$H NMR (400 MHz, CD$_3$OD) δ ppm 7.75 (d, J=8.5 Hz, 1H), 7.03 (d, J=3.3 Hz, 1H), 6.58 (d, J=8.5 Hz, 1H), 6.29 (d, J=3.5 Hz, 1H), 4.31 (q, J=6.5 Hz, 1H), 4.00 (dd, J=3.1, 11.2 Hz, 1H), 3.84-3.71 (m, 3H), 3.65 (dt, J=3.0, 11.4 Hz, 1H), 3.22 (dt, J=3.8, 12.3 Hz, 1H), 1.18 (d, J=6.8 Hz, 3H)

Step 3: (S)-4-(3-iodo-1H-pyrrolo[2,3-b]pyridin-6-yl)-3-methylmorpholine

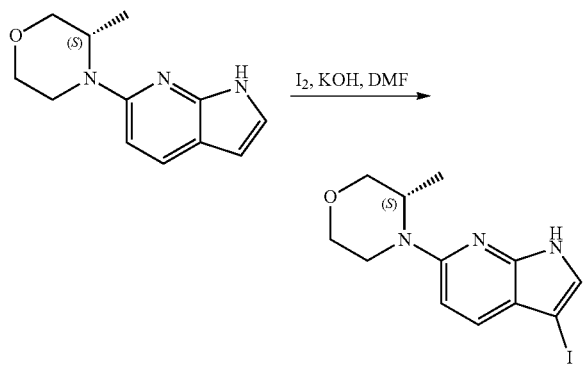

The compound (S)-3-methyl-4-(1H-pyrrolo[2,3-b]pyridin-6-yl)morpholine (8.34 g, 38.39 mmol) was dissolved in dimethylformamide (40 mL). Potassium hydroxide (5.37 g, 95.96 mmol) was added. A solution of iodine (9.75 g, 38.39 mmol) in dimethylformamide (40 mL) was added at 0° C. The reaction mixture was stirred at 25° C. for 1 hour. Concentration was performed. Water (100 mL) was added to residues. Extraction with dichloromethane (100 mL*3) was performed. Organic phases were merged and then dried with magnesium sulfate. Filtering and concentration were performed to obtain a crude compound (S)-4-(3-iodo-1H-pyrrolo[2,3-b]pyridin-6-yl)-3-methylmorpholine (14.70 g). LCMS (ESI): [M+H]$^+$=344.0.

Step 4: (S)-4-(3-iodo-1-benzenesulfonyl-1H-pyrrolo[2,3-b]pyridin-6-yl)-3-methylmorpholine

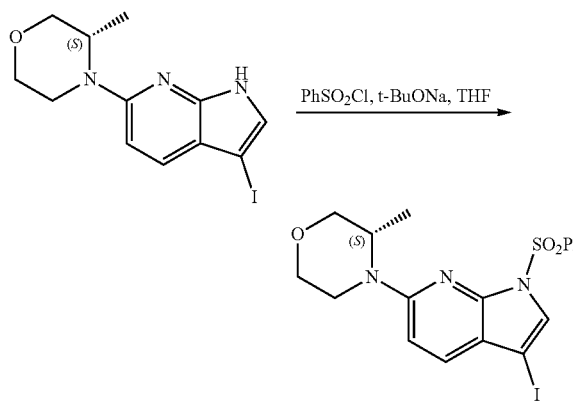

The compound (S)-4-(3-iodo-1H-pyrrolo[2,3-b]pyridin-6-yl)-3-methylmorpholine (14.70 g, 34.27 mmol) was dissolved in tetrahydrofuran (150 mL). Sodium tert-butoxide (4.94 g, 51.40 mmol) was added at 0° C. The mixture was stirred at 0° C. for 30 minutes. Benzene sulfonyl chloride (6.6 mL, 51.40 mmol) was added. The reaction mixture was stirred at 20° C. for 2 hours. Concentration was performed. Residues were purified by means of flash column chromatography (silica gel, the gradient of tetrahydrofuran/petroleum ether was 0 to 40%) to obtain a yellow solid compound (S)-4-(3-iodo-1-benzenesulfonyl-1H-pyrrolo[2,3-b]pyridin-6-yl)-3-methylmorpholine (4.60 g. 9.52 mmol, yield: 28%). LCMS (ESI): [M+H]$^+$=484.0.

Step 5: (S)-3-methyl-4-(3-(2-(methylthio)-5-(trifluoromethyl)pyrimidin-4-yl)-1-(benzenesulfonyl)-1H-pyrrol[2,3-b]pyridin-6-yl)morpholine

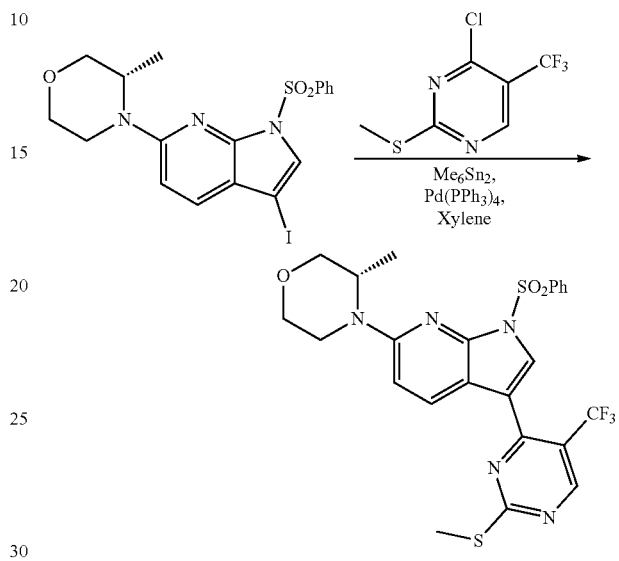

The compound (S)-4-(3-iodo-1-benzenesulfonyl-1H-pyrrolo[2,3-b]pyridin-6-yl)-3-methylmorpholine (500 mg, 1.03 mmol) and 4-chloro-2-(methylthio)-5-(trifluoromethyl)pyrimidine (512 mg, 1.35 mmol) were dissolved in xylene (10 mL). Under nitrogen protection, tetra(triphenylphosphine) palladium (120 mg, 0.10 mmol) and hexamethylditin (407 mg, 1.24 mmol) were added at room temperature. The reaction mixture was stirred at 100° C. for 2 hours and then was heated to 140° C. to continue reacting for 12 hours. The reaction liquid was concentrated. Residues were purified by means of flash column chromatography (silica gel, the gradient of ethyl acetate/petroleum ether was 0 to 50%) to obtain a yellow solid compound (S)-3-methyl-4-(3-(2-(methylthio)-5-(trifluoromethyl)pyrimidin-4-yl)-1-(benzenesulfonyl)-1H-pyrrol[2,3-b]pyridin-6-yl)morpholine (220 mg). LCMS (ESI): [M+H]$^+$=550.3

Step 6: (S)-3-methyl-4-(3-(2-(methylsulfonyl)-5-(trifluoromethyl)pyrimidin-4-yl)-1-(benzenesulfonyl)-1H-pyrrol[2,3-b]pyridin-6-yl)morpholine

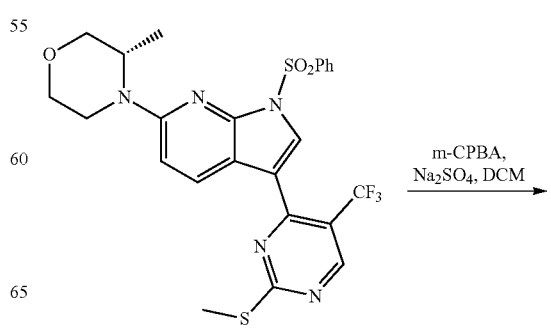

-continued

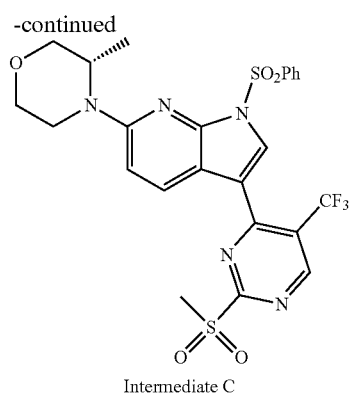

Intermediate C

M-chloroperoxybenzoic acid (purity: 85%, 650 mg, 3.20 mmol) was added in batches at 0° C. to a (59 mL) suspension of the compound (S)-3-methyl-4-(3-(2-(methylthio)-5-(trifluoromethyl)pyrimidin-4-yl)-1-(benzenesulfonyl)-1H-pyrrol[2,3-b]pyridin-6-yl)morpholine (800 mg, 1.46 mmol) and sodium sulfate (202 mg, 1.60 mmol) in dichloromethane. The obtained reaction system was stirred at 25° C. for 40 minutes. Filtering was performed. The filtrate was directly used in the next step. LCMS (ESI): [M+H]$^+$=582.1.

Preparation of Intermediate D: 4-(3-(2-chloro-5-(trifluoromethyl)pyrimidin-4-yl)-1H-pyrrol[2,3-b]pyridin-6-yl)morpholine Intermediate D

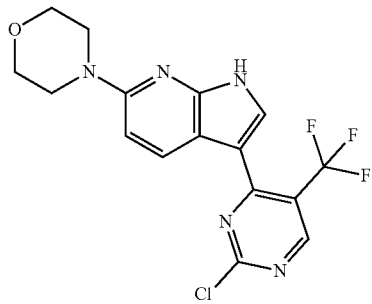

Step 1: 4-(1H-pyrrol[2,3-b]pyridin-6-yl)morpholine

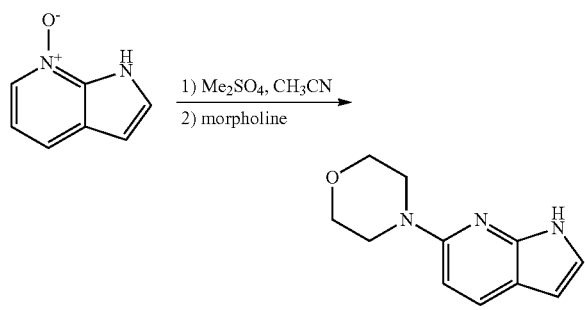

The compound 1H-pyrrolo[2,3-b]pyridine-7-oxide (purity: 50%, 35.00 g, 0.13 mol) was dissolved in acetonitrile (250 mL). Dimethyl sulfate (14 mL, 0.14 mol) was added. Then, the mixture was stirred at 60° C. for 16 hours. The reaction system was cooled to 0° C. Subsequently, morpholine (230 mL, 2.61 mol) was added. Then, the mixture was stirred at 60° C. for 20 hours. The system was a yellow solution. The reaction system was cooled and concentrated. Dichloromethane (300 mL) and 10% sodium carbonate aqueous solution (200 mL) were added to residues. After organic phases were separated, a water phase was extracted with dichloromethane (200 mL*2). The merged organic phases were dried with magnesium sulfate and filtered. The filtrate was spin-dried to obtain 80 g of residues. The residues were purified by means of flash column chromatography (C18, the gradient of acetonitrile/water was 0 to 100%) to obtain yellow solid 4-(1H-pyrrol[2,3-b]pyridin-6-yl)morpholine (13.50 g, 66.44 mmol, yield: 51%). LCMS (ESI): [M+H]$^+$=204.2.

Step 2: 4-(3-iodo-1H-pyrrolo[2,3-b]pyridin-6-yl)morpholine

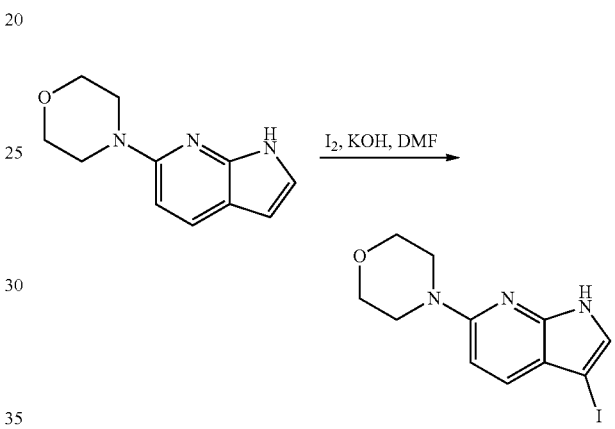

The compound 4-(1H-pyrrol[2,3-b]pyridin-6-yl)morpholine (9.70 g, 47.74 mmol) was dissolved in dimethylformamide (50 mL). Potassium hydroxide (6.66 g, 118.72 mmol) was added. The reaction mixture was stirred for 30 minutes. At 0° C., a solution of elemental iodine (12.10 g, 47.68 mmol) in dimethylformamide (50 mL) was added dropwise to the reaction liquid. The mixture reacted at 20° C. for 1 hour. The reaction liquid was diluted with water (200 mL) and extracted with ethyl acetate (200 mL*3). Organic phases were merged and dried with magnesium sulfate. Filtering was performed. The filtrate was spin-dried to obtain a brown oily crude product 4-(3-iodo-1H-pyrrolo[2,3-b]pyridin-6-yl)morpholine (11.80 g). The crude product was used directly for the reaction in the next step without purification. LCMS (ESI): [M+H]$^+$=330.0.

Step 3: 4-(3-iodo-1-(benzenesulfonyl)-1H-pyrrol[2,3-b]pyridin-6-yl)morpholine

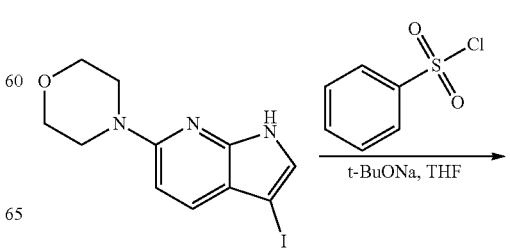

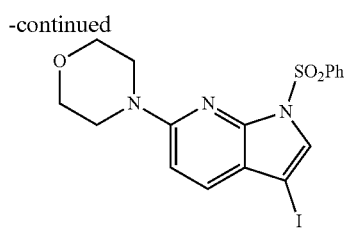

The compound 4-(3-iodo-1H-pyrrolo[2,3-b]pyridin-6-yl)morpholine (14.50 g, 44.06 mmol) was dissolved in tetrahydrofuran (145 mL). Sodium tert-butoxide (6.35 g, 66.08 mmol) was added thereto at 0° C. The mixture was stirred for 30 minutes. Then, benzene sulfonyl chloride (15.50 g, 87.76 mmol) was added at 0° C. The reaction liquid reacted at 20° C. for 2 hours. Then, concentration under reduced pressure was performed to remove solvents with spinning. Residues were purified by means of flash column chromatography (silica gel, the gradient of tetrahydrofuran/petroleum ether was 0 to 25%) to obtain a compound 4-(3-iodo-1-(benzenesulfonyl)-1H-pyrrol[2,3-b]pyridin-6-yl)morpholine (12.70 g. 27.06 mmol, yield: 61%). LCMS (ESI): [M+H]⁺=470.0.

Step 4: 4-(3-(2-(methylthio)-5-(trifluoromethyl)pyrimidin-4-yl)-1-(benzenesulfonyl)-1H-pyrrol[2,3-b]pyridin-6-yl)morpholine

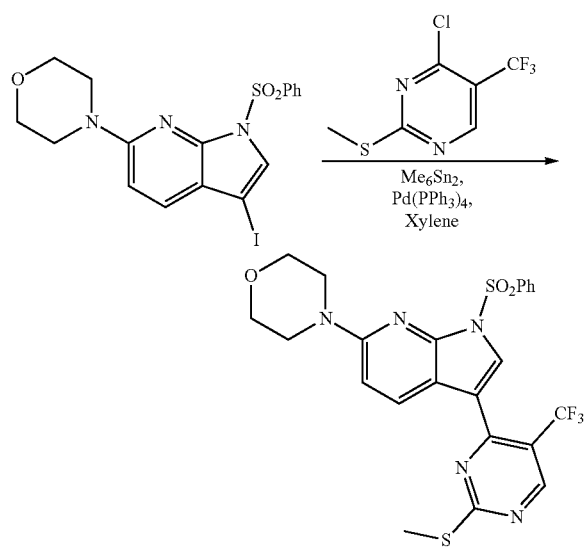

The compound 4-(3-iodo-1-(benzenesulfonyl)-1H-pyrrol[2,3-b]pyridin-6-yl)morpholine (5.50 g, 11.72 mmol) and the compound 4-chloro-2-(methylthio)-5-(trifluoromethyl)pyrimidine (3.48 g, 15.24 mmol) were dissolved in xylene (100 mL). In a nitrogen atmosphere, tetra(triphenylphosphine)palladium (1.35 g, 1.17 mmol) and hexamethylditin (3 mL, 15.24 mmol) were added. Under nitrogen protection, the mixture reacted at 100° C. for 2 hours and then reacted at 140° C. for 14 hours. The system was a black suspension. The system was concentrated under reduced pressure to obtain brown solids. The brown solids were purified by means of flash column chromatography (silica gel, the gradient of ethyl acetate/petroleum ether was 0 to 30%) to obtain a compound 4-(3-(2-(methylthio)-5-(trifluoromethyl)pyrimidin-4-yl)-1-(benzenesulfonyl)-1H-pyrrol[2,3-b]pyridin-6-yl)morpholine (4.10 g, 6.12 mmol, yield: 52%). LCMS (ESI): [M+H]⁺=536.1.

Step 5: 4-(6-morpholinyl-1H-pyrrol[2,3-b]pyridin-3-yl)-5-(trifluoromethyl)pyrimidine-2-ol hydrochloride

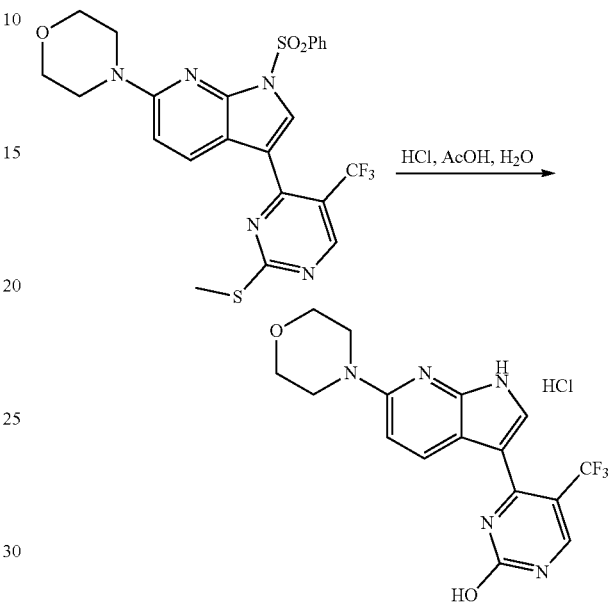

The compound 4-(3-(2-(methylthio)-5-(trifluoromethyl)pyrimidin-4-yl)-1-(benzenesulfonyl)-1H-pyrrol[2,3-b]pyridin-6-yl)morpholine (8.00 g, 14.94 mmol) was dissolved in the mixed liquid of glacial acetic acid (100 mL) and water (50 mL). Concentrated hydrochloric acid (50 mL) was added at room temperature. The obtained reaction liquid was stirred at 100° C. for 16 hours. The reaction liquid was concentrated. Ethyl acetate (40 mL) was added to the obtained residues. The mixture was stirred at room temperature for one hour. Solids were filtered out and dried under vacuum to obtain a crude compound 4-(6-morpholinyl-1H-pyrrol[2,3-b]pyridin-3-yl)-5-(trifluoromethyl)pyrimidine-2-ol hydrochloride (6.80 g). The compound was directly used for the reaction in the next step. LCMS (ESI): [M+H]⁺=366.1.

Step 6: 4-(3-(2-chloro-5-(trifluoromethyl)pyrimidin-4-yl)-1H-pyrrol[2,3-b]pyridin-6-yl)morpholine

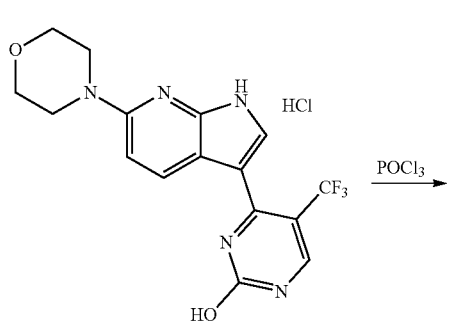

-continued

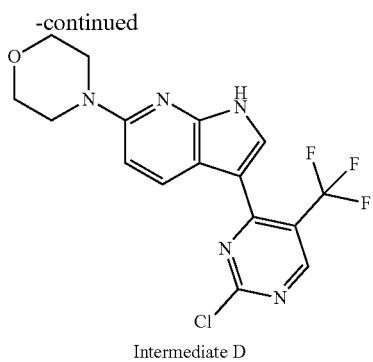

Intermediate D

The compound 4-(6-morpholinyl-1H-pyrrol[2,3-b]pyridin-3-yl)-5-(trifluoromethyl)pyrimidine-2-ol hydrochloride (2.20 g, 6.02 mmol) was dissolved in phosphorus oxychloride (40 mL). The mixture was stirred at 80° C. for 16 hours. The reaction liquid was concentrated. The obtained residues were purified by means of flash column chromatography (silica gel, the gradient of ethyl acetate/petroleum ether was 0 to 90%) to obtain a yellow solid compound 4-(3-(2-chloro-5-(trifluoromethyl)pyrimidin-4-yl)-1H-pyrrol[2,3-b]pyridin-6-yl)morpholine (1.40 g, 2.92 mmol, yield of two steps: 48%). LCMS (ESI): [M+H]⁺=384.1.

¹H NMR (400 MHz, DMSO-d₆) δ ppm 9.00 (s, 1H), 8.58-8.42 (m, 1H), 7.84 (d, J=1.8 Hz, 1H), 6.99-6.81 (m, 1H), 3.79-3.66 (m, 4H), 3.57-3.40 (m, 4H).

Preparation of Intermediate E: (3-(2-chloro-5-(trifluoromethyl)pyrimidin-4-yl)-1H-indol-7-yl)dimethylphosphine oxide Intermediate E

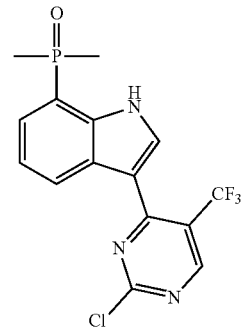

Step 1. (1H-indol-7-yl)dimethylphosphine oxide

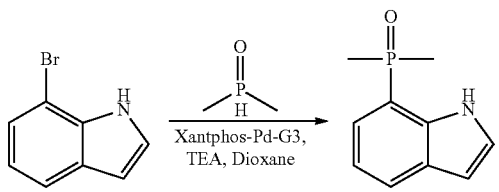

A compound 7-bromo-1H-indole (2.00 g, 10.20 mmol) and dimethylphosphine oxide (2.39 g, 30.60 mmol) were dissolved in 1,4-dioxane (50 mL). Under nitrogen protection, triethylamine (7 mL, 51.00 mmol) and [9,9-dimethyl-4,5-bis(diphenylphosphino)xanthene][2-amino-1,1-diphenyl]palladium(II) methanesulfonate dichloromethane adduct (20 mg, 0.02 mmol) were added at 25° C. The reaction system was heated to 100° C. and reacted for 16 hours. The reaction system was cooled to room temperature and filtered. The filtrate was concentrated. The obtained residues were purified by means of flash column chromatography (silica gel, the gradient of tetrahydrofuran/petroleum ether was 0 to 100%) to obtain a yellow solid compound (1H-indol-7-yl)dimethylphosphine oxide (220 mg, 1.08 mmol, yield: 11%). LCMS (ESI): [M+H]⁺=194.1.

Step 2: (3-(2-chloro-5-(trifluoromethyl)pyrimidin-4-yl)-1H-indol-7-yl)dimethylphosphine oxide

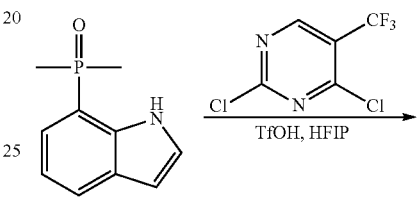

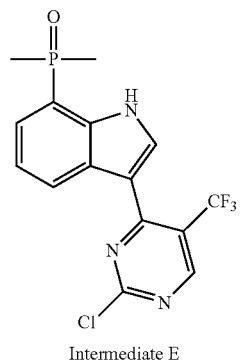

Intermediate E

The compound (1H-indol-7-yl)dimethylphosphine oxide (220 mg, 1.08 mmol) and a compound 2,4-dichloro-5-(trifluoromethyl)pyrimidine (220 uL, 1.63 mmol) were dissolved in hexafluoroisopropanol (10 mL). Trifluoromethanesulfonic acid (106 uL, 1.20 mmol) was added dropwise at 0° C. The reaction system was stirred at 60° C. for 16 hours. The reaction system was cooled to room temperature and poured into a saturated sodium bicarbonate aqueous solution (20 mL) and extracted with ethyl acetate (15 mL*2). Organic phases were merged and dried with magnesium sulfate. Filtering and filtrate concentration were performed. Residues were purified by means of a preparative silica gel plate (the volume ratio of petroleum ether/tetrahydrofuran was 1:2) to obtain a yellow oily compound (3-(2-chloro-5-(trifluoromethyl)pyrimidin-4-yl)-1H-indol-7-yl)dimethylphosphine oxide (200 mg, 0.38 mmol, yield: 34%). LCMS (ESI): [M+H]⁺=374.0.

Preparation of Intermediate F: The following intermediate F (7-bromo-3-(2-chloro-5-(trifluoromethyl)pyrimidin-4-yl)-1H-indole-6-nitrile) was Prepared by Using the Same Method as that in Example 4 of the Patent WO2020093011 A1

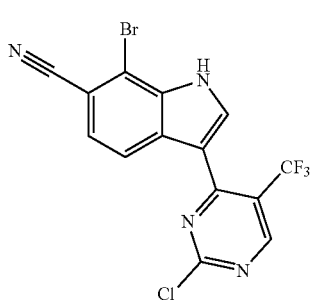

Intermediate F

Compound intermediate F (9.21 g, light yellow solid). LCMS (ESI): [M+H]$^+$=401.2.

$^1$H NMR (400 MHz, DMSO-d$_6$) δ ppm 13.00 (br s, 1H), 9.16 (s, 1H), 8.36 (d, J=8.4 Hz, 1H), 8.16 (d, J=2.4 Hz, 1H), 7.71 (d, J=8.4 Hz, 1H).

Preparation of Intermediate G: 3-(2-(methylsulfonyl)-5-(trifluoromethyl)pyrimidin-4-yl)-1-(benzenesulfonyl)-1H-pyrrol[2,3-b]pyridine-6-formonitrile

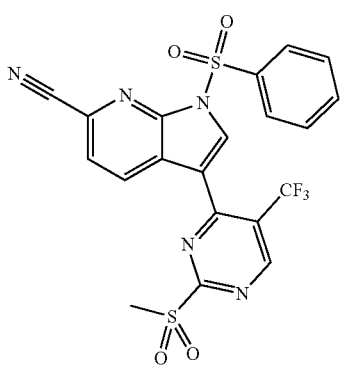

Intermediate G

Step 1: 1 H-pyrrolo[2,3-b]pyridine-6-formonitrile

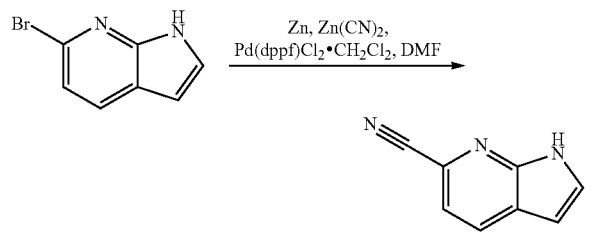

6-bromo-1H-pyrrolo[2,3-b]pyridine (4.00 g, 20.30 mmol), zinc powder (133 mg, 2.03 mmol), zinc cyanide (1.67 g, 14.21 mmol), and a 1,1-bis(diphenylphosphino)ferrocene dichloropalladium and dichloromethane mixture (829 mg, 1.02 mmol) were degassed in dimethylformamide (10 mL) and purged for 3 times with nitrogen. Then, the mixture was stirred at 140° C. for 5 hours under nitrogen protection. The reaction mixture was diluted with ethyl acetate (50 mL) and washed in sequence with a saturated sodium bicarbonate aqueous solution (100 mL) and a saturated salt solution (100 mL*2). The reaction mixture was dried with sodium sulfate and filtered. The filtrate was spin-dried. Residues were purified by means of flash column chromatography (silica gel, the gradient of ethyl acetate/petroleum ether was 10% to 33%) to obtain a white solid compound 1H-pyrrolo[2,3-b]pyridine-6-formonitrile (purity: 85%, 1.50 g, 8.91 mmol, yield: 44%). LCMS (ESI): [M+H]$^+$=144.2.

Step 2: 3-iodo-1H-pyrrolo[2,3-b]pyridine-6-formonitrile

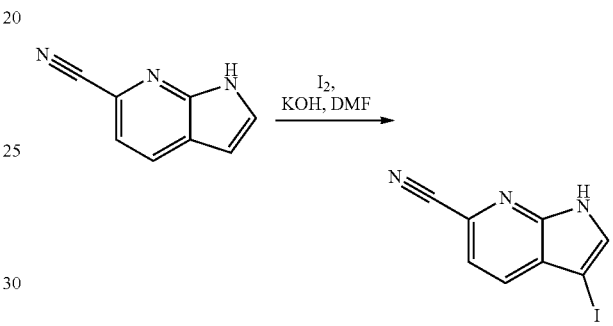

A solution of 1H-pyrrolo[2,3-b]pyridine-6-formonitrile (purity: 85%, 26.00 g, 154.44 mmol) and potassium hydroxide (22.93 g, 408.66 mmol) in dimethylformamide (150 mL) was cooled to 0° C. Then, a solution of elemental iodine (41.49 g, 163.46 mmol) in dimethylformamide (150 mL) was added dropwise. The reaction mixture was stirred at 25° C. for 1 hour. The reaction mixture was subjected to suction filtration. The filtrate was spin-dried. The obtained crude product was washed for three times with water (100 mL*3) and dried under vacuum to obtain a crude compound 3-iodo-1H-pyrrolo[2,3-b]pyridine-6-formonitrile (53.00 g). LCMS (ESI): [M+H]$^+$=270.0.

Step 3: 3-iodo-1-(benzenesulfonyl)-1H-pyrrolo[2,3-b]pyridine-6-formonitrile

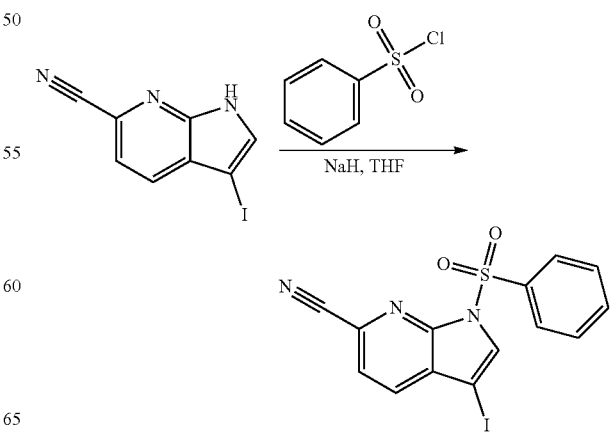

After a (2.50 L) solution of 3-iodo-1H-pyrrolo[2,3-b]pyridine-6-formonitrile (50.00 g, 148.68 mmol) in tetrahydrofuran was cooled to 0° C., sodium hydride (purity: 60%, 10.71 g, 267.63 mmol) was added under nitrogen protection. The benzene sulfonyl chloride (28 mL, 223.01 mmol) was then added. The mixture was stirred at 25° C. for 3 hours. Then, acetic acid (20 mL) and water (200 mL) were added at 0° C. for quenching. Rotary evaporation was performed to remove tetrahydrofuran from the solution. Precipitated solids were filtered out and dried under vacuum to obtain a crude product. The crude product was pulped with methyl tert-butyl ether (100 mL) and filtered to obtain a white solid compound 3-iodo-1-(benzenesulfonyl)-1H-pyrrolo[2,3-b]pyridine-6-formonitrile (45.00 g, 110.04 mmol, yield: 63%). LCMS (ESI): [M+H]$^+$=410.0.

Step 4: 3-(2-methylthio-5-trifluoromethyl pyrimidin-4-yl)-1-(benzenesulfonyl)-1H-pyrrolo[2,3-b]pyridine-6-formonitrile

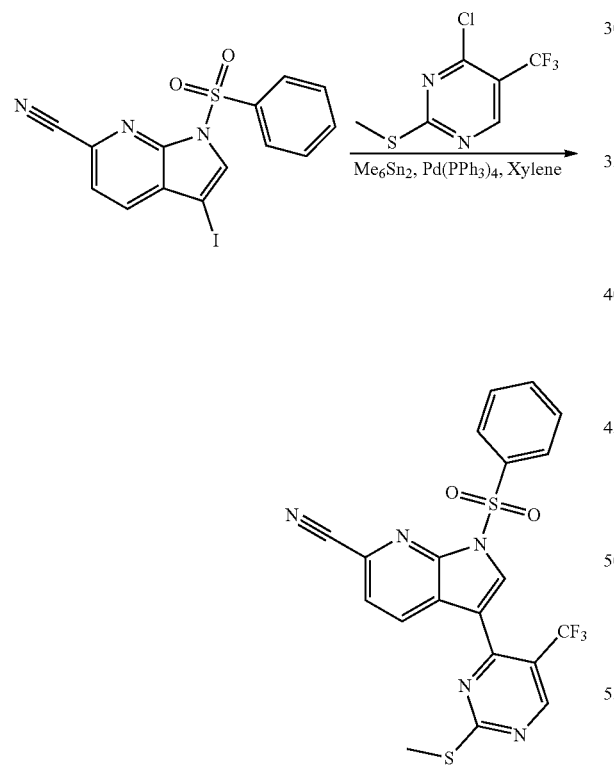

Under nitrogen protection, tetra(triphenylphosphine)palladium (1.27 g, 1.10 mmol) was added to a solution of 3-iodo-1-(benzenesulfonyl)-1H-pyrrolo[2,3-b]pyridine-6-formonitrile (5.00 g, 11.00 mmol), 4-chloro-2-methylthio-5-trifluoromethyl pyrimidine (3.27 g, 14.30 mmol), and hexamethylditin (4.72 g, 14.30 mmol) in xylene (100 mL). Under nitrogen protection, the reaction mixture was stirred at 100° C. for 2 hours and then heated to 140° C. to react for 16 hours. The reaction mixture was spin-dried. Residues were purified by means of flash column chromatography (silica gel, the gradient of tetrahydrofuran/petroleum ether was 5% to 10%) to obtain a yellow solid compound 3-(2-methylthio-5-trifluoromethyl pyrimidin-4-yl)-1-(benzenesulfonyl)-1H-pyrrolo[2,3-b]pyridine-6-formonitrile (3.10 g, 6.52 mmol, yield: 59/a). LCMS (ESI): [M+H]$^+$=476.2.

Step 5: 3-(2-(methylsulfonyl)-5-(trifluoromethyl) pyrimidin-4-yl)-1-(benzenesulfonyl)-1H-pyrrol[2,3-b]pyridine-6-formonitrile

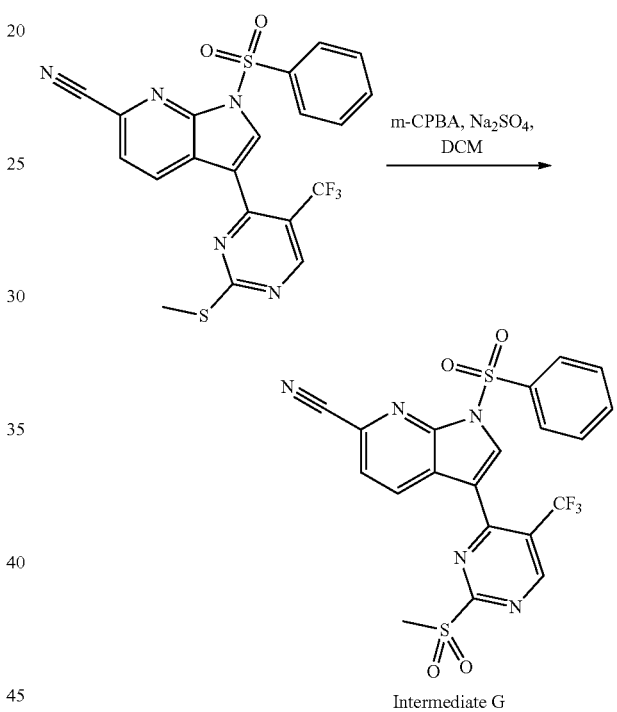

Intermediate G

The compound 3-(2-methylthio-5-trifluoromethyl pyrimidin-4-yl)-1-(benzenesulfonyl)-1H-pyrrolo[2,3-b]pyridine-6-formonitrile (200 mg, 0.42 mmol) was dissolved in dichloromethane (4 mL). M-chloroperoxybenzoic acid (purity: 80%, 181 mg, 0.84 mmol) and sodium sulfate (50 mg, 0.35 mmol) were added. The obtained reaction system was stirred at 20° C. for 2 hours. A saturated sodium sulfite solution (1 mL) and a saturated sodium bicarbonate solution (5 mL) were added to the reaction liquid. Extraction with ethyl acetate (10 mL*3) was performed. Organic phases were merged and concentrated to obtain a yellow oily crude compound 3-(2-(methylsulfonyl)-5-(trifluoromethyl)pyrimidin-4-yl)-1-(benzenesulfonyl)-1H-pyrrol[2,3-b]pyridine-6-formonitrile (230 mg). The crude product was directly used for the reaction in the next step. LCMS (ESI): [M+H]$^+$=508.0.

Preparation of Intermediate H: 3,5-dimethyl-4-(3-(2-methylsulfonyl-5-trifluoromethyl pyrimidin-4-yl)-1-benzenesulfonyl-1H-pyrrol[2,3-b]pyridin-6-yl)isoxazole

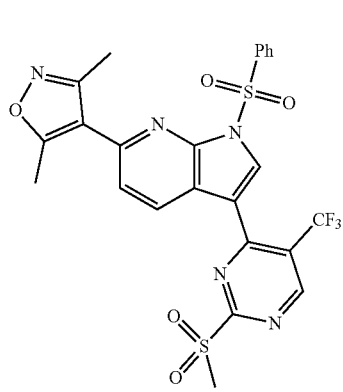

Intermediate H

The intermediate H was prepared by using the same synthesis method in Example 11 of the patent WO2019143719.

Preparation of Intermediate J: Tert-butyl(S)-3-((4-(6-chloro-1-(benzenesulfonyl)-1H-pyrrol[2,3-b]pyridin-3-yl)-5-(trifluoromethyl)pyrimidin-2-yl)amino)piperidine-1-carboxylate

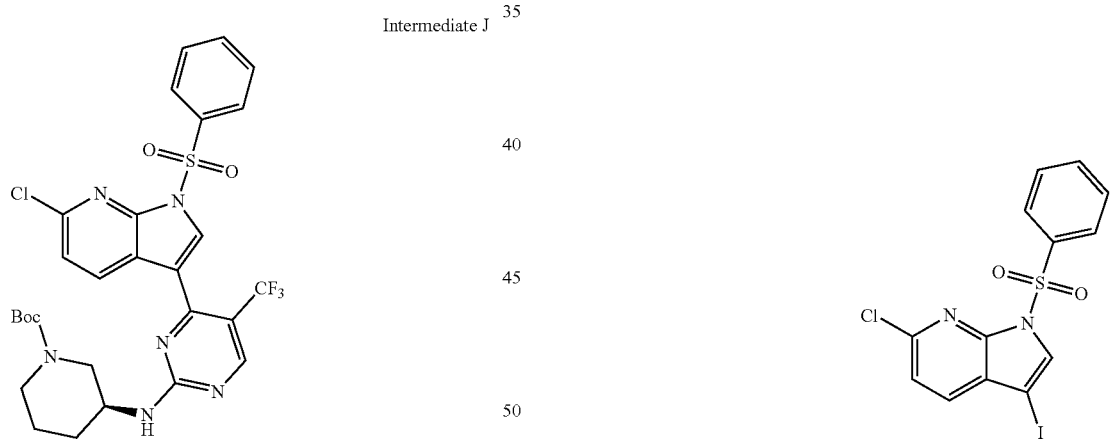

Intermediate J

Step 1: 6-chloro-3-iodo-1H-pyrrol[2,3-b]pyridine

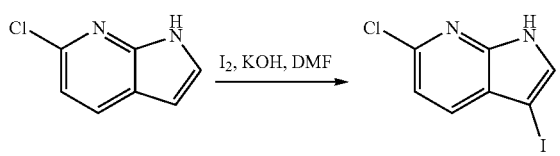 [SMILES: Clc1ccc2cc[nH]c2n1 ; Clc1ccc2c(I)c[nH]c2n1]

A solution of a compound 6-chloro-1H-pyrrol[2,3-b]pyridine (5.00 g, 32.77 mmol) and potassium hydroxide (5.52 g, 98.31 mmol) in dimethylformamide (50 mL) was cooled to 0° C. Then, a solution of elemental iodine (8.32 g, 32.77 mmol) in dimethylformamide (50 mL) was added dropwise. The reaction mixture was stirred at 25° C. for 1 hour. The reaction mixture was quenched with 10% sodium sulfite aqueous solution (100 mL). The mixture was extracted with dichloromethane (100 mL*3) and spin-dried. The crude product was washed with water (20 mL*3) and filtered. The obtained solids were dried under vacuum to obtain a yellow solid compound 6-chloro-3-iodo-1H-pyrrol[2,3-b]pyridine (7.30 g, 23.60 mmol, yield: 72%). LCMS (ESI): [M+H]⁺= 278.9;

Step 2: 6-chloro-3-iodo-1-(benzenesulfonyl)-1H-pyrrol[2,3-b]pyridine

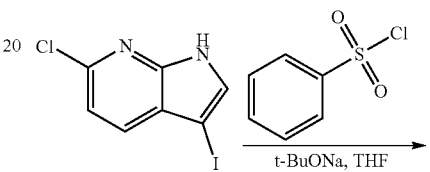

Sodium tert-butoxide (0.98 g, 10.23 mmol) was added to a solution of the compound 6-chloro-3-iodo-1H-pyrrol[2,3-b]pyridine (2.00 g, 6.82 mmol) in tetrahydrofuran (20 mL). The reaction liquid was stirred at 25° C. for 30 minutes. The reaction liquid was then cooled to 0° C. Benzene sulfonyl chloride (1.81 g, 10.23 mmol) was added. The mixture was stirred at 25° C. for 4 hours. Rotary evaporation was performed to remove tetrahydrofuran from the solution. Water (20 mL) was added to residues. Solids were filtered out to obtain a crude product. The crude product was pulped with methyl tert-butyl ether (10 mL) and filtered to obtain a white solid compound 6-chloro-3-iodo-1-(benzenesulfonyl)-1H-pyrrol[2,3-b]pyridine (2.55 g, 5.71 mmol, yield: 85%). LCMS (ESI): [M+H]⁺=418.9;

Step 3: tert-butyl(S)-3-((4-(6-chloro-1-(benzenesulfonyl)-1H-pyrrol[2,3-b]pyridin-3-yl)-5-(trifluoromethyl)pyrimidin-2-yl)amino)piperidine-1-carboxylate

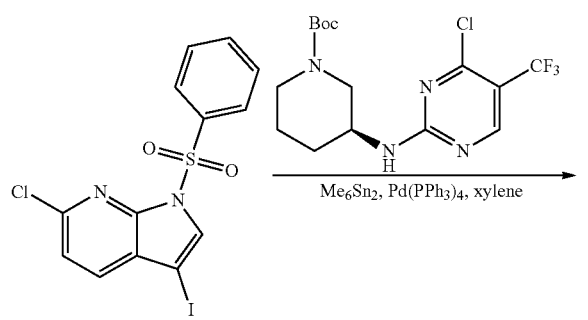

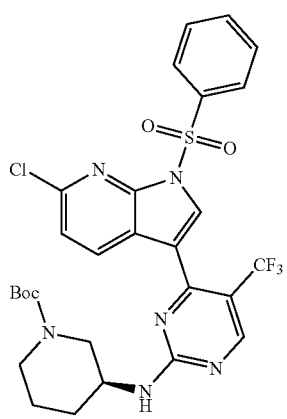

Under nitrogen protection, tetra(triphenylphosphine)palladium (0.28 g, 0.24 mmol) was added to a solution of the compound 6-chloro-3-iodo-1-(benzenesulfonyl)-1H-pyrrol[2,3-b]pyridine (1.00 g, 2.39 mmol), tert-butyl(S)-3-((4-chloro-5-(trifluoromethyl)pyrimidin-2-yl)amino)piperidine-1-carboxylate (1.18 g, 3.11 mmol), and hexamethylditin (1.02 g, 3.11 mmol) in xylene (10 mL). Under nitrogen protection, the reaction mixture was heated to 100° C. and stirred for 2 hours. Then, the reaction mixture was heated to 140° C. to react for 16 hours. The reaction mixture was spin-dried. Residues were purified by means of flash column chromatography (silica gel, the gradient of ethyl acetate/petroleum ether was 0 to 25%) to obtain a yellow solid compound tert-butyl(S)-3-((4-(6-chloro-1-(benzenesulfonyl)-1H-pyrrol[2,3-b]pyridin-3-yl)-5-(trifluoromethyl)pyrimidin-2-yl)amino)piperidine-1-carboxylate (0.53 g, 0.74 mmol, yield: 31%). LCMS (ESI): [M+H]$^+$=637.3.

Example 1. (S)-4-(6-morpholinyl-1H-pyrrolo[2,3-b]pyridin-3-yl)-N-(piperidin-3-yl)-5-(trifluoromethyl)pyrimidine-2-amine (Compound 1)

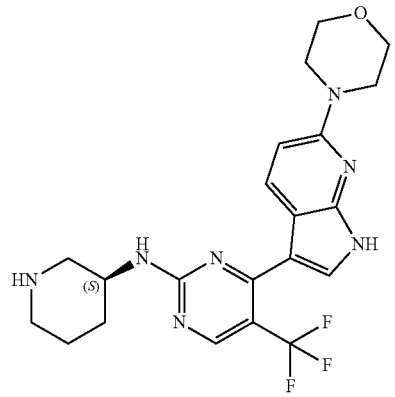

Step 1: tert-butyl(S)-3-((4-(6-morpholinyl-1H-pyrrolo[2,3-b]pyridin-3-yl)-5-(trifluoromethyl)pyrimidin-2-yl)amino)piperidine-1-carboxylate (3S)-3-(2-((1-(tert-butoxycarbonyl)piperidin-3-yl)-amino-5-(trifluoromethyl)pyrimidin-4-yl)-1H-pyrrolo[2,3-b]pyridine-7-oxide (150 mg, 0.31 mmol) was dissolved in acetonitrile (400 uL). Dimethyl sulfate (33 uL, 0.34 mmol) was added. The reaction liquid was stirred at 80° C. for 16 hours. Then, the reaction liquid was cooled to 0° C. Subsequently, morpholine (441 uL, 5.02 mmol) was added. Then, the reaction liquid reacted at 80° C. for 16 hours. Two batches of the same reaction liquid were cooled to room temperature and concentrated to obtain a brown oily crude product tert-butyl(S)-3-((4-(6-morpholinyl-1H-pyrrolo[2,3- b]pyridin-3-yl)-5-(trifluoromethyl)pyrimidin-2-yl)amino)piperidine-1-carboxylate (300 mg). LCMS (ESI): [M+H]+= 548.3

Step 2: (S)-4-(6-morpholinyl-1H-pyrrolo[2,3-b]pyridin-3-yl)-N-(piperidin-3-yl)-5-(trifluoromethyl)pyrimidine-2-amine

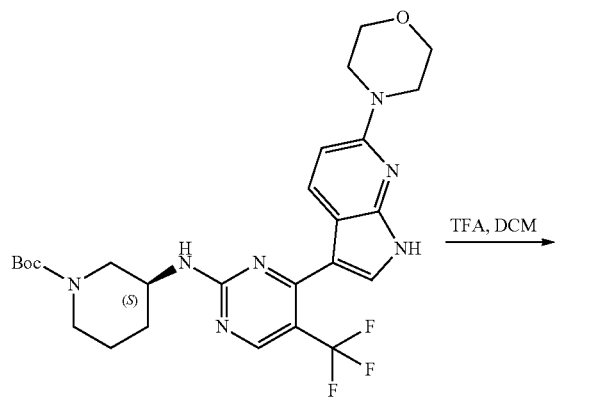

The compound tert-butyl(S)-3-((4-(6-morpholinyl-1H-pyrrolo[2,3-b]pyridin-3-yl)-5-(trifluoromethyl)pyrimidin-2-yl)amino)piperidine-1-carboxylate (purity: 55%, 300 mg, 0.30 mmol) was dissolved in dichloromethane (5 mL). Trifluoroacetic acid (895 ul, 12.05 mmol) was added. Then, the mixture was stirred at 20° C. for 16 hours. The reaction mixture was concentrated. Residues were purified by means of preparative HPLC to obtain red solid (S)-4-(6-morpholino-1H-pyrrolo[2,3-b]pyridin-3-yl)-N-(piperidin-3-yl)-5-(trifluoromethyl)pyrimidine-2-amine (53.11 mg, 0.12 mmol, yield: 40%). LCMS (ESI): [M+H]+=448.3;

$^1$H NMR (400 MHz, CD$_3$OD) δ ppm 8.60-8.47 (m, 2H), 7.72 (s, 1H), 6.79 (br d, J=8.8 Hz, 1H), 4.35 (m, 1H), 3.91-3.76 (m, 5H), 3.62-3.49 (m, 5H), 3.12-2.91 (m, 2H), 2.27-2.02 (m, 2H), 1.95-1.69 (m, 2H).

(3S)-3-(2-((1-(tert-butoxycarbonyl)piperidin-3-yl)-amino-5-(trifluoromethyl)pyrimidin-4-yl)-1H-pyrrolo[2,3-b]pyridine-7-oxide (intermediate A) reacted with suitable amine compounds to prepare the following compounds by using the same synthesis method for synthesizing compound I:

Example 2. 4-(6-((1R,4R)-2-oxa-5-azabicyclo[2.2.1]heptan-5-yl)-1H-pyrrolo[2,3-b]pyridin-3-yl)-N-((S)-piperidin-3-yl)-5-(trifluoromethyl)pyrimidine-2-amine (Compound 2)

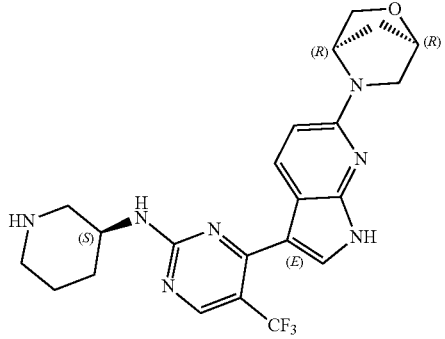

Compound 2 (53.11 mg, red solid). LCMS (ESI): [M+H]+= 460.2.

$^1$H NMR (400 MHz, CD$_3$OD) δ ppm 8.66-8.41 (m, 2H) 7.66 (s, 1H) 6.53 (br s, 1H) 4.73 (s, 1H) 4.10 (br s, 1H) 3.83-3.95 (m, 2H) 3.55-3.69 (m, 1H) 3.55-3.69 (m, 1H) 3.42 (br d, J=9.78 Hz, 1H) 3.25 (br d, J=11.98 Hz, 1H) 2.92-3.04 (m, 1H) 2.55-2.71 (m, 2H) 1.95-2.23 (m, 3H) 1.75-1.88 (m, 1H) 1.51-1.72 (m, 2H)

Example 3. (S)-1-(3-(2-(piperidin-3-yl amino)-5-(trifluoromethyl)pyrimidin-4-yl)-1H-pyrrolo[2,3-b]pyridin-6-yl)piperidin-4-ol (Compound 3)

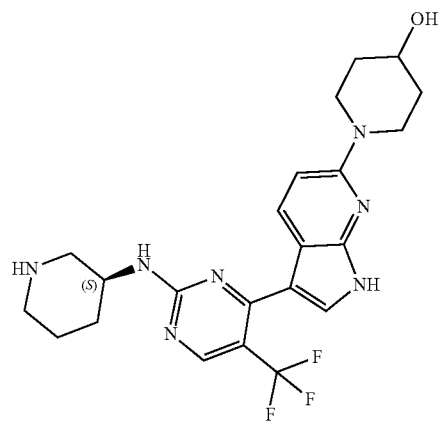

Compound 3 (56.76 mg, yellow solid). LCMS (ESI): [M+H]+=462.2.

$^1$H NMR (400 MHz, CD$_3$OD), δ ppm 8.54-8.30 (m, 2H), 7.60 (s, 1H), 6.74 (br s, 1H), 4.12-4.01 (m, 1H), 4.07 (m, 2H), 3.80-3.71 (m, 1H), 3.16 (br d, J=11.4 Hz, 1H), 3.06 (br t, J=10.9 Hz, 2H), 2.87 (br d, J=12.6 Hz, 1H), 2.61-2.45 (m, 2H), 2.12-1.95 (m, 1H), 1.88 (br dd, J=12.5, 3.1 Hz, 2H), 1.77-1.64 (m, 1H), 1.62-1.40 (m, 4H)

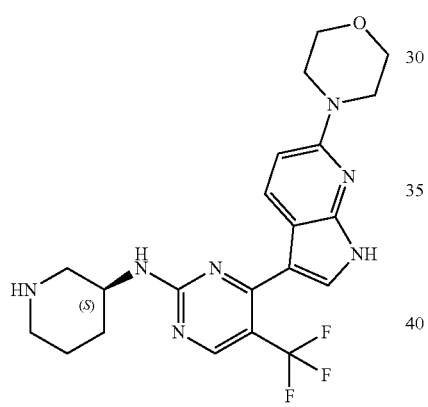

Example 4. (S)-1-(3-(2-(piperidin-3-yl amino)-5-(trifluoromethyl)pyrimidin-4-yl)-1H-pyrrolo[2,3-b]pyridin-6-yl)piperidin-4-yl)methanol (Compound 4)

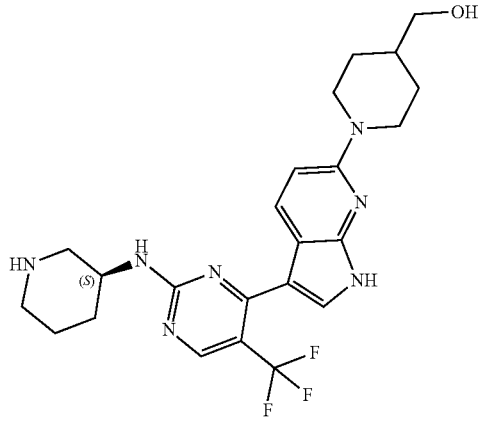

Compound 4 (55.55 mg, yellow solid). LCMS (ESI): [M+H]+=476.3.

¹H NMR (400 MHz, CD₃OD), δ ppm 8.68-8.37 (m, 2H), 7.69 (s, 1H), 6.82 (br s, 1H), 4.39 (br d, J=12.6 Hz, 2H), 4.24-3.94 (m, 1H), 3.46 (d, J=6.4 Hz, 2H), 3.25 (br d, J=11.8 Hz, 1H), 3.01-2.81 (m, 3H), 2.68-2.51 (m, 2H), 2.24-2.00 (m, 1H), 1.88-1.50 (m, 6H), 1.32 (qd, J=12.3, 3.9 Hz, 2H)

Example 5. N—((S)-piperidin-3-yl)-4-(6-(tetrahydro-1H-furan[3,4-c]pyrrol-5(3H)-yl)-1H-pyrrolo[2,3-b]pyridin-3-yl)-5-(trifluoromethyl)pyrimidine-2-amine (Compound 5)

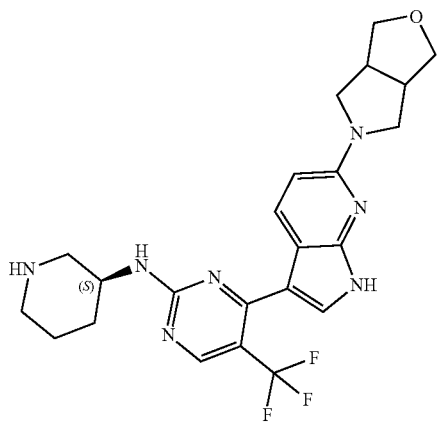

Compound 5 (19.05 mg, yellow solid). LCMS (ESI): [M+H]+=474.2.

¹H NMR (400 MHz, CD₃OD), δ ppm 8.51-8.29 (m, 2H), 7.56 (s, 1H), 6.45 (br s, 1H), 3.90 (m, 3H), 3.63-3.52 (m, 4H), 3.40 (m, 2H), 3.15 (m, 1H), 3.02 (m, 2H), 2.86 (br d, J=12.9 Hz, 1H), 2.60-2.42 (m, 2H), 2.16-1.95 (m, 1H), 1.78-1.68 (m, 1H), 1.62-1.40 (m, 2H).

Example 6. 3-methyl-1-(3-(2-(((S)-piperidin-3-yl)amino)-5-(trifluoromethyl)pyrimidin-4-yl)-1H-pyrrolo[2,3-b]pyridin-6-yl)pyrrolidin-3-ol (Compound 6)

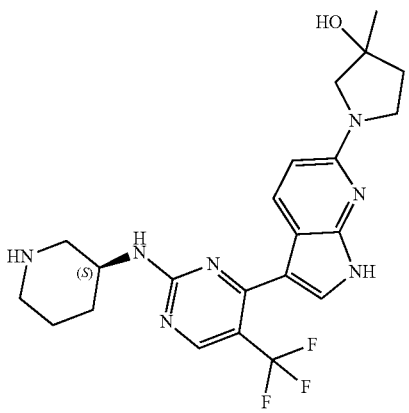

Compound 6 (56.83 mg, yellow solid). LCMS (ESI): [M+H]+=462.2.

¹H NMR (400 MHz, CD₃OD), δ ppm 8.63-8.32 (m, 2H), 7.63 (s, 1H), 6.46 (br s, 1H), 4.11 (br s, 1H), 3.74-3.63 (m, 2H), 3.60-3.54 (m, 1H), 3.46 (m, 1H), 3.26 (m, 1H), 2.98 (br s, 1H), 2.70-2.54 (m, 2H), 2.20-2.00 (m, 3H), 1.87-1.77 (m, 1H), 1.70-1.54 (m, 2H), 1.49 (s, 3H).

Example 7. 4-(6-(2-oxa-7-azaspiro[4.5]decan-7-yl)-1H-pyrrolo[2,3-b]pyridin-3-yl)-N—((S)-piperidin-3-yl)-5-(trifluoromethyl)pyrimidine-2-amine (Compound 7)

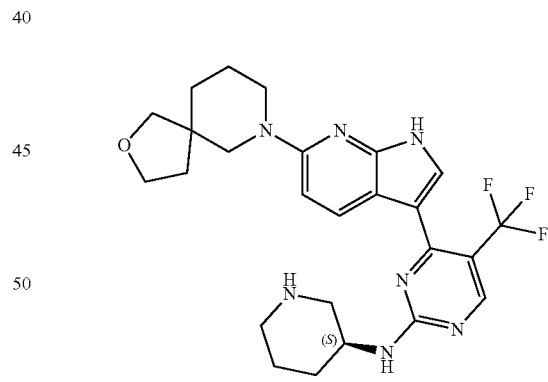

Compound 7 (16.15 mg, yellow solid). LCMS (ESI): [M+H]+=502.2.

¹H NMR (400 MHz, CD₃OD): δ ppm 8.64-8.43 (m, 2H), 7.69 (s, 1H), 6.90-6.74 (m, 1H), 4.12 (br s, 1H), 3.99 (q, J=7.6 Hz, 1H), 3.88 (m, 1H), 3.78 (m, 1H), 3.65 (br s, 1H), 3.60-3.54 (m, 1H), 3.53-3.42 (m, 3H), 3.30-3.22 (m, 1H), 2.98 (m, 1H), 2.64 (m, 2H), 2.20-2.06 (m, 1H), 1.94 (m, 1H), 1.88-1.80 (m, 1H), 1.76 (s, 1H), 1.75-1.66 (m, 5H), 1.62 (m, 1H).

Example 8. (S)-4-(6-(2-oxa-6-azaspiro[3.4]octan-6-yl)-1H-pyrrolo[2,3-b]pyridin-3-yl)-N-(piperidin-3-yl)-5-(trifluoromethyl)pyrimidine-2-amine (compound 8)

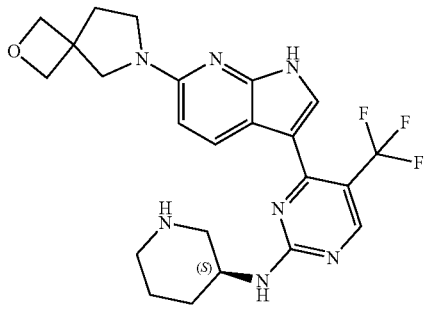

Compound 8 (9.35 mg, yellow solid). LCMS (ESI): [M+H]⁺=474.2.

¹H NMR (400 MHz, CD₃OD): δ ppm 8.54 (s, 2H), 7.65 (s, 1H), 6.47 (br d, J=8.3 Hz, 1H), 4.76-4.73 (m, 2H), 4.72-4.68 (m, 2H), 4.32 (br s, 1H), 3.79 (s, 2H), 3.58-3.47 (m, 3H), 3.27 (br d, J=12.0 Hz, 1H), 3.04-2.91 (m, 2H), 2.36 (t, J=6.9 Hz, 2H), 2.26-2.14 (m, 1H), 2.11-2.01 (m, 1H), 1.91-1.81 (m, 1H), 1.75 (br d, J=10.5 Hz, 1H).

Example 9. (S)-4-(6-(2-oxa-8-azaspiro[4.5]decan-8-yl)-1H-pyrrolo[2,3-b]pyridin-3-yl)-N-(piperidin-3-yl)-5-(trifluoromethyl)pyrimidine-2-amine (Compound 9)

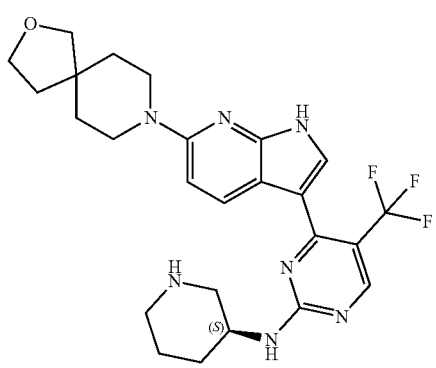

Compound 9 (23.92 mg, white solid). LCMS (ESI): [M+H]⁺=502.3.

¹H NMR (400 MHz, CD₃OD): δ ppm 8.65-8.43 (m, 2H), 7.70 (s, 1H), 6.89-6.76 (m, 1H), 4.18-4.00 (m, 1H), 3.92 (t, J=7.2 Hz, 2H), 3.72-3.64 (m, 2H), 3.63 (s, 2H), 3.61-3.54 (m, 2H), 3.30-3.21 (m, 1H), 2.97 (br d, J=12.8 Hz, 1H), 2.68-2.55 (m, 2H), 2.23-2.05 (m, 1H), 1.91-1.79 (m, 3H), 1.72 (br t, J=5.4 Hz, 4H), 1.67-1.57 (m, 2H).

Example 10. (S)-4-(6-(9-oxa-2-azaspiro[5.5]undecan-2-yl)-1H-pyrrolo[2,3-b]pyridin-3-yl)-N-(piperidin-3-yl)-5-(trifluoromethyl)pyrimidine-2-amine (Compound 10)

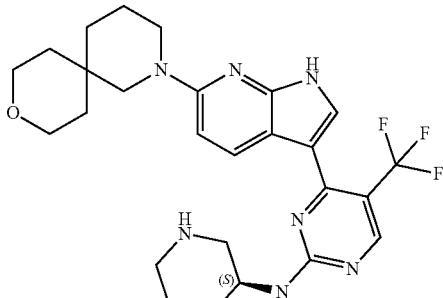

Compound 10 (10.64 mg, yellow solid). LCMS (ESI): [M+H]⁺=516.3.

¹H NMR (400 MHz, CD₃OD): δ ppm 8.49 (br s, 2H), 7.66 (s, 1H), 6.84-6.73 (m, 1H), 4.20-4.10 (m, 1H), 3.83-3.56 (m, 9H), 3.05 (br d, J=12.8 Hz, 1H), 2.77-2.66 (m, 2H), 2.20-2.09 (m, 1H), 1.93-1.85 (m, 1H), 1.77-1.69 (m, 3H), 1.65-1.55 (m, 5H), 1.51 (m, 2H).

Example 11. (S)-4-(6-(6-oxa-2-azaspiro[3.4]octan-2-yl)-1H-pyrrolo[2,3-b]pyridin-3-yl)-N-(piperidin-3-yl)-5-(trifluoromethyl)pyrimidine-2-amine (Compound 11)

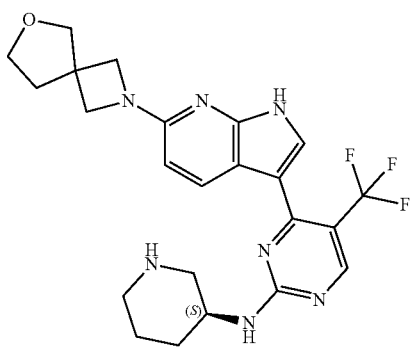

Compound 11 (19.51 mg, white solid). LCMS (ESI): [M+H]⁺=474.3.

¹H NMR (400 MHz, CD₃OD): δ ppm 8.55 (s, 2H), 7.68 (s, 1H), 6.37 (br d, J=8.0 Hz, 1H), 4.34 (br s, 1H), 4.03 (s, 4H), 3.93 (s, 2H), 3.89 (t, J=7.0 Hz, 2H), 3.61-3.36 (m, 1H), 3.31-3.23 (m, 1H), 3.09-2.92 (m, 2H), 2.24 (t, J=6.9 Hz, 2H), 2.18 (br d, J=6.8 Hz, 1H), 2.11-2.03 (m, 1H), 1.92-1.83 (m, 1H), 1.82-1.69 (m, 1H).

Example 12. (3S,4S)-3-methyl-8-(3-(2-(((S)-piperidin-3-yl)amino)-5-(trifluoromethyl)pyrimidin-4-yl)-1H-pyrrol[2,3-b]pyridin-6-yl)-2-oxa-8-azaspiro[4.5]decan-4-amine (Compound 12)

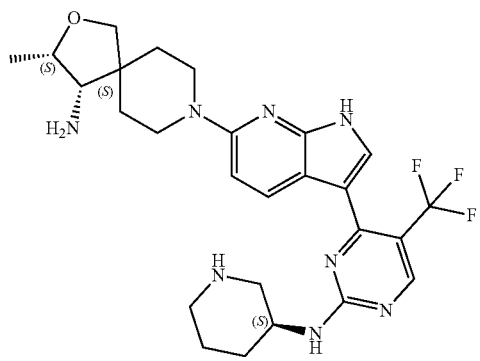

Compound 12 (14.98 mg, brown solid). LCMS (ESI): [M+H]$^+$=531.3.

$^1$H NMR (400 MHz, CD$_3$OD): δ ppm 8.54 (s, 2H), 7.71 (s, 1H), 6.82 (br d, J=8.8 Hz, 1H), 4.41-4.25 (m, 2H), 4.23-4.06 (m, 2H), 3.96 (d, J=9.0 Hz, 1H), 3.84 (d, J=9.0 Hz, 1H), 3.49-3.63 (m, 1H), 3.26-3.32 (m, 2H), 2.95-3.23 (m, 4H), 2.15-2.26 (m, 1H), 2.03-2.13 (m, 1H), 1.68-1.92 (m, 6H), 1.31 (d, J=6.5 Hz, 3H).

Example 13. 4-(6-((1S,4S)-2-oxa-5-azabicyclo[2.2.1]heptan-5-yl)-1H-pyrrolo[2,3-b]pyridin-3-yl)-N—((S)-piperidin-3-yl)-5-(trifluoromethyl)pyrimidine-2-amine (Compound 13)

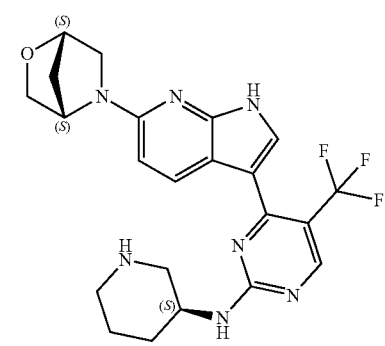

Compound 13 (17.77 mg, black solid). LCMS (ESI): [M+H]$^+$=460.2.

$^1$H NMR (400 MHz, CD$_3$OD): δ ppm 8.54 (s, 2H), 7.66 (s, 1H), 6.50 (br d, J=8.5 Hz, 1H), 4.72 (s, 1H), 4.35 (br s, 1H), 3.94-3.87 (m, 2H), 3.62 (d, J=9.8 Hz, 1H), 3.54 (br d, J=10.8 Hz, 1H), 3.46-3.35 (m, 1H), 3.33-3.25 (m, 2H), 3.10-2.93 (m, 2H), 2.27-2.14 (m, 1H), 2.11-2.02 (m, 2H), 2.02-1.96 (m, 1H), 1.91-1.83 (m, 1H), 1.82-1.70 (m, 1H).

Example 14. (S)-4-(6-(2-oxa-6-azaspiro[3.3]heptan-6-yl)-1H-pyrrolo[2,3-b]pyridin-3-yl)-N-(piperidin-3-yl)-5-(trifluoromethyl)pyrimidine-2-amine (Compound 14)

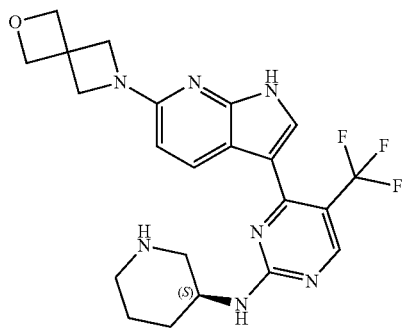

Compound 14 (27.03 mg, white solid). LCMS (ESI): [M+H]$^+$=460.2.

$^1$H NMR (400 MHz, CD$_3$OD), δ ppm 8.64-8.39 (m, 2H), 7.67 (s, 1H), 6.39 (br s, 1H), 4.88-4.84 (m, 4H), 4.22 (s, 4H), 4.06 (m, 1H), 3.27-3.23 (m, 1H), 2.96 (m, 1H), 2.69-2.55 (m, 2H), 2.13 (br s, 1H), 1.87-1.78 (m, 1H), 1.71-1.52 (m, 2H).

Example 15. (S)-4-(6-(2-oxa-7-azaspiro[3.5]nonan-7-yl)-1H-pyrrolo[2,3-b]pyridin-3-yl)-N-(piperidin-3-yl)-5-(trifluoromethyl)pyrimidine-2-amine (Compound 15)

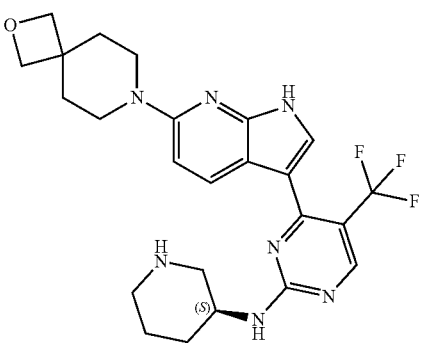

Compound 15 (43.52 mg, yellow solid). LCMS (ESI): [M+H]$^+$=488.3.

1H NMR (400 MHz, CD$_3$OD), δ ppm 8.51 (m, 2H), 7.69 (br s, 1H), 6.80 (br s, 1H), 4.51 (br s, 4H), 4.22 (br s, 1H), 3.54 (br s, 4H), 3.40 (br s, 1H), 3.14 (br s, 1H), 2.83 (br s, 2H), 2.16 (br s, 2H), 1.96 (br s, 4H), 1.76 (br s, 2H).

Example 16. (S)-4-(6-(1-oxa-7-azaspiro[3.5]nonan-7-yl)-1H-pyrrolo[2,3-b]pyridin-3-yl)-N-(piperidin-3-yl)-5-(trifluoromethyl)pyrimidine-2-amine (Compound 16)

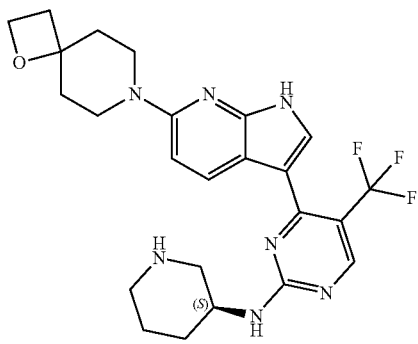

Compound 16 (3.52 mg, yellow solid). LCMS (ESI): [M+H]⁺=488.2.

1H NMR (400 MHz, CD₃OD), δ ppm 8.57 (m, 2H), 7.71 (br s, 1H), 6.77 (br s, 1H), 4.20 (br s, 1H), 4.00 (m, 2H), 3.80 (m, 2H), 3.70 (m, 2H), 3.40 (m, 1H), 3.10 (m, 1H), 2.79 (m, 2H), 2.28 (m, 4H), 2.19 (m, 1H), 1.92 (m, 2H), 1.84-1.56 (m, 3H).

Example 17. (S)-4-(6-(6-oxa-2-azaspiro[3.5]nonan-2-yl)-1H-pyrrolo[2,3-b]pyridin-3-yl)-N-(piperidin-3-yl)-5-(trifluoromethyl)pyrimidine-2-amine (Compound 17)

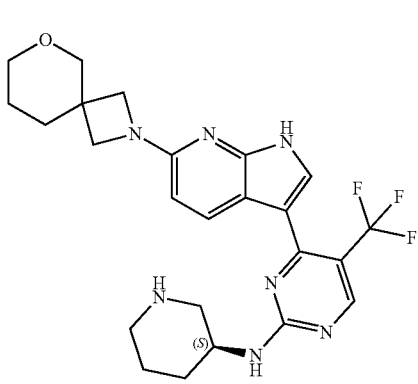

Compound 17 (27.05 mg, yellow solid). LCMS (ESI): [M+H]⁺=488.2.

¹H NMR (400 MHz, CD₃OD), δ ppm 8.68-8.38 (m, 2H), 7.66 (s, 1H), 6.38 (m, 1H), 4.08 (m, 1H), 3.84 (m, 2H), 3.80-3.72 (m, 4H), 3.70-3.64 (m, 2H), 3.26 (m, 1H), 2.97 (m, 1H), 2.62 (m, 2H), 2.15 (br s, 1H), 1.88-1.99 (m, 2H), 1.81 (m, 1H), 1.67 (m, 4H).

Example 18. 4-(6-((S)-3-methylmorpholinyl)-1H-pyrrolo[2,3-b]pyridin-3-yl)-N—((S)-piperidin-3-yl)-5-(trifluoromethyl)pyrimidine-2-amine (Compound 18)

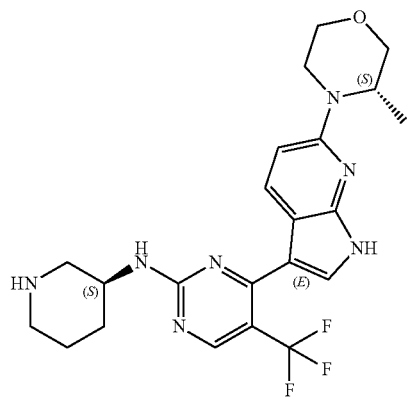

Compound 18 (12.05 mg, yellow solid). LCMS (ESI): [M+H]⁺=462.3.

¹H NMR (400 MHz, CD₃OD), δ ppm 8.55 (m, 2H), 7.70 (m, 1H), 6.74 (br s, 1H), 4.47-4.23 (m, 2H), 4.03 (m, 1H), 3.92-3.76 (m, 3H), 3.66 (m, 1H), 3.52 (m, 1H), 3.27 (m, 2H), 2.98 (br s, 2H), 2.30-2.00 (m, 2H), 1.92-1.68 (m, 2H), 1.24 (m, 3H)

Example 19. 4-(6-((R)-3-methylmorpholinyl)-1H-pyrrolo[2,3-b]pyridin-3-yl)-N—((S)-piperidin-3-yl)-5-(trifluoromethyl)pyrimidine-2-amine (Compound 19)

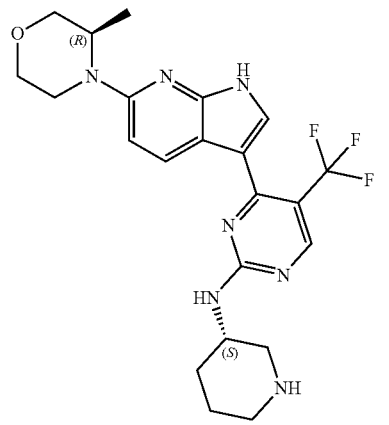

Compound 19 (3.69 mg, white solid). LCMS (ESI): [M+H]⁺=462.2.

¹H NMR (400 MHz, CD₃OD): δ ppm 8.55 (m, 2H), 7.70 (m, 1H), 6.74 (br s, 1H), 4.47-4.23 (m, 2H), 4.03 (m, 1H), 3.92-3.76 (m, 3H), 3.66 (m, 1H), 3.52 (m, 1H), 3.27 (m, 2H), 2.98 (m, 2H), 2.30-2.00 (m, 2H), 1.92-1.68 (m, 2H), 1.25 (m, 3H)

Example 20. (S)-1-(3-(2-(piperidine-3-amino)-5-(trifluoromethyl)pyrimidin-4-yl)-1H-pyrrolo[2,3-b]pyridin-6-yl)piperidine-4-nitrile (Compound 20)

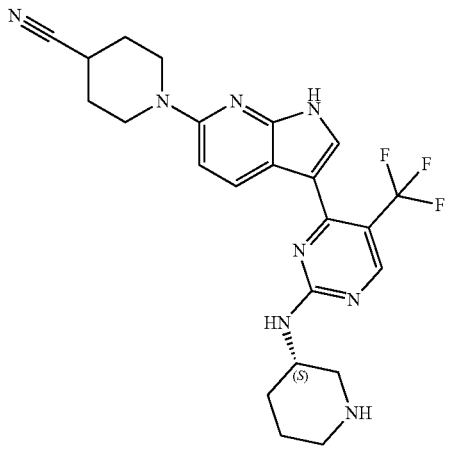

Compound 20 (22.21 mg, yellow solid). LCMS (ESI): [M+H]$^+$=471.2.

$^1$H NMR (400 MHz, CD$_3$OD): δ ppm 8.57 (m, 2H), 7.71 (m, 1H), 6.84 (m, 1H), 4.11 (m, 1H), 3.93 (m, 2H), 3.49 (m, 2H), 3.29 (m, 1H), 3.05 (m, 2H), 2.65 (m, 2H), 2.09 (m, 3H), 1.95 (m, 3H), 1.64 (m, 2H)

Example 21. (S)-3-methyl-1-(3-(2-(piperidine-3-amino)-5-(trifluoromethyl)pyrimidin-4-yl)-1H-pyrrolo[2,3-b]pyridin-6-yl)azetidine-3-formonitrile (Compound 21)

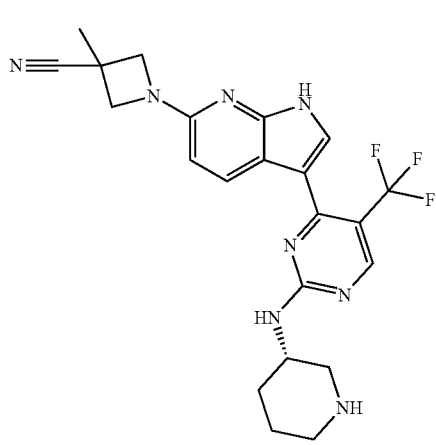 [SMILES: CC1(C#N)CN(c2ccc3c(-c4nc(N[C@H]5CCCNC5)ncc4C(F)(F)F)c[nH]c3n2)C1]

Compound 21 (24.60 mg, yellow solid). LCMS (ESI): [M+H]$^+$=457.2.

$^1$H NMR (400 MHz, CD$_3$OD): δ ppm 8.57 (m, 2H), 7.70 (m, 1H), 6.43 (m, 1H), 4.36 (m, 2H), 4.01 (m, 3H), 3.26 (m, 1H), 2.97 (m, 1H), 2.63 (m, 2H), 2.22 (m, 1H), 1.81 (m, 1H), 1.76 (s, 3H), 1.64 (m, 2H)

Example 22. (S)-4-(6-(1,4-oxazepan-4-yl)-1H-pyrrolo[2,3-b]pyridin-3-yl)-N-(piperidin-3-yl)-5-(trifluoromethyl)pyrimidine-2-amine (Compound 22)

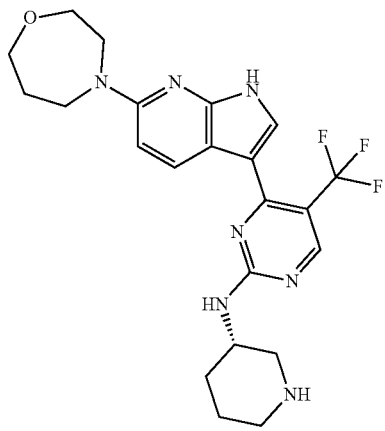 [SMILES: FC(F)(F)c1cnc(N[C@H]2CCCNC2)nc1-c1c[nH]c2nc(N3CCCOCC3)ccc12]

Compound 22 (24.19 mg, yellow solid). LCMS (ESI): [M+H]$^+$=462.2.

$^1$H NMR (400 MHz, CD$_3$OD): δ ppm 8.57 (m, 2H), 7.65 (m, 1H), 6.68 (m, 1H), 4.10 (m, 1H), 3.88 (m, 6H), 3.72 (m, 2H), 3.27 (m, 1H), 2.96 (m, 1H), 2.63 (m, 2H), 2.04 (m, 3H), 1.81 (m, 1H), 1.64 (m, 2H)

Example 23. (S)-4-methyl-1-(3-(2-(piperidine-3-amino)-5-(trifluoromethyl)pyrimidin-4-yl)-1H-pyrrolo[2,3-b]pyridin-6-yl)piperidin-4-ol (Compound 23)

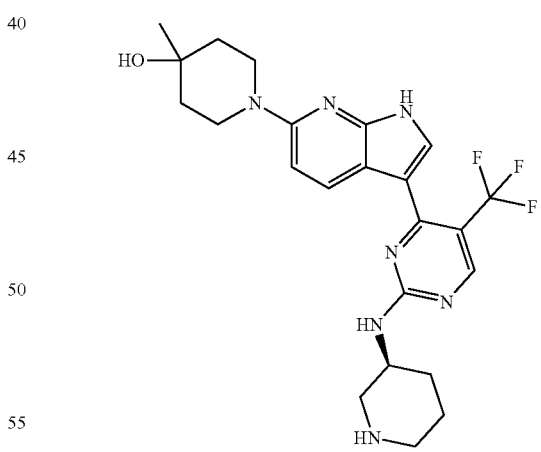

Compound 23 (39.78 mg, yellow solid). LCMS (ESI): [M+H]$^+$=476.3.

$^1$H NMR (400 MHz, CD$_3$OD): δ ppm 8.55 (m, 2H), 7.69 (m, 1H), 6.80 (m, 1H), 4.36 (m, 1H), 3.88 (m, 2H), 3.52 (m, 3H), 3.31 (m, 1H), 3.03 (m, 2H), 2.09 (m, 2H), 1.68-1.87 (m, 6H), 1.28 (s, 3H)

Example 24. (S)-4-(6-(4-(oxetan-3-yl)piperazin-1-yl)-1H-pyrrolo[2,3-b]pyridin-3-yl)-N-(piperidin-3-yl)-5-(trifluoromethyl)pyrimidine-2-amine (Compound 24)

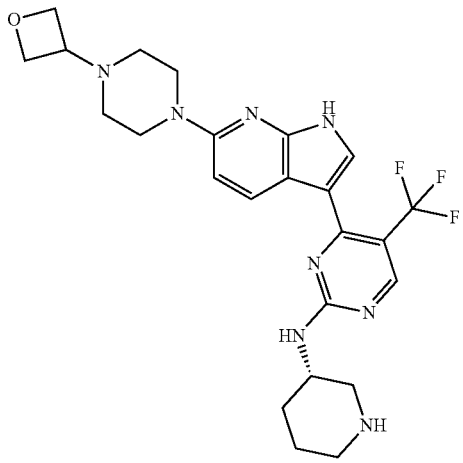 [SMILES: FC(F)(F)c1cnc(N[C@H]2CCCNC2)nc1-c1c[nH]c2nc(N3CCN(C4COC4)CC3)ccc12]

Compound 24 (8.06 mg, yellow solid). LCMS (ESI): [M+H]⁺=503.2.

¹H NMR (400 MHz, CD₃OD): δ ppm 8.55 (m, 2H), 7.72 (m, 1H), 6.79 (m, 1H), 4.77-4.67 (m, 4H), 4.36 (m, 1H), 3.66-3.56 (m, 7H), 3.04 (m, 2H), 2.53 (m, 4H), 2.09 (m, 2H), 1.88-1.77 (m, 2H)

Example 25. (S)-4-(3-(2-(piperidine-3-amino)-5-(trifluoromethyl)pyrimidin-4-yl)-1H-pyrrolo[2,3-b]pyridin-6-yl)thiomorpholine-1,1-dioxide (Compound 25)

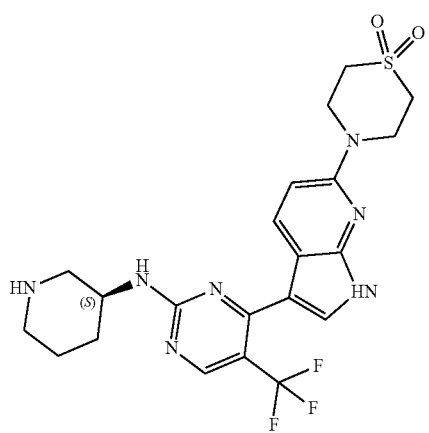

Step 1: tert-butyl(S)-3-((4-(6-thiomorpholinyl-1H-pyrrolo[2,3-b]pyridin-3-yl)-5-(trifluoromethyl)pyrimidin-2-yl)amino)piperidine-1-carboxylate

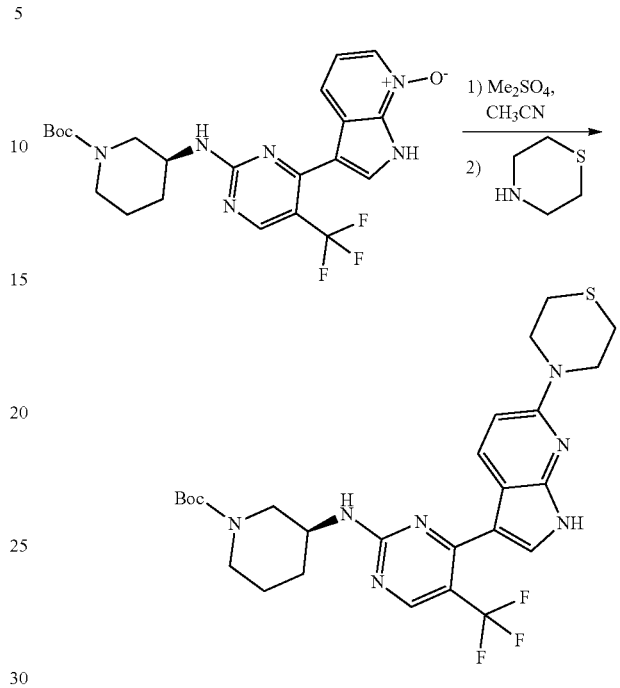

(S)-3-(2-((1-(tert-butoxycarbonyl)piperidin-3-yl)amino)-5-(trifluoromethyl)pyrimidin-4-yl)-1H-pyrrol[2,3-b]pyridine-7-oxide (300 mg, 0.627 mmol) was dissolved in acetonitrile (5 mL). Dimethyl sulfate (65 μL, 0.69 mmol) was added. The reaction mixture was heated to 70° C. and stirred for 16 hours. The reaction mixture was cooled to 0° C. Thiomorpholine (951 μL, 10.03 mmol) was added. The reaction mixture was heated to 70° C. and stirred for 20 hours. Concentration was performed. Residues were purified by means of flash column chromatography (silica gel, the gradient of ethyl acetate/petroleum ether was 0 to 85%) to obtain yellow solid tert-butyl(S)-3-((4-(6-thiomorpholinyl-1H-pyrrolo[2,3-b]pyridin-3-yl)-5-(trifluoromethyl)pyrimidin-2-yl)amino)piperidine-1-carboxylate (170 mg, 0.30 mmol, yield: 48%). LCMS (ESI): [M+H]⁺=564.3.

Step 2: tert-butyl(S)-3-((4-(6-(1,1-dioxothiomorpholinyl)-1H-pyrrolo[2,3-b]pyridin-3-yl)-5-(trifluoromethyl)pyrimidin-2-yl)amino)piperidine-1-carboxylate

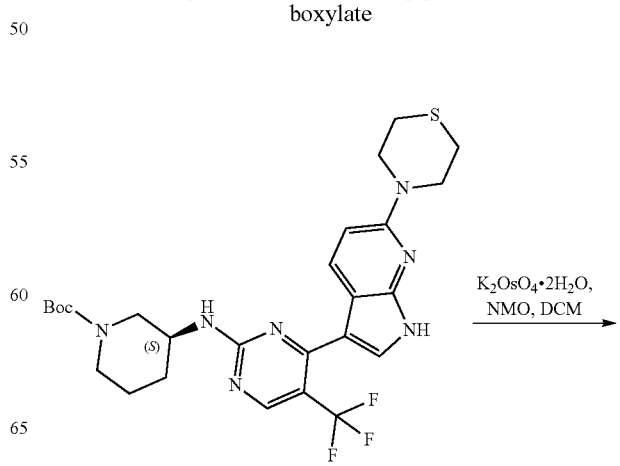

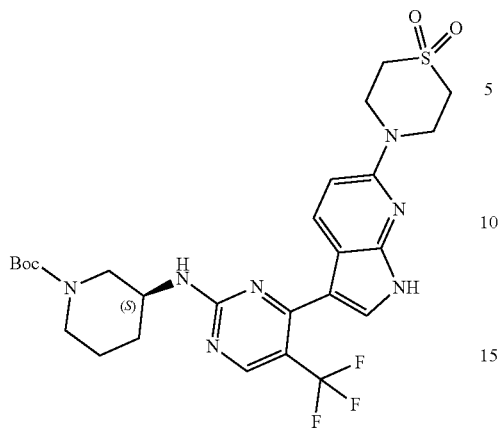

The compound tert-butyl(S)-3-((4-(6-thiomorpholinyl-1H-pyrrolo[2,3-b]pyridin-3-yl)-5-(trifluoromethyl)pyrimidin-2-yl)amino)piperidine-1-carboxylate (160 mg, 0.28 mmol) was dissolved in dichloromethane (4 mL). Potassium osmate dihydrate (5 mg, 14 umol), and N-methylmorpholine oxide (133 mg, 1.14 mmol) were added. The reaction liquid was stirred at 25° C. for 2 hours. A saturated sodium bicarbonate solution (10 ml) was added. Extraction with ethyl acetate (5 mL*3) was performed. Organic phases were merged and concentrated to obtain a crude product tert-butyl (S)-3-((4-(6-(1,1-dioxothiomorpholinyl)-1H-pyrrolo[2,3-b]pyridin-3-yl)-5-(trifluoromethyl)pyrimidin-2-yl)amino)piperidine-1-carboxylate (100 mg). LCMS (ESI): [M+H]⁺= 596.2.

Step 3: (S)-4-(3-(2-(piperidine-3-amino)-5-(trifluoromethyl)pyrimidin-4-yl)-1H-pyrrolo[2,3-b]pyridin-6-yl)thiomorpholine-1,1-dioxide

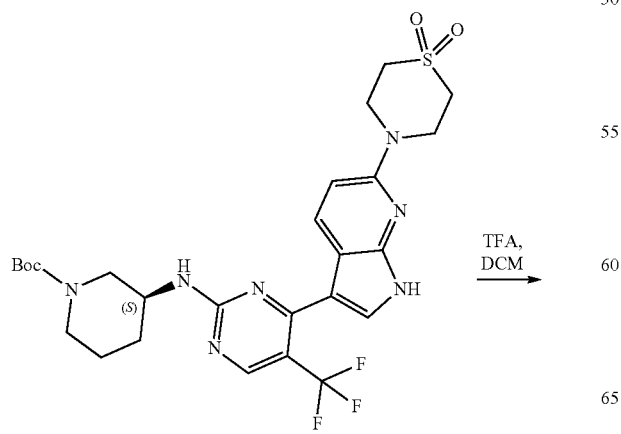

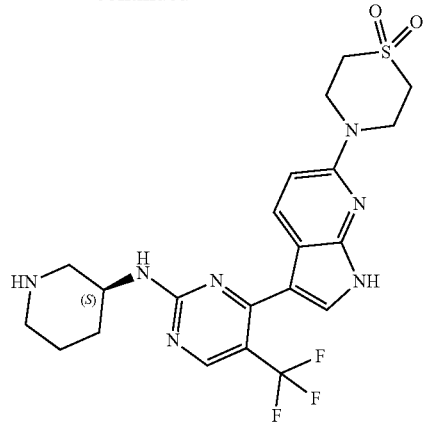

The compound tert-butyl(S)-3-((4-(6-(1,1-dioxothiomorpholinyl)-1H-pyrrolo[2,3-b]pyridin-3-yl)-5-(trifluoromethyl)pyrimidin-2-yl)amino)piperidine-1-carboxylate (100 mg, 0.17 mmol) was dissolved in dichloromethane (4 mL). Trifluoroacetic acid (1 mL, 13.46 mmol) was added. The reaction liquid was stirred at 25° C. for 2 hours. Concentration was performed. Ammonium hydroxide (1 mL) was added. Concentration was performed again. Residues were purified by means of preparative HPLC to obtain gray solid (S)-4-(3-(2-(piperidine-3-amino)-5-(trifluoromethyl)pyrimidin-4-yl)-1H-pyrrolo[2,3-b]pyridin-6-yl)thiomorpholine-1,1-dioxide (41.54 mg, 84 umol, yield: 50%). LCMS (ESI): [M+H]⁺=496.2;

¹H NMR (400 MHz, CD₃OD): δ ppm 8.56 (m, 2H), 7.75 (s, 1H), 6.93 (br d, 1=8.5 Hz, 1H), 4.33 (br s, 1H), 4.23 (br s, 4H), 3.53 (br d, J=12.3 Hz, 1H), 3.31-3.22 (m, 1H), 3.19-3.13 (m, 4H), 3.04-2.92 (m, 2H), 2.24-2.16 (m, 1H), 2.11-2.03 (m, 1H), 1.89-1.83 (m, 1H), 1.79-1.71 (m, 1H).

Example 26. N—((S)-6,6-dimethylpiperidin-3-yl)-4-(6-((S)-3-methylmorpholinyl)-1H-pyrrolo[2,3-b]pyridin-3-yl)-5-(trifluoromethyl)pyrimidine-2-amine (Compound 26)

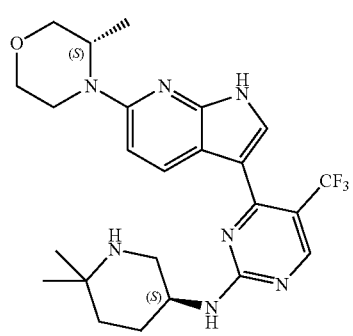

Step 1: N—((S)-6,6-dimethylpiperidin-3-yl)-4-(6-((S)-3-methylmorpholinyl)-1-(benzenesulfonyl)-1H-pyrrol[2,3-b]pyridin-3-yl)-5-(trifluoromethyl)pyrimidine-2-amine

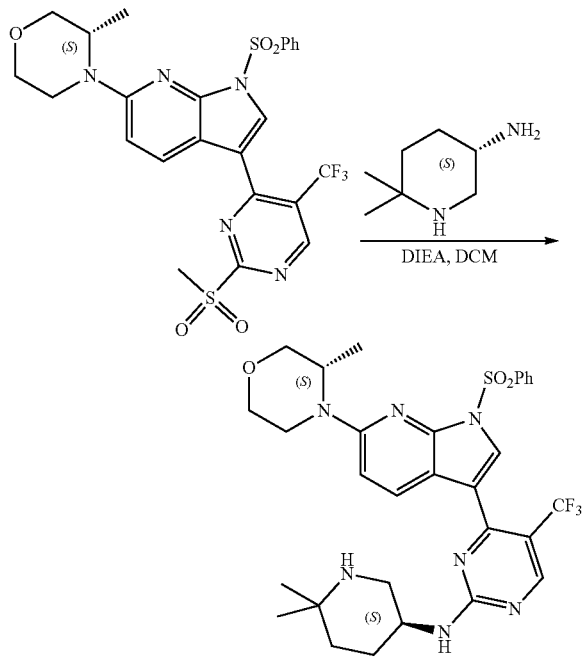

A compound (S)-6,6-dimethylpiperidine-3-amine (purity: 55%, 1.56 g, 6.69 mmol) and diisopropylethylamine (2 mL, 12.90 mmol) were added to a solution of the compound (S)-3-methyl-4-(3-(2-(methylsulfonyl)-5-(trifluoromethyl)pyrimidin-4-yl)-1-(benzenesulfonyl)-1H-pyrrol[2,3-b]pyridin-6-yl)morpholine (750 mg, 1.29 mmol) in dichloromethane (13 mL). The reaction system was stirred at 25° C. for 2 hours. Concentration was performed. Residues were purified by means of preparative HPLC to obtain yellow oily N—((S)-6,6-dimethylpiperidin-3-yl)-4-(6-((S)-3-methylmorpholinyl)-1-(benzenesulfonyl)-1H-pyrrol[2,3-b]pyridin-3-yl)-5-(trifluoromethyl)pyrimidine-2-amine (400 mg, 0.64 mmol, yield: 49%). LCMS (ESI): [M+H]+=630.3.

Step 2: N—((S)-6,6-dimethylpiperidin-3-yl)-4-(6-((S)-3-methylmorpholinyl)-1H-pyrrolo[2,3-b]pyridin-3-yl)-5-(trifluoromethyl)pyrimidine-2-amine

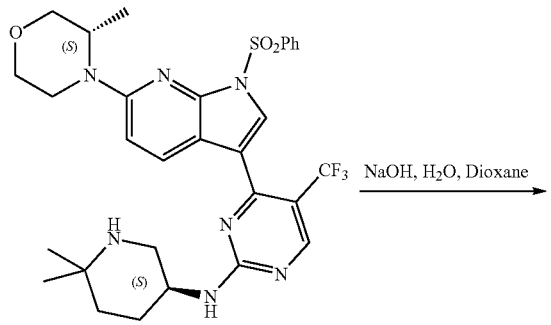

-continued

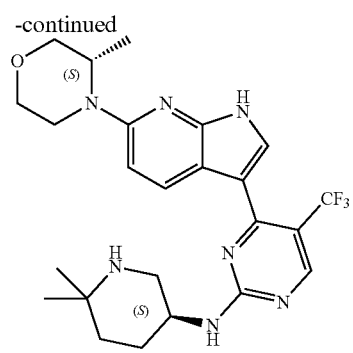

The compound N—((S)-6,6-dimethylpiperidin-3-yl)-4-(6-((S)-3-methylmorpholinyl)-1-(benzenesulfonyl)-1H-pyrrol[2,3-b]pyridin-3-yl)-5-(trifluoromethyl)pyrimidine-2-amine (750 mg, 0.89 mmol) was dissolved in 1,4-dioxane (5 mL). Aqueous sodium hydroxide (4 M, 1787 uL, 7.15 mmol) was added. After the adding, the mixture reacted at 100° C. for 1 hour. After cooling, pH was adjusted to 7 with hydrochloric acid. Concentration was performed. Residues were purified by means of preparative HPLC to obtain a white solid compound N—((S)-6,6-dimethylpiperidin-3-yl)-4-(6-((S)-3-methylmorpholinyl)-1H-pyrrolo[2,3-b]pyridin-3-yl)-5-(trifluoromethyl)pyrimidine-2-amine (35.91 mg, 73 umol, yield: 8%). LCMS (ESI): [M+H]+=490.3;

$^1$H NMR (400 MHz, CD$_3$OD): δ ppm 8.67-8.52 (m, 1H), 8.48 (br s, 1H), 7.70 (s, 1H), 6.80-6.70 (m, 1H), 4.41 (br d, J=6.2 Hz, 1H), 4.13-3.92 (m, 2H), 3.91-3.80 (m, 3H), 3.66 (m, 1H), 3.31-3.22 (m, 1H), 3.16-3.07 (m, 1H), 2.89-2.75 (m, 1H), 2.11-1.93 (m, 1H), 1.84-1.64 (m, 2H), 1.60-1.49 (m, 1H), 1.24 (d, J=6.4 Hz, 3H), 1.22 (s, 3H), 1.19 (s, 3H).

Example 27. (S)-4-(6-(3,6-dihydro-2H-pyran-4-yl)-1H-pyrrolo[2,3-b]pyridin-3-yl)-N-(piperidin-3-yl)-5-(trifluoromethyl)pyrimidine-2-amine (Compound 27)

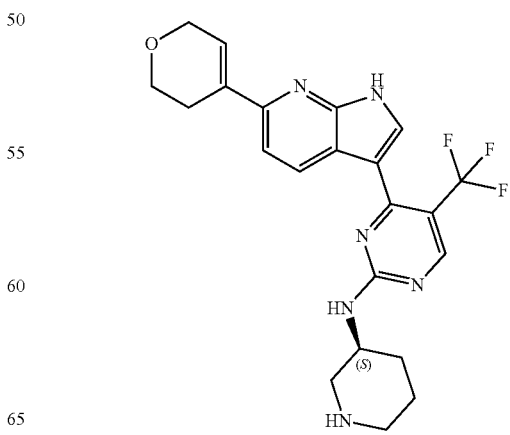

85

Step 1: tert-butyl(S)-3-((4-(6-(3,6-dihydro-2H-pyran-4-yl)-1H-pyrrol[2,3-b]pyridin-3-yl)-5-(trifluoromethyl)pyrimidin-2-yl)amino)piperidine-1-carboxylate

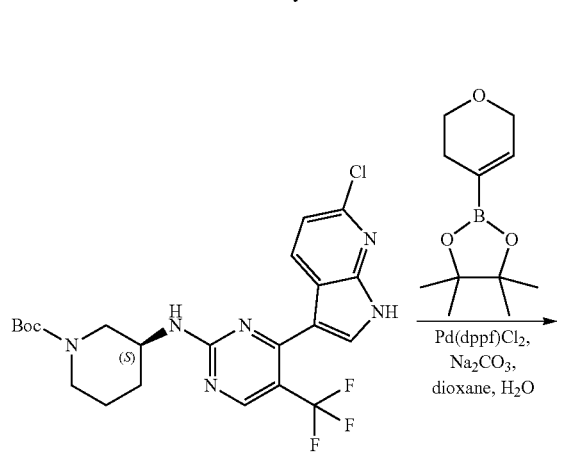

86

Step 2: (S)-4-(6-(3,6-dihydro-2H-pyran-4-yl)-1H-pyrrolo[2,3-b]pyridin-3-yl)-N-(piperidin-3-yl)-5-(trifluoromethyl)pyrimidine-2-amine

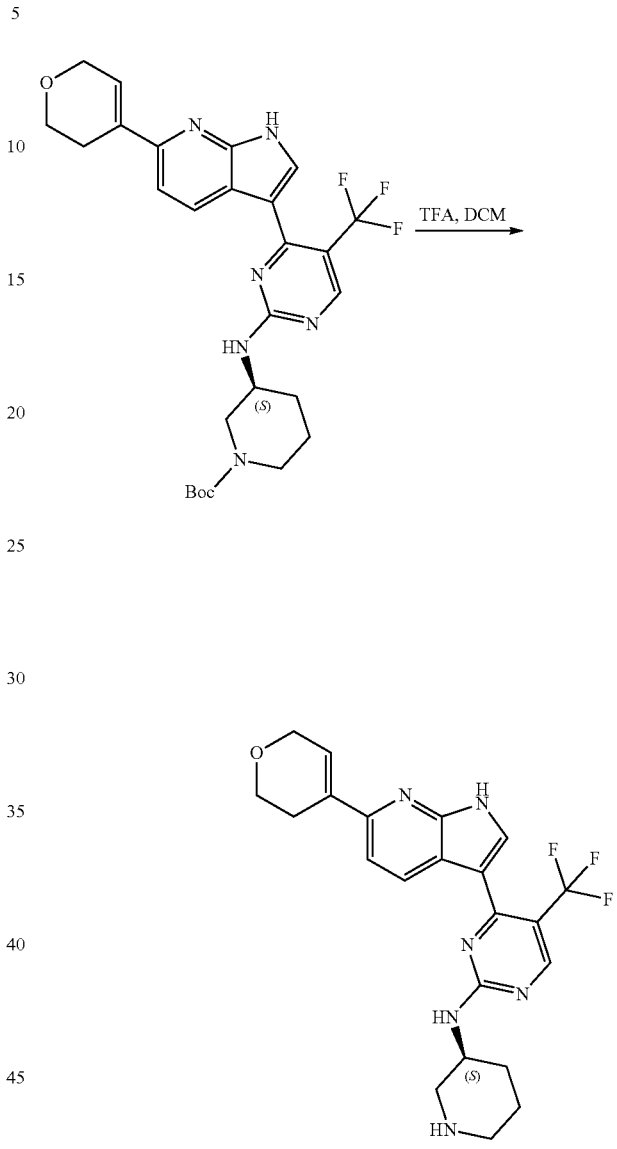

The intermediate tert-butyl(S)-3-((4-(6-chloro-1H-pyrol[2,3-b]pyridin-3-yl)-5-(trifluoromethyl)pyrimidin-2-yl)amino)piperidine-1-carboxylate (0.30 g, 0.60 mmol), the compound 3,6-dihydro-2H-pyran-4-boronic acid pinacol ester (0.19 g, 0.91 mmol), and a sodium carbonate aqueous solution (1 M, 1810 uL, 1.81 mmol) were dissolved in 1,4-dioxane (10.00 mL). Under nitrogen protection, 1,1-bis(diphenylphosphino)ferrocene dichloropalladium (0.04 g, 0.06 mmol) was added. The reaction system was heated to 100° C. and reacted for 12 hours. The reaction system was cooled to room temperature and concentrated. The obtained residues were purified by means of flash column chromatography (silica gel, the gradient of ethyl acetate/petroleum ether was 0 to 70%) to obtain a white solid compound tert-butyl(S)-3-((4-(6-(3,6-dihydro-2H-pyran-4-yl)-1H-pyrrol[2,3-b]pyridin-3-yl)-5-(trifluoromethyl)pyrimidin-2-yl)amino)piperidine-1-carboxylate (0.22 g, 0.40 mmol, yield: 67%). LCMS (ESI): [M+H]$^+$=545.2.

The compound tert-butyl(S)-3-((4-(6-(3,6-dihydro-2H-pyran-4-yl)-1H-pyrrol[2,3-b]pyridin-3-yl)-5-(trifluoromethyl)pyrimidin-2-yl)amino)piperidine-1-carboxylate (75 mg, 0.14 mmol) was dissolved in dichloromethane (300 uL). Trifluoroacetic acid (0.09 mL, 1.38 mmol) was added at room temperature. The reaction mixture was stirred at 25° C. for 12 hours. Concentration was performed. The obtained residues were purified by means of preparative HPLC to obtain a white solid compound (S)-4-(6-(3,6-dihydro-2H-pyran-4-yl)-1H-pyrrolo[2,3-b]pyridin-3-yl)-N-(piperidin-3-yl)-5-(trifluoromethyl)pyrimidine-2-amine (28.86 mg, 63 umol, yield: 45%). LCMS (ESI): [M+H]$^+$=445.2.

$^1$H NMR (400 MHz, CD$_3$OD) δ ppm 8.58 (m, 2H), 7.97 (s, 1H), 7.48 (d, J=7.6 Hz, 1H), 6.70 (s, 1H), 4.39 (m, 2H), 4.29 (s, 1H), 3.98 (t, J=5.6 Hz, 2H), 3.49 (d, J=8.4 Hz, 1H), 3.22 (s, 1H), 2.92 (t, J=10.8 Hz, 2H), 2.75 (d, J=1.8 Hz, 2H), 2.19 (s, 1H), 2.01 (s, 1H), 1.93-1.64 (m, 2H).

Example 28. (S)—N-(piperidin-3-yl)-4-(6-(tetrahydro-2H-pyran-4-yl)-1H-pyrrolo[2,3-b]pyridin-3-yl)-5-(trifluoromethyl)pyrimidine-2-amine formate (Compound 28)

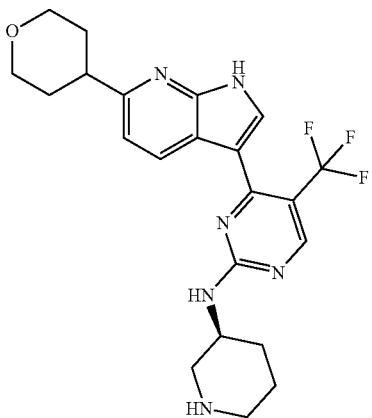 [SMILES: FC(F)(F)c1cnc(N[C@H]2CCCNC2)nc1-c1c[nH]c2nc(C3CCOCC3)ccc12]

Step 1: tert-butyl(S)-3-((4-(6-(tetrahydro-2H-pyran-4-yl)-1H-pyrrol[2,3-b]pyridin-3-yl)-5-(trifluoromethyl)pyrimidin-2-yl)amino)piperidine-1-carboxylate

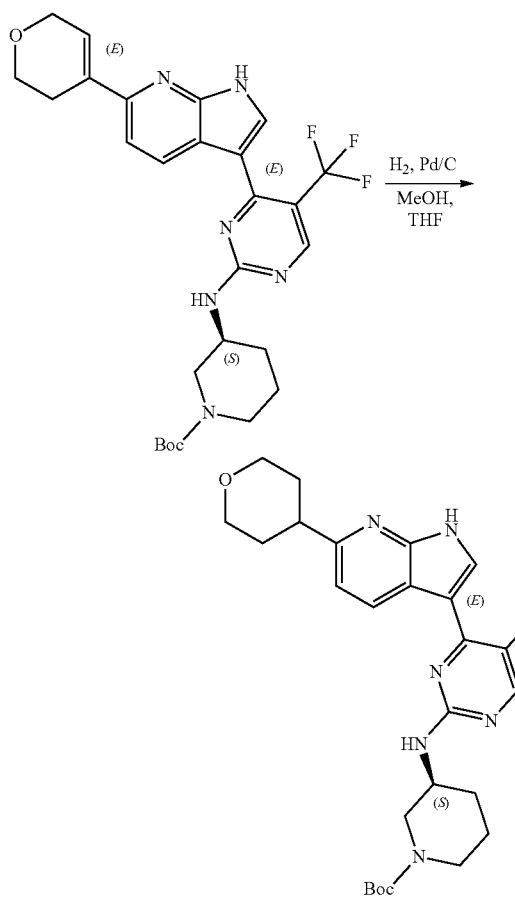

Tert-butyl(S)-3-((4-(6-(3,6-dihydro-2H-pyran-4-yl)-1H-pyrrol[2,3-b]pyridin-3-yl)-5-(trifluoromethyl)pyrimidin-2-yl)amino)piperidine-1-carboxylate (70 mg, 0.13 mmol) was dissolved in methanol (5 mL) and tetrahydrofuran (10 mL). Wet palladium carbon was added (content: 10%, 0.1 g). The reaction liquid was stirred to react at 25° C. for 12 hours in 15 psi hydrogen. The reaction liquid was filtered and concentrated to obtain a brown oily product tert-butyl (S)-3-((4-(6-(tetrahydro-2H-pyran-4-yl)-1H-pyrrol[2,3-b]pyridin-3-yl)-5-(trifluoromethyl)pyrimidin-2-yl)amino)piperidine-1-carboxylate (60 mg, 0.11 mmol, yield: 77%). LCMS (ESI): [M+H]-=547.3.

Step 2; (S)—N-(piperidin-3-yl)-4-(6-(tetrahydro-2H-pyran-4-yl)-1H-pyrrolo[2,3-b]pyridin-3-yl)-5-(trifluoromethyl)pyrimidine-2-amine

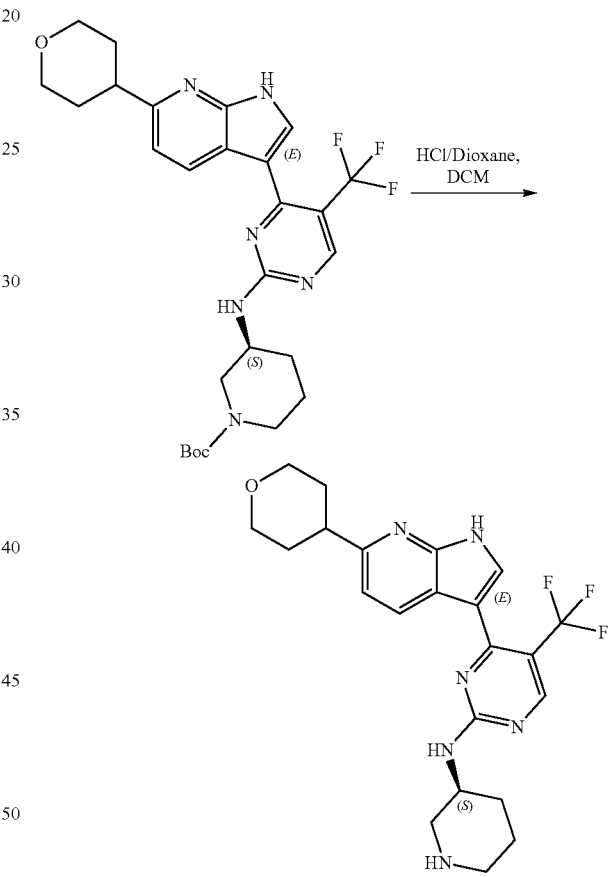

The compound tert-butyl(S)-3-((4-(6-(tetrahydro-2H-pyran-4-yl)-1H-pyrrol[2,3-b]pyridin-3-yl)-5-(trifluoromethyl)pyrimidin-2-yl)amino)piperidine-1-carboxylate (60 mg, 0.11 mmol) was dissolved in dichloromethane (5 mL). The 1,4-dioxane solution (4 M, 200 uL, 0.80 mmol) was added dropwise at 25° C. After the adding dropwise, the reaction mixture was stirred at 25° C. for 1 hour and concentrated. The obtained residues were purified by means of preparative HPLC to obtain a yellow solid compound (S)—N-(piperidin-3-yl)-4-(6-(tetrahydro-2H-pyran-4-yl)-1H-pyrrolo[2,3-b]pyridin-3-yl)-5-(trifluoromethyl)pyrimidine-2-amine (formate, 24.98 mg, 51 umol, yield: 46%), which is a yellow solid. LCMS (ESI): [M+H]$^+$=447.3.

¹H NMR (400 MHz, CD₃OD): δ ppm 8.79-8.59 (m, 3H), 7.95 (m, 1H), 7.20 (m, 1H), 4.35 (m, 1H), 4.12-4.09 (m, 2H), 3.66-3.60 (m, 3H), 3.33 (m, 1H), 3.10-2.96 (m, 3H), 2.23 (m, 1H), 2.10-1.78 (m, 7H).

The same chloro intermediate tert-butyl(S)-3-((4-(6-chloro-1H-pyrrol[2,3-b]pyridin-3-yl)-5-(trifluoromethyl) pyrimidin-2-yl)amino)piperidine-1-carboxylate was coupled with other substrates (further reduced if necessary) to prepare the following compounds by using the same method for synthesizing compound 28:

Example 29. N—((S)-piperidin-3-yl)-4-(6-(tetrahydrofuran-3-yl)-1H-pyrrol[2,3-b]pyridin-3-yl)-5-(trifluoromethyl)pyrimidine-2-amine formate (Compound 29)

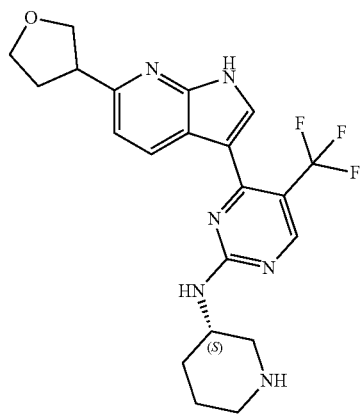

Compound 29 (12.13 mg, yellow solid). LCMS (ESI): [M+H]⁺=433.1;

¹H NMR (400 MHz, CD₃OD): δ ppm 8.76-8.49 (m, 2H), 8.35 (br s, 1H), 7.91 (m, 1H), 7.18 (m, 1H), 4.14-3.64 (m, 6H), 3.36 (m, 1H), 2.96 (m, 1H), 2.63 (m, 2H), 2.34-2.21 (m, 2H), 1.77-1.57 (m, 2H), 1.56 (m, 2H).

The compound 29 was separated by means of SFC (column: Phenomenex-Cellulose-2 (250 mm*30 mm, 10 um); mobile phases: an A phase is carbon dioxide, and a B phase is 0.1% ammonium hydroxide/methanol; the B phase is kept at 30%; a flow rate: 60 milliliters/minute). Then, two components were respectively purified by means of preparative HPLC to obtain a target compound 107 and compound 108, both formates.

Example 107. A Chiral Monomer (Compound 107) Having Short Appearance Time after Chiral Resolution of the Compound 29

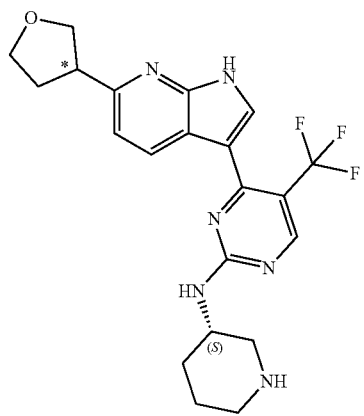

Compound 107 (7.11 mg, yellow solid). LCMS (ESI): [M+H]⁺=432.9; SFC analysis (column: Cellulose 2 (150 mm*4.6 mm), 5 um; mobile phases: an A phase is carbon dioxide, and a B phase is 0.05% diethylamine/methanol; gradients: the B phase is from 5% to 40% within 5 minutes, the 40% B phase is kept for 2.5 minutes, the 5% B phase is kept for 2.5 minutes, a flow rate: 2.5 milliliters/minute): RT=6.763 min, de=100%;

1H NMR (400 MHz, CD₃OD) δ ppm 8.77-8.35 (m, 2H), 7.83 (s, 1H), 7.41-7.20 (m, 1H), 7.11 (br s, 1H), 4.09 (br t, J=8.0 Hz, 2H), 4.01 (td, J=8.1, 5.0 Hz, 1H), 3.92-3.79 (m, 2H), 3.69-3.52 (m, 1H), 3.37-3.27 (m, 1H), 3.03 (br s, 1H), 2.80-2.63 (m, 2H), 2.39-2.26 (m, 1H), 2.25-2.14 (m, 1H), 2.12-1.99 (m, 1H), 1.95-1.77 (m, 1H), 1.73-1.46 (m, 2H).

Example 108. A Chiral Monomer (Compound 108) Having Long Appearance Time after Chiral Resolution of the Compound 29

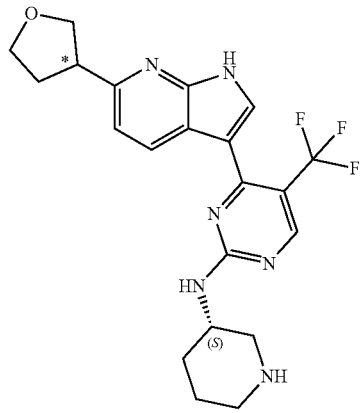

Compound 108 (7.43 mg, white solid). LCMS (ESI): [M+H]⁺=432.9; SFC analysis (column: Cellulose 2 (150 mm*4.6 mm), 5 um; mobile phases: an A phase is carbon dioxide, and a B phase is 0.05% diethylamine/methanol; gradients: the B phase is from 5% to 40% within 5 minutes, the 40% B phase is kept for 2.5 minutes, the 5% B phase is kept for 2.5 minutes, a flow rate: 2.5 milliliters/minute): RT=7.118 min, de=93.17%;

1H NMR (400 MHz, CD₃OD) δ ppm 8.75-8.33 (m, 2H), 7.83 (s, 1H), 7.39-7.18 (m, 1H), 7.10 (br s, 1H), 4.15-3.95 (m, 3H), 3.92-3.80 (m, 2H), 3.68-3.53 (m, 1H), 3.30 (m, 1H), 2.91 (br d, J=12.5 Hz, 1H), 2.64-2.50 (m, 2H), 2.39-2.26 (m, 1H), 2.20 (dq, J=12.3, 7.8 Hz, 1H), 2.07 (dt, J=15.1, 7.5 Hz, 1H), 1.75 (br d, J=12.1 Hz, 1H), 1.64-1.42 (m, 2H).

Example 30. N—((S)-piperidin-3-yl)-4-(6-(tetrahydropyran-2-yl)-1H-pyrrolo[2,3-b]pyridin-3-yl)-5-(trifluoromethyl)pyrimidine-2-amine formate

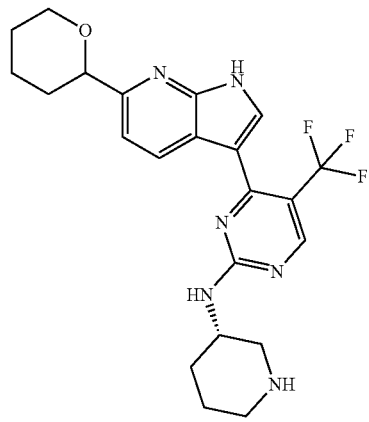 [SMILES: FC(F)(F)c1cnc(N[C@H]2CCCNC2)nc1-c1c[nH]c2nc(C3CCCCO3)ccc12]

Compound 30 (12.19 mg, white solid). LCMS (ESI): [M+H]$^+$=447.2.

$^1$H NMR (400 MHz, DMSO-d$_6$): δ ppm 12.32 (br s, 1H), 8.78-8.56 (m, 2H), 8.34 (br s, 1H), 7.91 (m, 2H), 7.35-7.27 (m, 1H), 4.46 (m, 1H), 4.06 (m, 3H), 3.20 (m, 1H), 2.94 (m, 1H), 2.60 (m, 2H), 1.91 (m, 3H), 1.61-1.54 (m, 7H)

Example 31. 4-(6-(3-oxabicyclo[4.1.0]heptan-6-yl)-1H-pyrrolo[2,3-b]pyridin-3-yl)-N—((S)-piperidin-3-yl)-5-(trifluoromethyl)pyrimidine-2-amine formate (Compound 31)

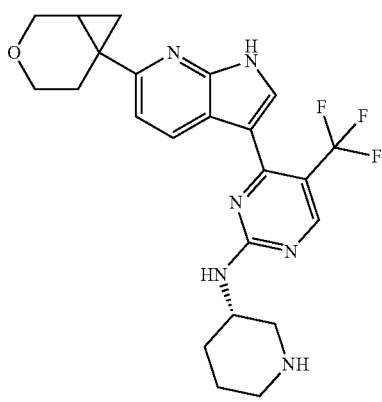 [SMILES: FC(F)(F)c1cnc(N[C@H]2CCCNC2)nc1-c1c[nH]c2nc(C34CCOCC3C4)ccc12]

Compound 31 (2.14 mg, yellow solid). LCMS (ESI): [M+H]$^+$=459.2.

$^1$H NMR (400 MHz, CD$_3$OD): δ ppm 8.77-8.56 (m, 3H), 7.93 (m, 1H), 7.25 (m, 1H), 4.63 (m, 1H), 4.25 (m, 1H), 4.00 (m, 1H), 3.67 (m, 1H), 3.52-3.33 (m, 2H), 3.27 (m, 1H), 2.86 (m, 2H), 2.58 (m, 1H), 2.19 (m, 2H), 2.00 (m, 1H), 1.77-1.72 (m, 3H), 1.35 (m, 1H), 1.05 (m, 1H).

Example 32. 4-(6-(2-oxo-5-azabicyclo[2.2.2]octan-5-yl)-1H-pyrrol[2,3-b]pyridin-3-yl)-N—((S)-piperidin-3-yl)-5-(trifluoromethyl)pyrimidine-2-amine (Compound 32)

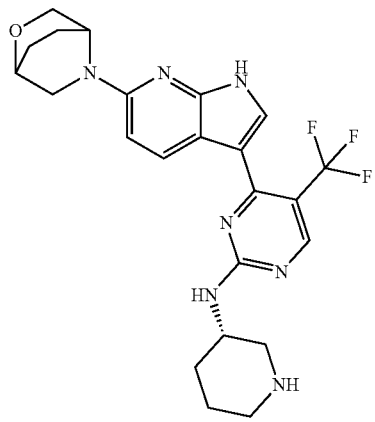 [SMILES: FC(F)(F)c1cnc(N[C@H]2CCCNC2)nc1-c1c[nH]c2nc(N3CC4CCC3CO4)ccc12]

Step 1: tert-butyl(3S)-3-((4-(6-(2-oxo-5-azabicyclo[2.2.2]octan-5-yl)-1-(benzenesulfonyl)-1H-pyrrol[2,3-b]pyridin-3-yl)-5-(trifluoromethyl)pyrimidin-2-yl)amino)piperidine-1-carboxylate

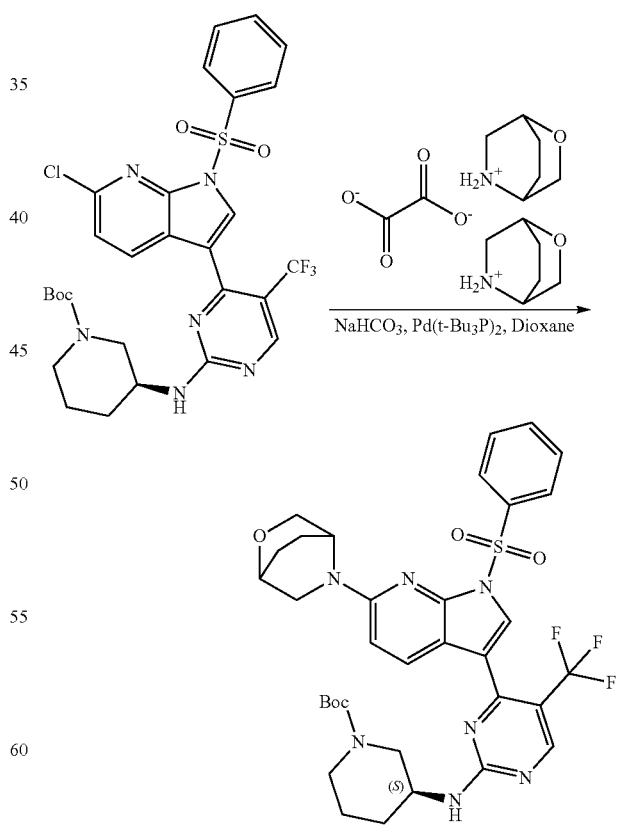

In a nitrogen cabinet, bis(tri-tert-butylphosphine)palladium (8 mg, 0.02 mmol) was added to the suspension of the compound tert-butyl(3S)-3-((4-(6-chloro-1-(benzenesulfonyl)-1H-pyrrol[2,3-b]pyridin-3-yl)-5-(trifluoromethyl)pyrimidin-2-yl)amino)piperidine-1H-carboxylate (100 mg, 0.16 mmol), the compound 2-oxa-5-azabicyclo[2.2.2]octane (oxalate, 99 mg, 0.31 mmol), and sodium bicarbonate (132 mg, 1.57 mmol) in 1,4-dioxane (1500 uL). The reaction liquid was heated to 100° C. and stirred for 16 hours. The reaction liquid was filtered. The obtained mother solution was concentrated to 1 mL. The solution was directly used for the reaction in the next step. LCMS (ESI): [M+H]$^+$=714.3.

Step 2: tert-butyl(3S)-3-((4-(6-(2-oxo-5-azabicyclo[2.2.2]octan-5-yl)-1H-pyrrol[2,3-b]pyridin-3-yl)-5-(trifluoromethyl)pyrimidin-2-yl)amino)piperidine-1-carboxylate

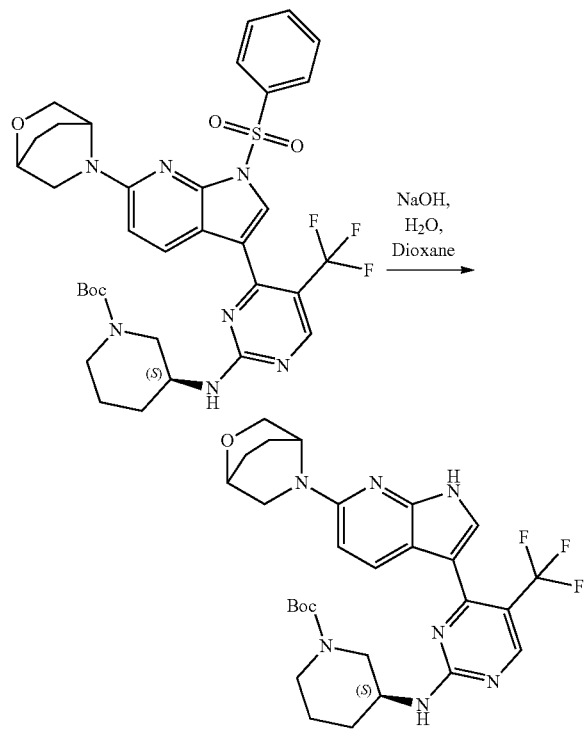

Aqueous sodium hydroxide (2 M, 420 uL, 0.84 mmol) was added to the solution of the above compound tert-butyl (3S)-3-((4-(6-(2-oxo-5-azabicyclo[2.2.2]octan-5-yl)-1-(benzenesulfonyl)-1H-pyrrol[2,3-b]pyridin-3-yl)-5-(trifluoromethyl)pyrimidin-2-yl)amino)piperidine-1-carboxylate in 1,4-dioxane (1 mL). Then, the reaction liquid was heated to 100° C. and stirred for 1 hour. Water (10 mL) was added to the reaction liquid. Then, extraction with ethyl acetate (10 mL*2) was performed. Organic phases were dried with sodium sulfate and filtered and spin-dried to obtain a crude product. The crude compound was separated by means of a preparative silica gel plate (silica gel, the volume ratio of petroleum ether/tetrahydrofuran was 1:1) to obtain a yellow oily compound tert-butyl(3S)-3-((4-(6-(2-oxo-5-azabicyclo[2.2.2]octan-5-yl)-1H-pyrrol[2,3-b]pyridin-3-yl)-5-(trifluoromethyl)pyrimidin-2-yl)amino)piperidine-1-carboxylate (28 mg, 0.05 mmol, yield of two steps: 31%). LCMS (ESI): [M+H]$^+$=574.3.

Step 3: 4-(6-(2-oxo-5-azabicyclo[2.2.2]octan-5-yl)-1H-pyrrol[2,3-b]pyridin-3-yl)-N—((S)-piperidin-3-yl)-5-(trifluoromethyl)pyrimidine-2-amine

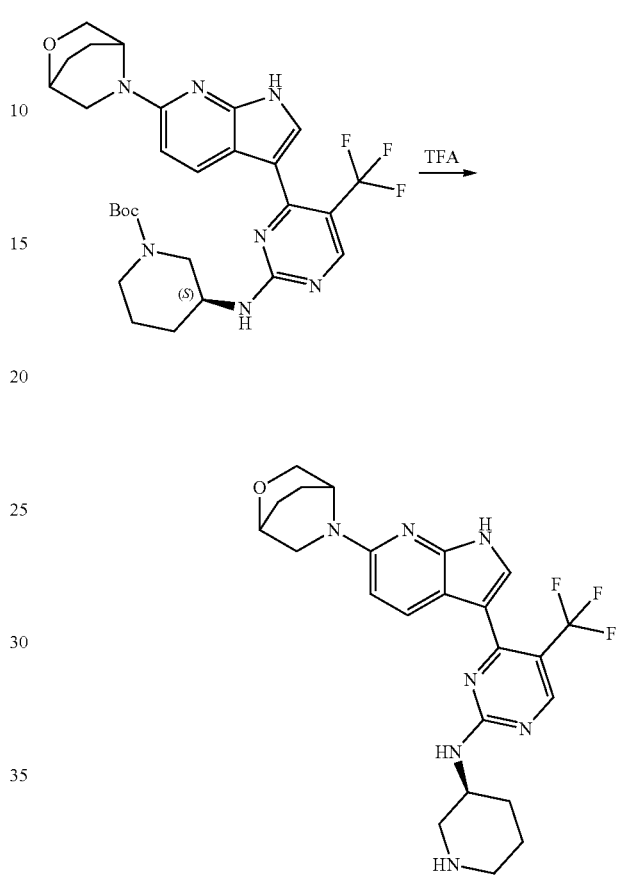

The compound tert-butyl(3S)-3-((4-(6-(2-oxo-5-azabicyclo[2.2.2]octan-5-yl)-1H-pyrrol[2,3-b]pyridin-3-yl)-5-(trifluoromethyl)pyrimidin-2-yl)amino)piperidine-1-carboxylate (28 mg, 0.05 mmol) was dissolved in dichloromethane (100 uL). Trifluoroacetic acid (36 uL, 0.49 mmol) was added. The reaction liquid was stirred at 20° C. for 2 hours. After the reaction, the reaction liquid was directly concentrated and dried to obtain a crude product. The crude product was purified by means of preparative HPLC to obtain a yellow solid compound 4-(6-(2-oxo-5-azabicyclo[2.2.2]octan-5-yl)-1H-pyrrol[2,3-b]pyridin-3-yl)-N—((S)-piperidin-3-yl)-5-(trifluoromethyl)pyrimidine-2-amine (4.52 mg, 9.6 umol, yield: 16%), which is a yellow solid. LCMS (ESI): [M+H]$^+$=474.2.

$^1$H NMR (400 MHz, CD$_3$OD): δ ppm 8.75-8.50 (m, 2H), 7.66 (m, 1H), 6.54 (m, 1H), 4.67 (m, 1H), 4.30 (m, 1H), 4.18-4.13 (m, 3H), 3.90 (m, 1H), 3.64 (m, 1H), 3.52-3.48 (m, 1H), 3.22 (m, 1H), 2.93 (m, 2H), 2.21-2.02 (m, 5H), 1.84-1.75 (m, 3H).

The same chloro intermediate tert-butyl(3S)-3-((4-(6-chloro-1-(benzenesulfonyl)-1H-pyrrol[2,3-b]pyridin-3-yl)-5-(trifluoromethyl)pyrimidin-2-yl)amino)piperidine-1-carboxylate was coupled with other substrates to prepare the following compounds after deprotection by using the same method for synthesizing compound 32:

Example 33. N—((S)-piperidin-3-yl)-5-(trifluoromethyl)-4-(6-((R)-3-(trifluoromethyl)morpholinyl)-1H-pyrrol[2,3-b]pyridin-3-yl)pyrimidine-2-amine (Compound 33)

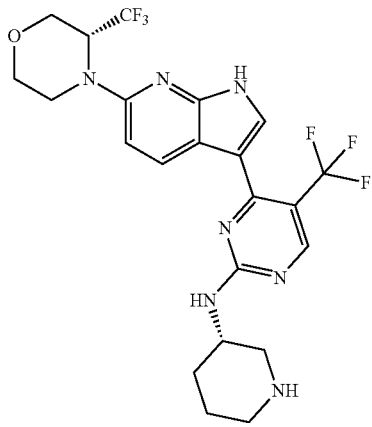 [SMILES: FC(F)(F)c1cnc(N[C@H]2CCCNC2)nc1-c1c[nH]c2nc(N3CCOC[C@@H]3C(F)(F)F)ccc12]

Compound 33 (3.92 mg, yellow solid). LCMS (ESI): [M+H]+=516.3.

¹H NMR (400 MHz, CD₃OD): δ ppm 8.77-8.54 (m, 2H), 7.73 (m, 1H), 6.79 (m, 1H), 5.30 (m, 1H), 4.66 (m, 1H), 4.30 (m, 2H), 4.06-3.83 (m, 2H), 3.66 (m, 1H), 3.52-3.43 (m, 2H), 3.27 (m, 1H), 2.94 (m, 2H), 2.19 (m, 1H), 2.04 (m, 1H), 1.82-1.76 (m, 2H)

Example 34. 4-(6-(6-oxo-3-azabicyclo[3.1.1]heptan-3-yl)-1H-pyrrol[2,3-b]pyridin-3-yl)-N—((S)-piperidin-3-yl)-5-(trifluoromethyl)pyrimidine-2-amine (Compound 34)

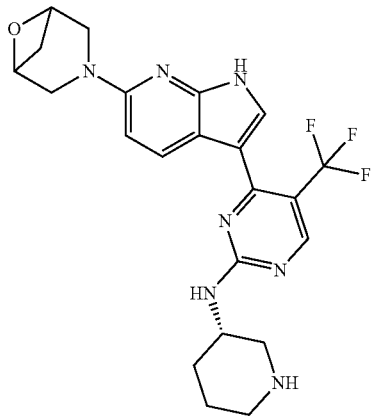 [SMILES: FC(F)(F)c1cnc(N[C@H]2CCCNC2)nc1-c1c[nH]c2nc(N3CC4CC(C3)O4)ccc12]

Compound 34 (2.05 mg, yellow solid). LCMS (ESI): [M+H]+=460.2.

¹H NMR (400 MHz, CD₃OD): δ ppm 8.75-8.50 (m, 2H), 7.69 (m, 1H), 6.66 (m, 1H), 4.83 (m, 2H), 4.33 (m, 1H), 3.90-3.72 (m, 4H), 3.55 (m, 1H), 3.27 (m, 1H), 2.99 (m, 2H), 2.21-2.04 (m, 3H), 1.89-1.75 (m, 3H).

Example 43. (1R,4R,7R)—N-(4-(6-morpholinyl-1H-pyrrol[2,3-b]pyridin-3-yl)-5-(trifluoromethyl)pyrimidin-2-yl)-2-azabicyclo[2.2.1]heptan-7-amine formate (Compound 43)

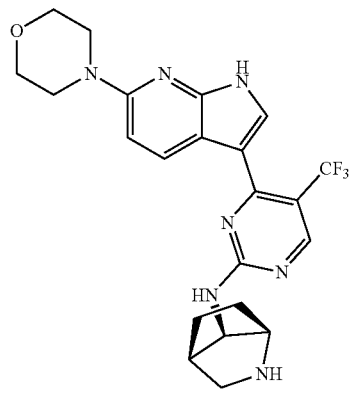 [SMILES: FC(F)(F)c1cnc(N[C@@H]2[C@@H]3CC[C@H]2NC3)nc1-c1c[nH]c2nc(N3CCOCC3)ccc12]

Compound 43 (2.01 mg, white solid). LCMS (ESI): [M+H]+=460.2.

¹H NMR (400 MHz, CD₃OD) δ ppm 8.56 (m, 3H), 7.74 (s, 1H), 6.83 (m, 1H), 4.25-4.06 (m, 1H), 3.86 (m, 4H), 3.63-3.49 (m, 5H), 3.07 (m, 1H), 2.80 (m, 1H), 2.13 (m, 2H), 1.95-1.79 (m, 1H), 1.67 (m, 1H). 1.28 (m, 1H), Example 44. (S)—N-(4-(6-morpholinyl-1H-pyrrol[2,3-b]pyridin-3-yl)-5-(trifluoromethyl)pyrimidin-2-yl)quinine-3-amine formate (Compound 44)

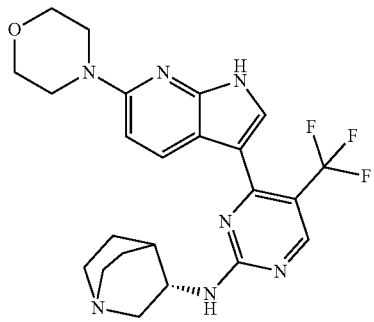 [SMILES: FC(F)(F)c1cnc(N[C@@H]2CN3CCC2CC3)nc1-c1c[nH]c2nc(N3CCOCC3)ccc12]

Compound 44 (22.76 mg, gray solid). LCMS (ESI): [M+H]+=474.1.

¹H NMR (400 MHz, CD₃OD) δ ppm 8.78-8.32 (m, 3H), 7.71 (m, 1H), 6.77 (m, 1H), 4.51 (s, 1H), 3.90-3.71 (m, 5H), 3.59-3.49 (m, 4H), 3.31 (s, 4H), 3.21 (m, 1H), 2.42 (s, 1H), 2.27 (s, 1H), 2.14-2.00 (m, 2H), 1.89 (s, 1H).

Example 60. (S)—N-(6,6-dimethylpiperidin-3-yl)-4-(6-morpholinyl-1H-pyrrol[2,3-b]pyridin-3-yl)-5-(trifluoromethyl)pyrimidine-2-amine (Compound 60)

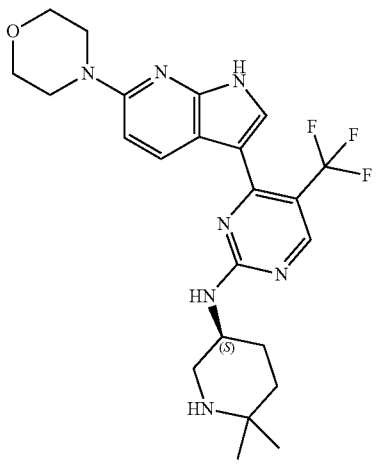

Compound 60 (28.88 mg, gray solid). LCMS (ESI): [M+H]$^+$=476.3:

$^1$H NMR (400 MHz, CD$_3$OD) δ ppm 8.78-8.35 (m, 2H), 7.71 (s, 1H), 6.80 (s, 1H), 4.03 (s, J H), 3.92-3.79 (m, 4H), 3.63-3.48 (m, 4H), 3.17-3.06 (m, 1H), 2.87 (m, 1H), 2.03 (s, 1H), 1.86-1.64 (m, 2H), 1.62-1.49 (m, 1H), 1.23 (s, 3H), 1.20 (s, 3H).

(S)-3-methyl-4-(3-(2-(methylsulfonyl)-5-(trifluoromethyl)pyrimidin-4-yl)-1-(benzenesulfonyl)-1H-pyrrol[2,3-b]pyridin-6-yl)morpholine was used as a raw material and reacted with corresponding amine to synthesize the following compounds.

Example 69. 4-(6-((S)-3-methylmorpholine)-1H-pyrrol[2,3-b]pyridin-3-yl)-N-((3S,6S)-6-methylpiperidin-3-yl)-5-(trifluoromethyl)pyrimidine-2-amine (Compound 69)

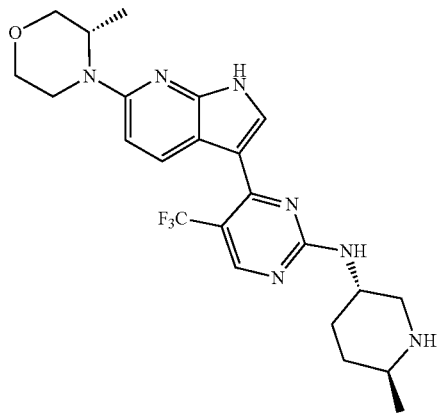 [SMILES: C[C@H]1CC[C@H](Nc2ncc(C(F)(F)F)c(-c3c[nH]c4nc(N5CCCOC[C@@H]5C)ccc34)n2)CN1]

Compound 69 (51.77 mg, yellow solid). LCMS (ESI): [M+H]$^+$=476.2.

$^1$H NMR (400 MHz, CD$_3$OD) δ ppm 8.61-8.30 (m, 2H), 7.70 (br s, 1H), 6.73 (m, 1H), 4.42-4.25 (m, 2H), 4.03 (m, 1H), 3.89-3.82 (m, 3H), 3.67-3.64 (m, 2H), 3.30-3.25 (m, 2H), 2.78 (m, 1H), 2.32 (m, 1H), 2.10 (m, 1H), 1.69-1.66 (m, 2H), 1.36 (d, J=6.8 Hz, 3H), 1.24 (d, J=6.8 Hz, 3H)

Example 70. (S)—N-(4-(6-((S)-3-methylmorpholinyl)-1H-pyrrol[2,3-b]pyridin-3-yl)-5-(trifluoromethyl)pyrimidin-2-yl)-4-azaspiro[2.5]octan-6-amine formate (Compound 70)

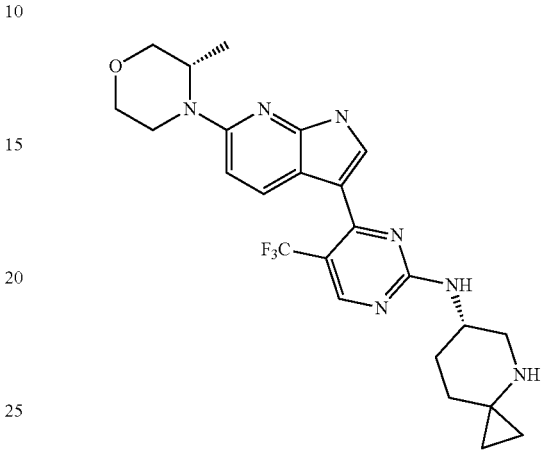

Compound 70 (32.21 mg, white solid). LCMS (ESI): [M+H]$^+$=488.2.

$^1$H NMR (400 MHz, CD$_3$OD) δ ppm 8.61-8.53 (m, 3H), 7.70 (br s, 1H), 6.74 (m, 1H), 4.44 (m, 1H), 4.35 (m, 1H), 4.03 (m, 1H), 3.89-3.82 (m, 3H), 3.67-3.66 (m, 1H), 3.40-3.25 (m, 2H), 3.01 (m, 1H), 2.20 (m, 1H), 1.90 (m, 1H), 1.88 (m, 1H), 1.62 (m, 1H), 1.24 (d, J=6.4 Hz, 3H), 0.88-0.72 (m, 4H)

Example 71. N—((S)-5,5-difluoropiperidin-3-yl)-4-(6-((S)-3-methylmorpholinyl)-1H-pyrrol[2,3-b]pyridin-3-yl)-5-(trifluoromethyl)pyrimidine-2-amine (Compound 71)

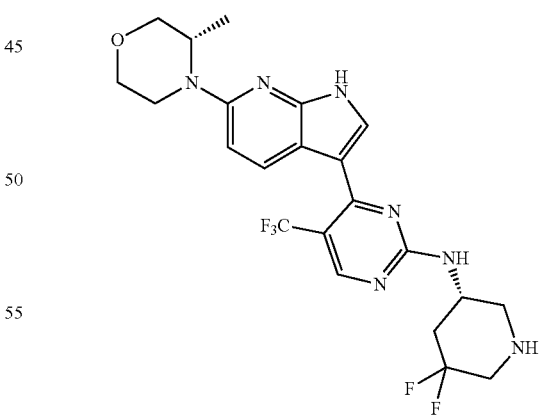

Compound 71 (3.87 mg, white solid). LCMS (ESI): [M+H]$^+$=498.2.

$^1$H NMR (400 MHz, CD$_3$OD) δ ppm 8.61-8.54 (m, 2H), 7.72 (br s, 1H), 6.73 (m, 1H), 4.41 (m, 2H), 4.02 (m, 1H), 3.89-3.82 (m, 3H), 3.67-3.66 (m, 1H), 3.25 (m, 2H), 3.21 (m, 1H), 2.88 (m, 1H), 2.61 (m, 2H), 2.07 (m, 1H), 1.24 (d, J=6.4 Hz, 3H).

Example 72. 4-(6-((S)-3-methylmorpholinyl)-1H-pyrrol[2,3-b]pyridin-3-yl)-N-((3S,5R)-5-methylpiperidin-3-yl)-5-(trifluoromethyl)pyrimidine-2-amine (Compound 72)

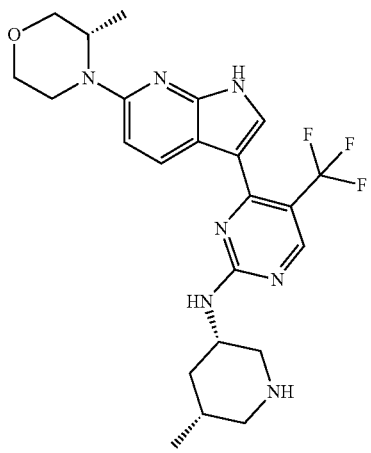 [SMILES: C[C@H]1CNC[C@@H](Nc2ncc(C(F)(F)F)c(-c3c[nH]c4nc(N5CCCOC[C@@H]5C)ccc34)n2)C1]

Compound 72 (7.67 mg, white solid). LCMS (ESI): [M+H]$^+$=476.2.

$^1$H NMR (400 MHz, CD$_3$OD) δ ppm 8.61-8.50 (m, 2H), 7.70 (br s, 1H), 6.75 (m, 1H), 4.42 (m, 1H), 4.29 (m, 1H), 4.02 (m, 1H), 3.89-3.82 (m, 3H) 3.67-3.66 (m, 1H) 3.46-3.21 (m, 3H), 3.11 (m, 1H), 2.55 (m, 1H), 2.28-2.23 (m, 2H), 1.86 (m, 1H), 1.24 (m, 3H), 1.00 (d, J=6.0 Hz, 3H)

Example 73. N-((3S,5S)-5-fluoropyridin-3-yl)-4-(6-((S)-3-methylmorpholinyl)-1H-pyrrol[2,3-b]pyridin-3-yl)-5-(trifluoromethyl)pyrimidine-2-amine (Compound 73)

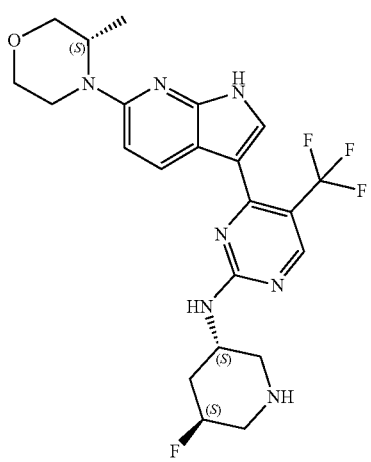

Compound 73 (21.65 mg, white solid). LCMS (ESI): [M+H]$^+$=480.2;

$^1$H NMR (400 MHz, CD$_3$OD) δ ppm 8.61-8.50 (m, 2H), 7.72 (br s, 1H), 6.73 (m, 1H), 4.64 (m, 1H), 4.41 (m, 1H), 4.02 (m, 2H), 3.89-3.82 (m, 3H), 3.67-3.66 (m, 1H), 3.26-3.21 (m, 2H), 2.97-2.88 (m, 2H), 2.68 (m, 1H), 2.55-2.45 (m, 1H), 1.96-1.72 (m, 1H), 1.24 (d, J=6.8 Hz, 3H).

Example 74. N-((3S,5R)-5-fluoropyridin-3-yl)-4-(6-((S)-3-methylmorpholinyl)-1H-pyrrol[2,3-b]pyridin-3-yl)-5-(trifluoromethyl)pyrimidine-2-amine (Compound 74)

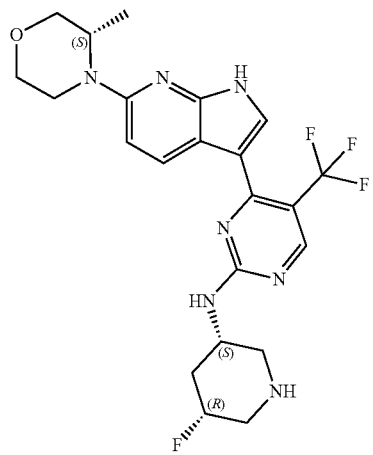

Compound 74 (4.56 mg, white solid). LCMS (ESI): [M+H]$^+$=480.2;

$^1$H NMR (400 MHz, CD$_3$OD) δ ppm 8.61-8.50 (m, 2H), 7.71 (br s, 1H), 6.75 (m, 1H), 4.64 (m, 1H), 4.40 (m, 1H), 4.02 (m, 1H), 3.89-3.82 (m, 3H), 3.67-3.66 (m, 1H), 3.26 (m, 3H), 3.17 (m, 1H), 2.78-2.68 (m, 2H), 2.43 (m, 1H), 1.92 (m, 1H), 1.24 (d, J=6.8 Hz, 3H).

Example 75. 4-(5-fluoro-6-((S)-3-methylmorpholinyl)-1H-pyrrol[2,3-b]pyridin-3-yl)-N—((S)-piperidin-3-yl)-5-(trifluoromethyl)pyrimidine-2-amine formate (Compound 75)

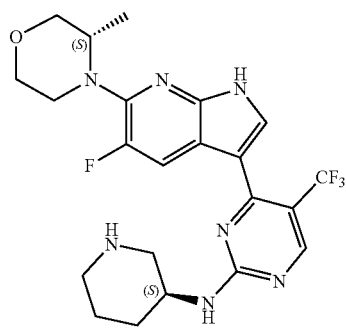

Step 1: tert-butyl(S)-3-((4-(5-fluoro-6-((S)-3-methylmorpholinyl)-1-(benzenesulfonyl)-1H-pyrrol[2,3-b]pyridin-3-yl)-5-(trifluoromethyl)pyrimidin-2-yl)amino)piperidine-1-carboxylate

Step 2: tert-butyl(S)-3-((4-(5-fluoro-6-((S)-3-methylmorpholinyl)-1H-pyrrol[2,3-b]pyridin-3-yl)-5-(trifluoromethyl)pyrimidin-2-yl)amino)piperidine-1-carboxylate

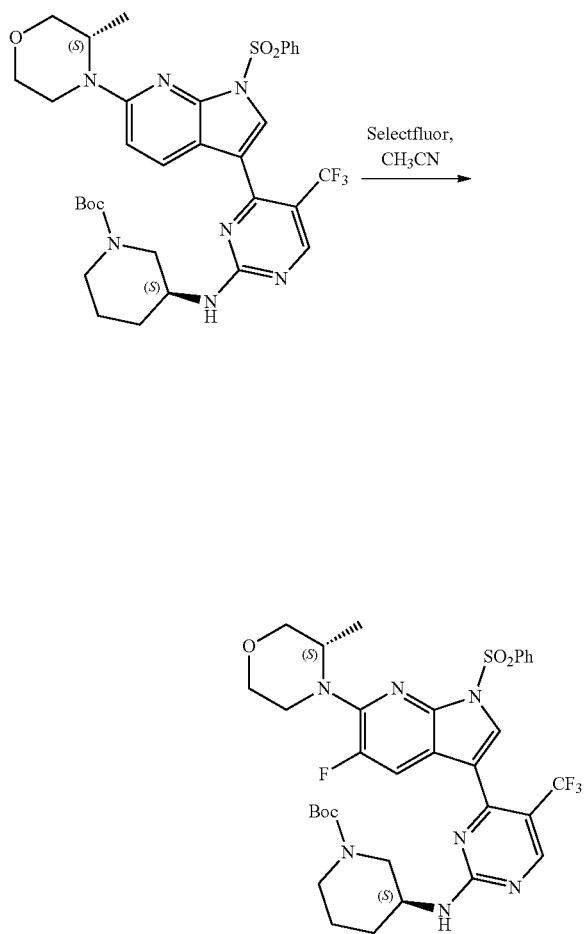

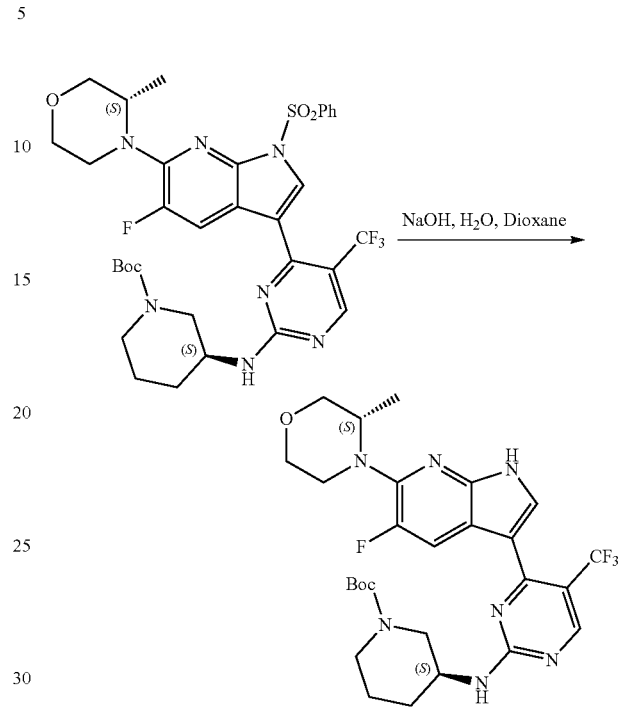

Aqueous sodium hydroxide (4 M, 0.21 mL, 0.83 mmol) was added to a solution of the compound tert-butyl(S)-3-((4-(5-fluoro-6-((S)-3-methylmorpholinyl)-1-(benzenesulfonyl)-1H-pyrrol[2,3-b]pyridin-3-yl)-5-(trifluoromethyl)pyrimidin-2-yl)amino)piperidine-1-carboxylate (75 mg, 0.10 mmol) in 1,4-dioxane (3 mL). The mixture was stirred at 100° C. for 30 minutes. Then, water (3 mL) was added. The reaction mixture was extracted with ethyl acetate (5 mL*3). Organic phases were dried with anhydrous sodium sulfate. Suction filtration and spin-drying were performed to obtain an oily brown crude compound tert-butyl(S)-3-((4-(5-fluoro-6-((S)-3-methylmorpholinyl)-1H-pyrrol[2,3-b]pyridin-3-yl)-5-(trifluoromethyl)pyrimidin-2-yl)amino)piperidine-1-carboxylate (60 mg). LCMS (ESI): [M+H]$^+$= 580.3.

Step 3: 4-(5-fluoro-6-((S)-3-methylmorpholinyl)-1H-pyrrol[2,3-b]pyridin-3-yl)-N—((S)-piperidin-3-yl)-5-(trifluoromethyl)pyrimidine-2-amine

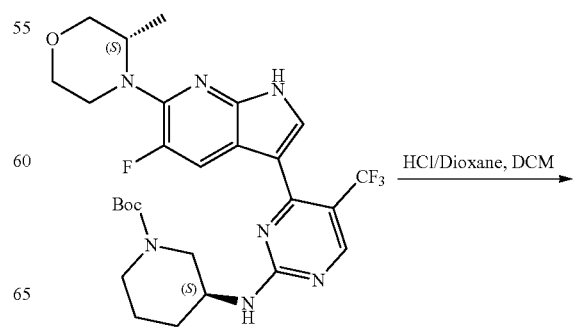

A solution of the compound tert-butyl(S)-3-((4-(6-((S)-3-methylmorpholinyl)-1-(benzenesulfonyl)-1H-pyrrol[2,3-b]pyridin-3-yl)-5-(trifluoromethyl)pyrimidin-2-yl)amino)piperidine-1-carboxylate (0.50 g, 0.71 mmol) in acetonitrile (20 mL) was cooled to −20° C. Then, a solution of 1-chloromethyl-4-fluoro-1,4-diazabicyclo[2.2.2]octane bis(tetrafluoroborate) (0.76 g, 2.14 mmol) in acetonitrile (5 mL) was slowly added dropwise. The temperature was controlled below −20° C. The reaction mixture was stirred at −20° C. for 1 hour. Then, a saturated sodium sulfite aqueous solution (30 mL) was added at −20° C. for quenching. The reaction mixture was extracted with ethyl acetate (30 mL*3). Organic phases were washed with a saturated salt solution (30 mL) and dried with anhydrous sodium sulfate. Suction filtration and spin-drying were performed. A crude product was purified by means of flash column chromatography (silica gel, the gradient of ethyl acetate/petroleum ether was 0 to 50%) to obtain an oily brown compound tert-butyl(S)-3-((4-(5-fluoro-6-((S)-3-methylmorpholinyl)-1-(benzenesulfonyl)-1H-pyrrol[2,3-b]pyridin-3-yl)-5-(trifluoromethyl)pyrimidin-2-yl)amino)piperidine-1-carboxylate (60 mg, 0.08 mmol, yield: 12%). LCMS (ESI): [M+H]$^+$=720.3.

103

-continued

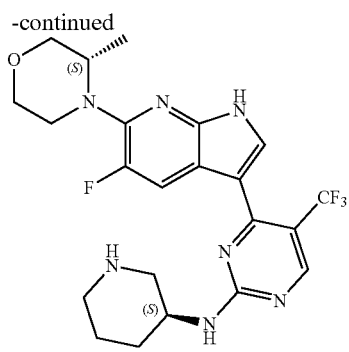

The solution of the compound tert-butyl(S)-3-((4-(5-fluoro-6-((S)-3-methylmorpholinyl)-1H-pyrrol[2,3-b]pyridin-3-yl)-5-(trifluoromethyl)pyrimidin-2-yl)amino)piperidine-1-carboxylate (60 mg, 0.10 mmol) in dichloromethane (2 mL) was cooled to 0° C. The solution (4 M, 0.52 mL, 2.08 mmol) of hydrogen chloride in dioxane was added. The mixture was stirred at 25° C. for 1 hour. The reaction mixture was spin-dried and purified by means of preparative HPLC to obtain a white solid compound 4-(5-fluoro-6-((S)-3-methylmorpholinyl)-1H-pyrrol[2,3-b]pyridin-3-yl)-N—((S)-piperidin-3-yl)-5-(trifluoromethyl)pyrimidine-2-amine (formate, 11.68 mg, 22 umol, yield: 22%). LCMS (ESI): [M+H]$^+$=480.2;

$^1$H NMR (400 MHz, CD$_3$OD) δ ppm 8.76-8.32 (m, 3H), 7.85 (s, 1H), 4.29 (s, 1H), 4.09 (td, J=3.2, 6.4 Hz, 1H), 4.01-3.87 (m, 2H), 3.85-3.74 (m, 1H), 3.67 (dd, J=3.3, 11.2 Hz, 1H), 3.56-3.40 (m, 3H), 3.25 (d, J1=12.3 Hz, 1H), 3.04-2.86 (m, 2H), 2.20 (s, 1H), 2.05 (d, J=14.3 Hz, 1H), 1.94-1.65 (m, 2H), 1.21 (d, J=6.6 Hz, 3H)

Example 101. (S)—N-(Piperidin-3-Yl)-4-(6-(Pyrrolidin-1-Yl)-1H-Indol-3-Yl)-5-(Trifluoromethyl)Pyrimidine-2-Amine (Compound 101, Compound 213 in the Patent

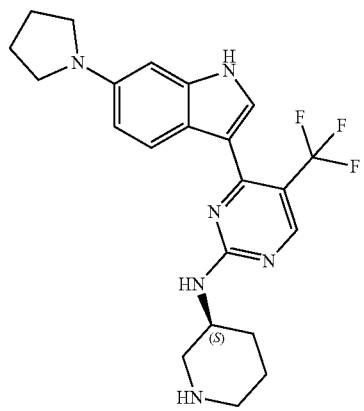

The yellow solid compound 213 (116.75 mg) in the patent CN201780057760.8 was synthesized by using the same method in Example 49 of the patent CN201780057760.8; LC-MS: [M+H]$^+$=431.2;

$^1$H NMR: (400 MHz, CD$_3$OD): δ ppm 8.47 (s, 1H), 8.16 (br s, 1H), 7.65 (bs, 1H), 6.67 (m, 1H), 6.59 (m, 1H), 4.23 (br s, 1H), 3.40 (m, 11H), 3.30-3.11 (m, 5H), 2.91-2.78 (m, 2H), 2.25-1.86 (m, 6H), 1.78-1.60 (m, 2H).

104

The same chloro intermediate tert-butyl(S)-3-((4-(6-chloro-1-(benzenesulfonyl)-1H-pyrrol[2,3-b]pyridin-3-yl)-5-(trifluoromethyl)pyrimidin-2-yl)amino)piperidine-1-carboxylate was coupled with other substrates to prepare the following compounds after deprotection by using the same method for synthesizing compound 32:

Example 103. 4-(6-(3-oxo-6-azabicyclo[3.1.1]heptan-6-yl)-1H-pyrrol[2,3-b]pyridin-3-yl)-N—((S)-piperidin-3-yl)-5-(trifluoromethyl)pyrimidine-2-amine formate (Compound 103)

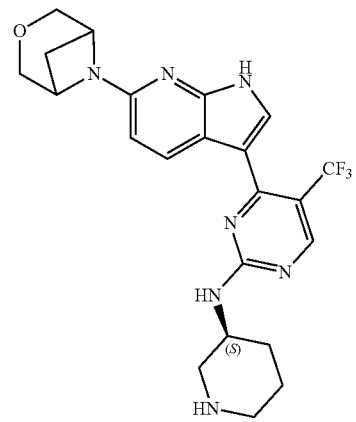

Compound 103 (33.22 mg, yellow solid). LCMS (ESI): [M+H]$^+$=460.2;

$^1$H NMR (400 MHz, CD$_3$OD) δ ppm 8.56 (s, 3H), 7.70 (br s, 1H), 6.50 (br d, J=8.5 Hz, 1H), 4.51-4.28 (m, 5H), 3.79 (d, J=10.3 Hz, 2H), 3.55 (br d, J=10.1 Hz, 1H), 3.29 (br s, 1H), 3.10-2.95 (m, 2H), 2.82 (q, J=6.6 Hz, 1H), 2.26-2.03 (m, 2H), 1.97 (d, J=8.1 Hz, 1H), 1.92-1.69 (m, 2H).

Example 104. 4-(6-((S)-3-ethylmorpholinyl)-1H-pyrrol[2,3-b]pyridin-3-yl)-N—((S)-piperidin-3-yl)-5-(trifluoromethyl)pyrimidine-2-amine formate (Compound 104)

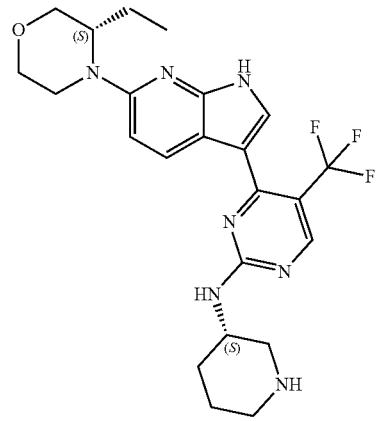

Compound 104 (11.72 mg, yellow solid). LCMS (ESI): [M+H]$^+$=476.2;

$^1$H NMR (400 MHz, CD$_3$OD) δ ppm 8.65-8.37 (m, 3H), 7.69 (s, 1H), 6.71 (br d, J=8.6 Hz, 1H), 4.29 (br s, J H), 4.15

(br s, 1H), 4.03-3.92 (m, 3H), 3.75-3.60 (m, 2H), 3.49 (br d, J=11.1 Hz, 1H), 3.26 (dt, J=3.8, 12.7 Hz, 2H), 2.93 (br t, J=9.8 Hz, 2H), 2.19 (br s, 1H), 2.03 (br d, J=14.5 Hz, 1H), 1.95-1.80 (m, 2H), 1.76-1.62 (m, 2H), 0.96 (t, J=7.4 Hz, 3H)

The same chloro intermediate tert-butyl(S)-3-((4-(6-chloro-1H-pyrrol[2,3-b]pyridin-3-yl)-5-(trifluoromethyl)pyrimidin-2-yl)amino)piperidine-1-carboxylate was coupled with other substrates (further reduced if necessary) to prepare the following compounds by using the same method for synthesizing compound 27:

Example 105. Mixture of (S)-4-(6-(2,5-dihydropyran-3-yl)-1H-pyrrol[2,3-b]pyridin-3-yl)-N-(piperidin-3-yl)-5-(trifluoromethyl)pyrimidine-2-amine (compound 105) and (S)-4-(6-(4,5-dihydropyran-3-yl)-1H-pyrrol[2,3-b]pyridin-3-yl)-N-(piperidin-3-yl)-5-(trifluoromethyl)pyrimidine-2-amine (compound 106)

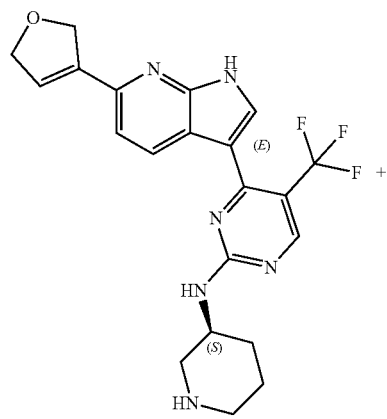

Compound 105

+

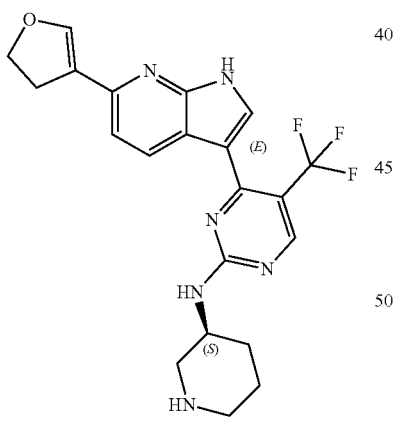

Compound 106

Mixture of compound 105 and compound 106 (2.29 mg, white solid). LCMS (ESI): [M+H]⁺=476.2;

Compound 105 accounted for 60.7% in HPLC. Compound 106 accounted for 38.2% in HPLC.

$^1$H NMR (400 MHz, DMSO-d$_6$) δ ppm 8.79-8.40 (m, 2H), 7.94-7.86 (m, 2H), 7.76-6.79 (m, 2H), 5.04 (br s, 1H), 4.81 (br s, 1H), 4.50 (t, J=9.5 Hz, 1H), 4.21-3.82 (m, 2H), 3.24 (br s, 1H), 3.12-2.99 (m, 2H), 2.83 (br d, J=11.5 Hz, 1H), 2.46-2.41 (m, 1H), 2.02-1.89 (m, 1H), 1.67 (br d, J=4.2 Hz, 1H), 1.47 (br d, J=8.5 Hz, 2H).

Example 109. (S)-4-(6-(3,4-dihydropyran-6-yl)-1H-pyrrol[2,3-b]pyridin-3-yl)-N-(piperidin-3-yl)-5-(trifluoromethyl)pyrimidine-2-amine (Compound 109)

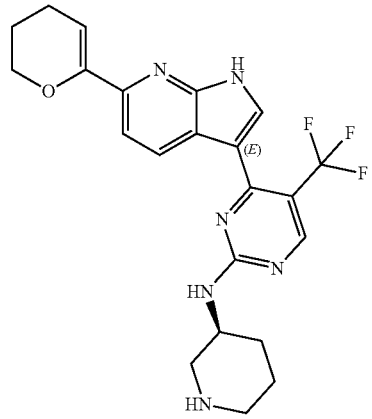 [SMILES: FC(F)(F)c1cnc(N[C@H]2CCCNC2)nc1-c1c[nH]c2nc(C3=CCCCO3)ccc12]

Compound 109 (5.20 mg, white solid). LCMS (ESI): [M+H]⁺=445.2;

$^1$H NMR (400 MHz, DMSO-d$_6$) δ ppm 12.78-11.84 (m, 1H), 8.64-8.51 (m, 1H), 8.78 (d, J=8.2 Hz, 1H), 7.91 (br d, J=4.5 Hz, 1H), 7.80 (br t, J=7.2 Hz, 1H), 7.44 (dd, J=17.7, 8.4 Hz, 1H), 6.00 (br s, 1H), 4.24-4.11 (m, 2H), 3.89 (br s, 1H), 3.07 (br t, J=10.9 Hz, 1H), 2.81 (br s, 1H), 2.47-2.39 (m, 2H), 2.29-2.18 (m, 2H), 2.03-1.77 (m, 3H), 1.71-1.59 (m, 1H), 1.45 (br s, 2H).

Example 110. 4-(6-(3-methyltetrahydropyran-4-yl)-1H-pyrrol[2,3-b]pyridin-3-yl)-N-((S)-piperidin-3-yl)-5-(trifluoromethyl)pyrimidine-2-amine formate (Compound 110)

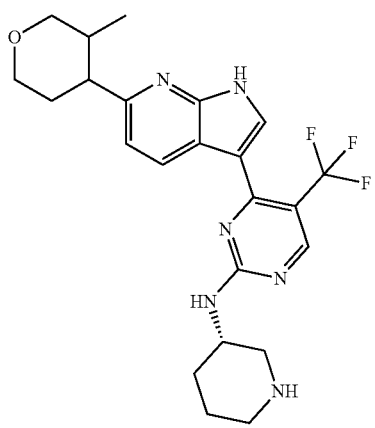 [SMILES: CC1COCCC1c1ccc2c(-c3nc(N[C@H]4CCCNC4)ncc3C(F)(F)F)c[nH]c2n1]

Compound 110 (6.08 mg, white solid). LCMS (ESI): [M+H]⁺=461.2;

$^1$H NMR (400 MHz, CD$_3$OD) δ ppm 8.90-8.40 (m, 3H), 7.95 (s, 1H), 7.18 (d, l=8.0 Hz, 1H), 4.31 (s, 1H), 4.08 (dd, J=4.1, 11.4 Hz, 1H), 4.00 (dd, J=4.4, 11.4 Hz, 1H), 3.65-3.43 (m, 2H), 3.29-3.16 (m, 2H), 2.95 (t, J=10.5 Hz, 2H), 2.66 (dt, J=3.5, 11.4 Hz, 1H), 2.29-2.13 (m, 2H), 2.04 (dd, J=4.4, 12.7 Hz, 2H), 1.78 (m, 3H), 0.67 (d, J=6.8 Hz, 3H)

Example 111. N—((S)-piperidin-3-yl)-4-(6-(tetrahydropyran-2-yl)-1H-pyrrol[2,3-b]pyridin-3-yl)-5-(trifluoromethyl)pyrimidine-2-amine (Compound 111)

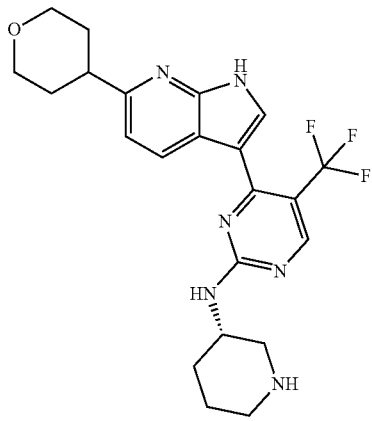 [SMILES: FC(F)(F)c1cnc(N[C@H]2CCCNC2)nc1-c1c[nH]c2nc(C3CCOCC3)ccc12]

Compound 111 (21.20 mg, white solid). LCMS (ESI): [M+H]$^+$=447.2;

$^1$H NMR (400 MHz, CD$_3$OD) δ ppm 8.96-8.62 (m, 1H), 8.53 (s, 1H), 7.97 (s, 1H), 7.40 (s, 1H), 4.64-4.46 (m, 1H), 4.29-3.98 (m, 2H), 3.72 (dt, J=2.6, 11.5 Hz, 1H), 3.26 (dd, J=3.4, 12.0 Hz, 1H), 2.97 (d, J=12.8 Hz, 1H), 2.71-2.54 (m, 2H), 2.26-1.93 (m, 3H), 1.88-1.59 (m, 7H).

The compound 111 was separated by means of SFC (column: DAICEL CHIRALCEL OJ (250 mm*30 mm, 10 um); mobile phases: an A phase is carbon dioxide, and a B phase is 0.1% ammonium hydroxide/ethanol; the B phase is kept 40%; a flow rate: 80 milliliters/minute) to obtain a target compound 112 and compound 113.

Example 112. A Chiral Monomer (Compound 112) Having Short Appearance Time after Chiral Resolution of the Compound 111

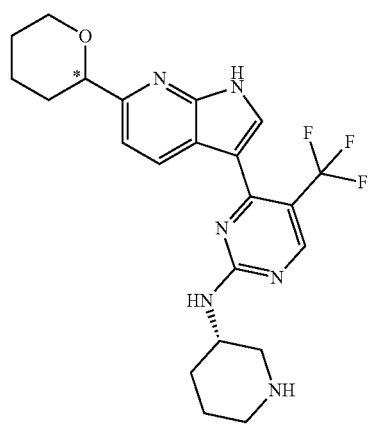 [SMILES: FC(F)(F)c1cnc(N[C@H]2CCCNC2)nc1-c1c[nH]c2nc(C3CCCCO3)ccc12]

Compound 112 (1.15 mg, white solid). LCMS (ESI): [M+H]$^+$=447.3; SFC analysis (column: Chiralcel OJ-3 (100 mm*4.6 mm), 3 um; mobile phases: an A phase is carbon dioxide, and a B phase is 0.05% diethylamine/ethanol; gradients: the B phase is from 5% to 40% within 4 minutes, the 40% B phase is kept for 0.5 minute, the 5% B phase is kept for 1.5 minutes, a flow rate: 2.8 milliliters/minute): RT=3.598 min, ee=100%;

$^1$H NMR (400 MHz, CD$_3$OD) δ ppm 8.96-8.62 (m, 1H), 8.53 (s, 1H), 7.97 (s, 1H), 7.40 (s, 1H), 4.64-4.46 (m, 1H), 4.29-3.98 (m, 2H), 3.72 (dt, J=2.6, 11.5 Hz, 1H), 3.26 (dd, J=3.4, 12.0 Hz, 1H), 2.97 (d, J=12.8 Hz, 1H), 2.71-2.54 (m, 2H), 2.26-1.93 (m, 3H), 1.88-1.59 (m, 7H).

Example 113. A Chiral Monomer (Compound 113) Having Long Appearance Time after Chiral Resolution of the Compound 111

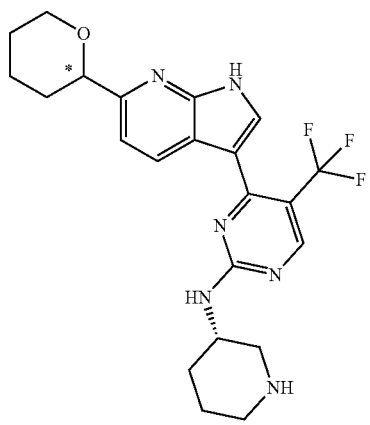 [SMILES: FC(F)(F)c1cnc(N[C@H]2CCCNC2)nc1-c1c[nH]c2nc(C3CCCCO3)ccc12]

Compound 113 (1.25 mg, white solid). LCMS (ESI): [M+H]$^+$=447.3; SFC analysis (column: Chiralcel OJ-3 (100 mm*4.6 mm), 3 um; mobile phases: an A phase is carbon dioxide, and a B phase is 0.05% diethylamine/ethanol; gradients: the B phase is from 5% to 40% within 4 minutes, the 40% B phase is kept for 0.5 minute, the 5% B phase is kept for 1.5 minutes, a flow rate: 2.8 milliliters/minute): RT=4.426 min, ee=98.80%;

1H NMR (400 MHz, CD$_3$OD) δ ppm 8.96-8.62 (m, 1H), 8.53 (s, 1H), 7.97 (s, 1H), 7.40 (s, 1H), 4.64-4.46 (m, 1H), 4.29-3.98 (m, 2H), 3.72 (dt, J=2.6, 11.5 Hz, 1H), 3.26 (dd, J=3.4, 12.0 Hz, 1H), 2.97 (d, J=12.8 Hz, 1H), 2.71-2.54 (m, 2H), 2.26-1.93 (m, 3H), 1.88-1.59 (m, 7H)

Example 114. (S)-dimethyl(3-(2-(piperidine-3-amino)-5-(trifluoromethyl)pyrimidin-4-yl)-1H-pyrrolo[2,3-b]pyridin-6-yl)phosphine oxide formate (Compound 114)

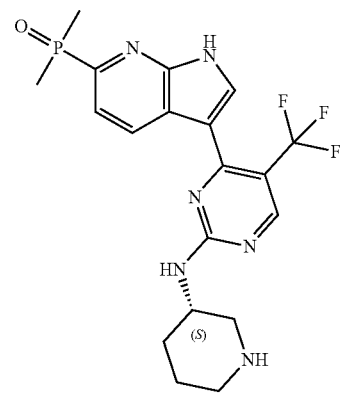

Step 1: tert-butyl(S)-3-((4-(6-(dimethylphosphoryl)-1-(benzenesulfonyl)-1H-pyrrolo[2,3-b]pyridin-3-yl)-5-(trifluoromethyl)pyrimidin-2-yl)amino)piperidine-1-formate Step 2: tert-butyl(S)-3-((4-(6-(dimethylphosphoryl)-1H-pyrrolo[2,3-b]pyridin-3-yl)-5-(trifluoromethyl)pyrimidin-2-yl)amino)piperidine-1-formate

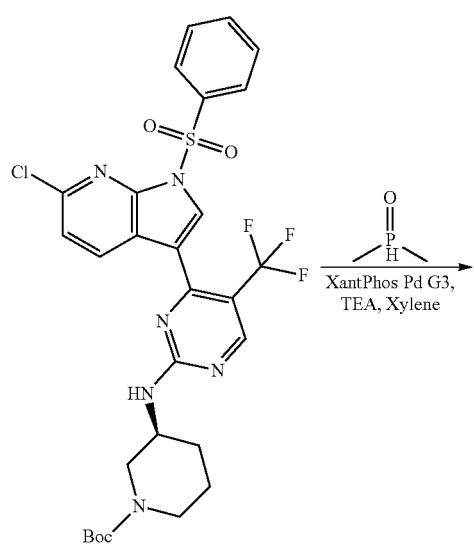

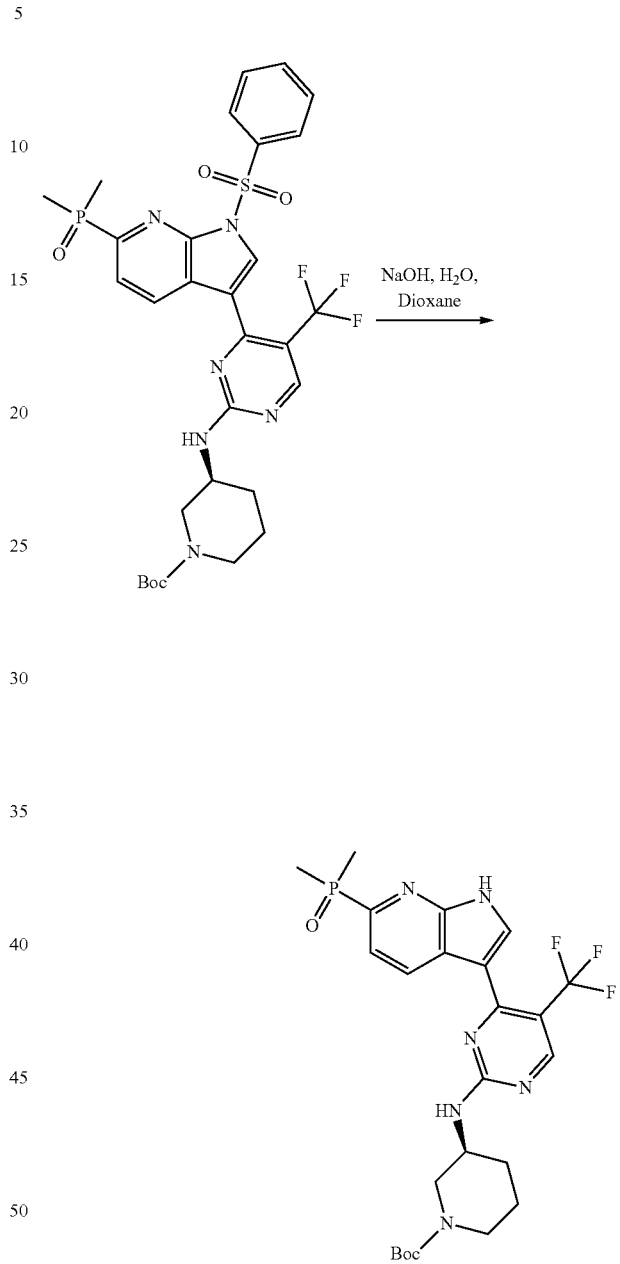

Tert-butyl(S)-3-((4-(6-chloro-1-(benzenesulfonyl)-1H-pyrrolo[2,3-b]pyridin-3-yl)-5-(trifluoromethyl)pyrimidin-2-yl)amino)piperidine-1-formate (150 mg, 0.24 mmol), methanesulfonato[9,9-dimethyl-4,5-bis(diphenylphosphine)xanthene][2-amino-1,1-biphenyl]palladium(II) dichloromethane adduct (24 mg, 24 umol), triethylamine (119 mg, 1.18 mmol), and dimethylphosphine oxide (36 mg, 0.47 mmol) were added to xylene (1500 uL) in a glove box. Then, the mixture was stirred at 145° C. for 16 hours. The reaction mixture was filtered. The filtrate was spin-dried. Residues were purified by means of flash column chromatography (silica gel, the gradient of tetrahydrofuran/petroleum ether was 1% to 20%) to obtain a white solid crude compound tert-butyl(S)-3-((4-(6-(dimethylphosphoryl)-1-(benzenesulfonyl)-1H-pyrrolo[2,3-b]pyridin-3-yl)-5-(trifluoromethyl)pyrimidin-2-yl)amino)piperidine-1-formate (165 mg). LCMS (ESI): [M-100+H]$^+$=579.2.

Aqueous sodium hydroxide (4 M, 304 uL, 1.22 mmol) was added to the solution of tert-butyl(S)-3-((4-(6-(dimethylphosphoryl)-1-(benzenesulfonyl)-1H-pyrrolo[2,3-b]pyridin-3-yl)-5-(trifluoromethyl)pyrimidin-2-yl)amino)piperidine-1-formate (165 mg, 0.24 mmol) in 1.4-dioxane (1650 uL). Then, the mixture was stirred at 50° C. for 16 hours. 1,4-dioxane was spin-dried. Extraction with ethyl acetate (2 mL*2) was performed. Organic phases were dried with anhydrous sodium sulfate and then filtered. The filtrate was spin-dried to obtain a white solid crude product tert-butyl (S)-3-((4-(6-(dimethylphosphoryl)-1H-pyrrolo[2,3-b]pyridin-3-yl)-5-(trifluoromethyl)pyrimidin-2-yl)amino)piperidine-1-formate (130 mg). LCMS (ESI): [M+H]$^+$=539.2.

Step 3: (S)-dimethyl(3-(2-(piperidine-3-amino)-5-(trifluoromethyl)pyrimidin-4-yl)-1H-pyrrolo[2,3-b]pyridin-6-yl)phosphine oxide formate

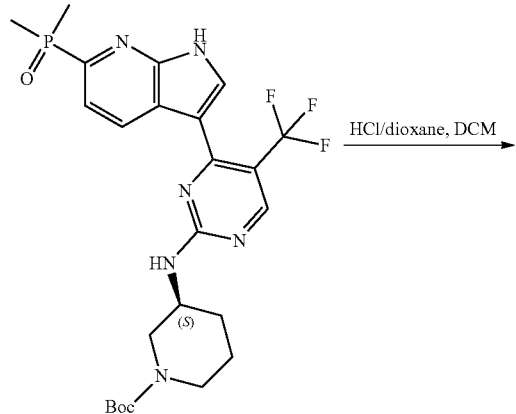

HCl/dioxane, DCM

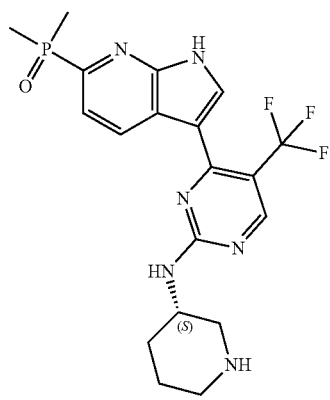

The hydrogen chloride/dioxane solution (4 M, 200 uL, 0.80 mmol) was added to the solution of tert-butyl(S)-3-((4-(6-(dimethylphosphoryl)-1H-pyrrolo[2,3-b]pyridin-3-yl)-5-(trifluoromethyl)pyrimidin-2-yl)amino)piperidine-1-formate (130 mg, 0.19 mmol) in dichloromethane (1500 uL). Then, the mixed solution was stirred at 50° C. for 16 hours. The reaction solution was spin-dried and purified by means of preparative HPLC to obtain white solid (S)-dimethyl(3-(2-(piperidine-3-amino)-5-(trifluoromethyl)pyrimidin-4-yl)-1H-pyrrolo[2,3-b]pyridin-6-yl)phosphine oxide (formate, 21.69 mg, 49 umol, yield: 26%). LCMS (ESI): [M+H]$^+$=438.9;

$^1$H NMR (400 MHz, CD$_3$OD) δ ppm 9.16-8.89 (m, 1H), 8.64 (s, 1H), 8.55 (s, 1H), 8.15 (br s, 1H), 7.87 (dd, J=5.5, 7.8 Hz, 1H), 4.33 (br s, 1H), 3.65-3.44 (m, 1H), 3.30 (m, 1H), 3.00 (br t, J1=10.3 Hz, 2H), 2.19 (br s, 1H), 2.09 (br d, J=14.1 Hz, 1H), 1.86 (d, J=13.6 Hz, 8H).

(S)-3-methyl-4-(3-(2-(methylsulfonyl)-5-(trifluoromethyl)pyrimidin-4-yl)-1-(benzenesulfonyl)-1H-pyrrol[2,3-b]pyridin-6-yl)morpholine was used as a raw material and reacted with corresponding amine to synthesize the corresponding compound:

Example 115. 4-(6-((S)-3-methylmorpholinyl)-1H-pyrrol[2,3-b]pyridin-3-yl)-N-((3S,5S)-5-methylpiperidin-3-yl)-5-(trifluoromethyl)pyrimidine-2-amine (Compound 115)

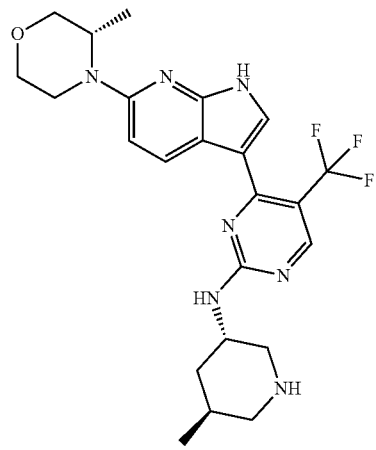 [SMILES: C[C@@H]1CNC[C@@H](Nc2ncc(C(F)(F)F)c(-c3c[nH]c4nc(N5CCOC[C@@H]5C)ccc34)n2)C1]

Compound 115 (19.05 mg, white solid). LCMS (ESI): [M+H]$^+$=476.2;

$^1$H NMR (400 MHz, CD$_3$OD) δ ppm 8.58 (s, 2H), 7.72 (s, 1H), 6.73 (d, J=9.0 Hz, 1H), 4.48-4.35 (m, 2H), 4.03 (dd, J=3.0, 11.3 Hz, 1H), 3.91-3.78 (m, 3H), 3.73-3.61 (m, 2H), 3.30-3.20 (m, 2H), 3.16 (dd, J=2.8, 13.1 Hz, 1H), 2.69 (t, J=11.7 Hz, 1H), 2.29 (br s, 1H), 2.13 (br d, J=14.6 Hz, 1H), 1.74-1.65 (m, 1H), 1.24 (d, J=6.5 Hz, 3H), 1.08 (d, J=6.5 Hz, 3H)

Effect Example 1: In Vitro Enzymatic Inhibitory Activity Test of Compounds CDK7, CDK2, CDK9, and CDK12

The test was performed in a U-shaped bottom 384-well plate (coming, 4512 #), and the reaction temperature was 27° C. CDK7/CyclinH was diluted in a test buffer solution (20 mM MES PH6.75, 0.01% Tween20, 50 ug/mL BSA, 6 mM MgCl$_2$) to obtain a corresponding enzyme solution with a 2.4× concentration. CDK2/CyclinE1 was diluted in a test buffer solution (20 mM MES PH6.75, 0.01% Tween20, 50 ug/mL BSA, 6 mM MgCl$_2$) to obtain a corresponding enzyme solution with a 2.4× concentration. CDK9/CyclinT1 was diluted in a test buffer solution (20 mM MES PH6.75, 0.01% Tween20, 50 ug/mL BSA, 10 mM MgCl$_2$) to obtain a corresponding enzyme solution with a 2.4× concentration. CDK12/CyclinK was diluted in a test buffer solution (80 mM MES PH6.5, 0.01% Tween20, 50 ug/mL BSA, 10 mM MgCl$_2$) to obtain a corresponding enzyme solution with a 2.4× concentration. The compounds were dissolved in dimethyl sulfoxide (DMSO) at a concentration of 10 mM. When in use, the compounds were diluted with DMSO into 10 concentration gradients ranging from 25 nM to 500 uM, which were respectively diluted by 8.3 times in the test buffer solution to obtain compound solutions with a 6× concentration. A polypeptide substrate and ATP were diluted in the test buffer solution to obtain a mixed solution of the polypeptide substrate and ATP with a 2.4× concentration. 2 ul of a test compound solution was mixed with 5 ul of enzyme solution. After incubating for 10 min, 5 ul of the mixed solution of the polypeptide substrate and ATP was added. After incubating at 27° C. for 180 min, 4 uL of EDTA with a 120 mM concentration was added to each sample to stop the reaction. The test buffer solution containing 20 uM of staurosporine replaced the compound solution as 100% inhibitory control, the DMSO replaced the compound solution as 0% inhibitory control, and each test at least contained 2 parallel controls. Specifically, a CDK7/cyclin H/MAT1 complex (6 nM) and a "5-FAMCDK7 tide" peptide substrate (2 µM, synthetic fluorophore labeled peptide having the following sequence. 5-FAM-YSPTSPSYSPTSPSYSPT-SPSKKKK, where "5-FAM" referred to 5-carboxyfluorescein) were used for testing the CDK7 inhibition. A CDK9/cyclin TI complex (8 nM) and a "5-FAM-CDK9tide" peptide substrate (2 µM, synthetic fluorophore labeled peptide having the following sequence: 5-FAM-GSRTPMY-NH2, where 5-FAM was as defined above, and NH2 represented C-terminal amide) were used for testing the CDK9 inhibition. ACDK12(aa686-1082)/cyclin K complex (50 nM) and the "5-FAM-CDK9tide" (2 IM) as defined above were used for testing the CDK12 inhibition. A CDK2/cyclin E1 complex (0.5 nM) and the "5-FAM-CDK7tide" (2 µM) as defined above were used for testing the CDK2 inhibition.

Electrophoretic separation was performed on Caliper EZ Reader II by means of a fluorogenic substrate and a phosphorylated product to analyze the reaction mixture. Data were calculated by using GraphPad Prism version 6.0. IC50 values were adjusted by means of a nonlinear regression model using a dose-response curve.

These IC50 test results are shown below in Table 1:

TABLE 1

| Compound No. | CDK7 IC50 (nM) | CDK2 IC50 (nM) | CDK9 IC50 (nM) | CDK12 IC50 (nM) |
|---|---|---|---|---|
| 1 | 13.38 | 3023 | 1184 | 1461 |
| 2 | 10.36 | 4381 | 1035 | 1838 |
| 3 | 17.4 | 2677 | 722.3 | 678.9 |
| 4 | 17.36 | 1482 | 681.9 | 733.2 |
| 5 | 12.11 | 2253 | 906.8 | 1022 |
| 6 | 10.36 | 4381 | 1035 | 1838 |
| 7 | 24.26 | 4504 | 3253 | 2061 |
| 8 | 40.26 | 17485 | 15941 | 9316 |
| 9 | 28.72 | 7292 | 4527 | 1270 |
| 10 | 26.96 | 2093 | 4010 | 822.9 |
| 11 | 27.8 | 6448 | 4226 | 1952 |
| 12 | 17.37 | 3792 | 2790 | 1170 |
| 13 | 7.051 | 2672 | 3429 | 2641 |
| 14 | 7.105 | 3288 | 1669 | 555.4 |
| 15 | 16.49 | 4149 | 3320 | 1116 |
| 16 | 10.84 | 2881 | 3582 | 1226 |
| 17 | 20 | 5475 | 4254 | 1628 |
| 18 | 9.47 | 6562 | 2874 | 2286 |
| 19 | 158.8 | >10000 | >10000 | 8718 |
| 20 | 8.425 | 3275 | 2974 | 765.2 |
| 21 | 8.806 | 4330 | 2978 | 818.1 |
| 22 | 7.052 | 3046 | 2863 | 783 |
| 23 | 13.06 | 4311 | 2610 | 782.9 |
| 24 | 17.39 | 8497 | 5253 | 1973 |
| 25 | 6.503 | 1037 | 402.3 | 276.8 |
| 26 | 9.503 | >10000 | >10000 | >10000 |
| 27 | 2.171 | 1120 | 1500 | 417.7 |
| 28 | 6.956 | 3470 | 3628 | 1096 |
| 29 | 7.084 | 1263 | 2480 | 855.2 |
| 30 | 10.52 | 3262 | 9531 | 2151 |
| 31 | 8.128 | 968 | 1484 | 517.2 |
| 32 | 19.94 | 3627 | 6515 | 3432 |
| 33 | 46.78 | 3232 | 4425 | 2007 |
| 34 | 40.25 | 1270 | 1663 | 1092 |
| 43 | 82.85 | >10000 | >10000 | >10000 |
| 44 | 131 | >10000 | 3646 | 4457 |
| 60 | 8.79 | >10000 | 8072 | >10000 |
| 69 | 28.35 | 47146 | >50000 | 49097 |
| 70 | 41.19 | 37615 | >50000 | 48963 |
| 71 | 31.67 | 9302 | >>50000 | 6678 |
| 72 | 17.63 | 3351 | 1823 | 2545 |

TABLE 1-continued

| Compound No. | CDK7 IC50 (nM) | CDK2 IC50 (nM) | CDK9 IC50 (nM) | CDK12 IC50 (nM) |
|---|---|---|---|---|
| 73 | 11.49 | 4292 | 3346 | 3381 |
| 74 | 10.15 | 27277 | >50000 | 11950 |
| 75 | 8.5 | 2383 | 5929 | 3338 |
| 101 | 28.46 | >10000 | 4615 | 1600 |
| 103 | 7.258 | 2826 | 3683 | 1389 |
| 104 | 5.854 | 1552 | 2751 | 772.8 |
| Mixture of 105 and 106 | 2.704 | 1028 | 1783 | 530.5 |
| 107 | 6.399 | 1509 | 1444 | 567.2 |
| 108 | 4.355 | 946.9 | 1412 | 512.2 |
| 109 | 5.621 | 2150 | 2872 | 999.5 |
| 110 | 3.478 | 2183 | 4263 | 1614 |
| 112 | 5.816 | — | — | — |
| 113 | 4.759 | — | — | — |
| 114 | 6.729 | 1723 | 2468 | 1210 |
| 115 | 9.523 | 19524 | 27675 | 12873 |
| Staurosporine | 796.6 | 32.5 | 377.3 | 3164 |

Note:
— indicates that the test is not performed.

It can be seen from the above table that, by means of in vitro biological activity screening, staurosporine is used as a reference substance, and the compound of the present invention has good inhibiting ability and selectivity on CDK7 kinase. Some compounds are much better than the structurally closest compound 213 (Example 101) in the patent CN201780057760.8 and are expected to be developed as drugs for regulating the activity of CDK7 kinase or treating CDK7-related diseases.

Effect Example 2: Cell Bioactivity Detection

Trypsinization was performed on A2780 and HCC70 cells. Cell suspensions were respectively transferred to 15 mL of centrifuge tubes and centrifuged at 800 rpm for 5 min. The supernatant was discarded. Resuspension in a fresh culture medium (RPMI 1640+10% FBS) was performed. After counting, the cells were inoculated at 2000/well in a 384-well plate (50 ɋL of 1640+10% FBS culture medium was added to the $2^{nd}$ line and the $23^{rd}$ line of the 384-well plate, and 50 µL of DPBS was added to surrounding wells). Incubation in an incubator (37° C., 5% CO2) was performed overnight.

The compound was added to the well plate the next day. The compound had the highest concentration of 10 µM and was diluted at the ratio of 1:4 to form 9 concentrations. The positive compound Paclitaxel had the highest concentration of 1 µM and was diluted at the ratio of 1:3 to form 9 concentrations. The DMSO content of each well was unified to 0.2%. A cell plate was centrifuged at 800 rpm for 30 seconds. Incubation for 72 hours in an incubator (37° C., 5% CO2) was performed. On the fourth day, a Cyquant reagent (3×) was prepared according to kit instructions. Each 384-well plate was prepared in the following proportions: DPBS: 11.568 mL, CyQuant® Direct nucleic acid stain: 72 µL, CyQuant® Direct background suppressor: 360 ILL. The plates were uniformly mixed and placed for standby application at room temperature. The cell plate was taken out and placed at room temperature to be balanced for 30 min. 25 µL of Cyquant reagent (3×) was dispensed to the cells in each well of the 384-well plates by using a Multi-drop dispenser. Incubation at 37° C. for 60 or more minutes was performed. The plates were read by Acumen (Acumen was configured to have a 488 nm excitation wavelength). IC50 results were analyzed by XLFIT5 of the IDBS company.

These test results are shown below in Table 2.

TABLE 2

| Compound No. | HCC70 IC50 (nM) | A2780 IC50 (nM) |
|---|---|---|
| 1 | 14 | 14 |
| 2 | 15 | 16 |
| 3 | 7.9 | 12 |
| 4 | 6.1 | 8 |
| 5 | 19 | 17 |
| 6 | 6.7 | 22 |
| 7 | 28 | 21.91 |
| 8 | 16 | 19.13 |
| 9 | 44 | 36.34 |
| 10 | 102 | 108.69 |
| 11 | 48 | 41.17 |
| 12 | 69 | 90.1 |
| 13 | 29 | 35.2 |
| 14 | 24 | 11 |
| 15 | 12 | 10 |
| 16 | 13 | 11 |
| 17 | 102 | 212 |
| 18 | 6.7 | 7.2 |
| 19 | 220 | 185 |
| 20 | 13.7 | 8.3 |
| 21 | 27.8 | 19 |
| 22 | 10.7 | 4.7 |
| 23 | 19.9 | 8.8 |
| 24 | 72 | 110 |
| 25 | 11 | 7.9 |
| 26 | 52 | 30 |
| 27 | 30 | 5.1 |
| 28 | 7.7 | 7.8 |
| 29 | 3.1 | 2.1 |
| 30 | 20 | 5.6 |
| 31 | 5.8 | 4.1 |
| 32 | 24 | 6.3 |
| 33 | 12 | 2.4 |
| 34 | 15 | 3.3 |
| 43 | 6068 | — |
| 44 | 684 | 253 |
| 60 | 475 | 36 |
| 69 | 642 | — |
| 70 | 484 | 146 |
| 71 | 390 | 547 |
| 72 | 21 | 2.8 |
| 73 | 35 | 6.2 |
| 74 | 199 | 177 |
| 75 | 9.2 | 7.4 |
| 101 | 232 | 157 |
| 103 | 22.3 | 18.2 |
| 104 | 4.97 | 5.37 |
| Mixture of 105 and 106 | 6.30 | 10.27 |
| 107 | 6.77 | 6.27 |
| 108 | 3.8 | 3.9 |
| 109 | 3.98 | 5.61 |
| 110 | 38.6 | 38.6 |
| 114 | 18.1 | 17.6 |
| 115 | 42.0 | 45.5 |

Note:
— indicates that the test is not performed.

It can be seen from Table 2 that the compound of the present invention has a good inhibitory effect on human breast cancer cells HCC70 and ovarian carcinoma cells A2780. The activity of some compounds is better than that of the structurally closest compound 213 (Example 101) in the patent CN201780057760.8 for dozens of times.

Although the specific implementations of the present invention are described above, it should be understood by a person skilled in the art that these examples are only examples and various modifications or amendments may be made to these implementations without deviating from the principle and essence of the present invention. Therefore, the scope of protection of the present invention is limited by the appended claims.

What is claimed is:

1. A compound or a pharmaceutically acceptable salt thereof, or a crystal form or solvate of any one of the foregoing, wherein the compound is selected from the group consisting of:

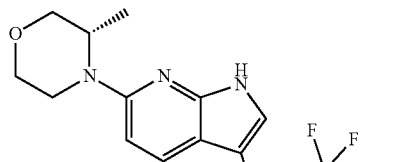
and
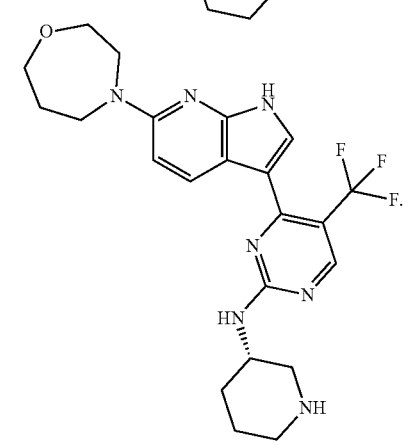

2. A compound or a pharmaceutically acceptable salt thereof, or a crystal form or solvate of any one of the foregoing, wherein the compound has the following structure:

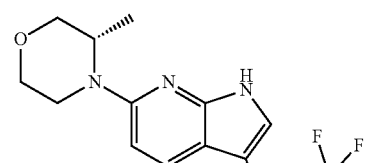

3. A compound or a pharmaceutically acceptable salt thereof, or a crystal form or solvate of any one of the foregoing, wherein the compound has the following structure:
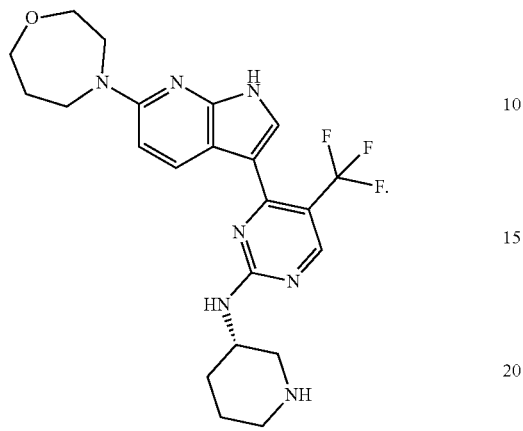
* * * * *